United States Patent
Chikaraishi et al.

(10) Patent No.: US 6,849,025 B2
(45) Date of Patent: Feb. 1, 2005

(54) FRICTIONAL ROLLER TRANSMISSION

(75) Inventors: Kazuo Chikaraishi, Gunma-ken (JP); Atsushi Maeda, Gunma-ken (JP); Manabu Abe, Gunma-ken (JP)

(73) Assignee: NSK Ltd., Tokyo (JP)

( * ) Notice: Subject to any disclaimer, the term of this patent is extended or adjusted under 35 U.S.C. 154(b) by 92 days.

(21) Appl. No.: 10/117,150

(22) Filed: Apr. 8, 2002

(65) Prior Publication Data

US 2002/0147068 A1 Oct. 10, 2002

(30) Foreign Application Priority Data

| Apr. 9, 2001 | (JP) | ........................................ | 2001-110366 |
| May 11, 2001 | (JP) | ........................................ | 2001-141463 |
| May 28, 2001 | (JP) | ........................................ | 2001-159162 |
| May 28, 2001 | (JP) | ........................................ | 2001-159198 |
| May 28, 2001 | (JP) | ........................................ | 2001-159207 |
| Feb. 15, 2002 | (JP) | ........................................ | 2002-039093 |
| Feb. 21, 2002 | (JP) | ........................................ | 2002-045332 |
| Feb. 21, 2002 | (JP) | ........................................ | 2002-045338 |

(51) Int. Cl.[7] .............................................. F16H 13/00
(52) U.S. Cl. .............................. 476/21; 476/15; 476/67
(58) Field of Search ............................ 476/15, 18, 21, 476/31, 61, 67; 74/63

(56) References Cited

U.S. PATENT DOCUMENTS 1,122,563 A * 12/1914 Woodworth .................. 476/21
1,775,201 A * 9/1930 Jacobsen ..................... 476/21
1,870,421 A * 8/1932 Prout .......................... 476/61
4,029,332 A * 6/1977 Davis ......................... 280/234
6,482,121 B2 * 11/2002 Okoshi ....................... 476/65

FOREIGN PATENT DOCUMENTS

| JP | 6-135339 | 5/1994 |
| JP | 6-288453 | 10/1994 |
| JP | 2000-16313 | 1/2000 |
| JP | 2000-16314 | 1/2000 |
| JP | 2001-114118 | 4/2001 |
| JP | 2001-130426 | 5/2001 |

* cited by examiner

Primary Examiner—David A. Bucci
Assistant Examiner—Julie K. Smith
(74) Attorney, Agent, or Firm—Miles & Stockbridge P.C.

(57) ABSTRACT

A frictional roller transmission comprises a first roller and a second roller disposed around two shafts which are separated from each other in such a manner that the two rollers are not brought into contact, a third roller and a fourth roller which are brought into contact with both the first and second rollers and are disposed between the first roller and the second roller and on an opposite side over a line connecting the center of the first roller and that of the second roller. An angle made by a tangential line between the first roller and the third roller (or the fourth roller) and a tangential line between the second roller and the third roller (or the fourth roller) is set at two times as large as an angle of friction obtained from a coefficient of friction between the respective rollers or smaller.

36 Claims, 64 Drawing Sheets

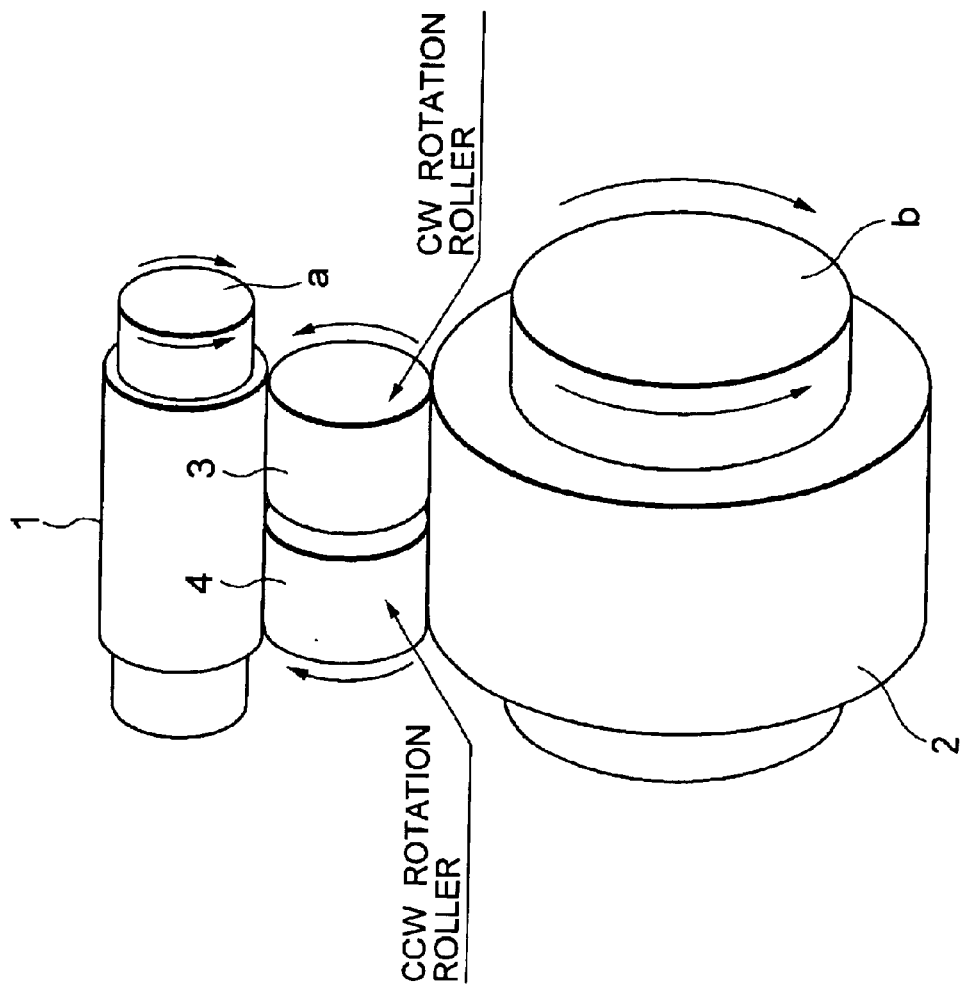
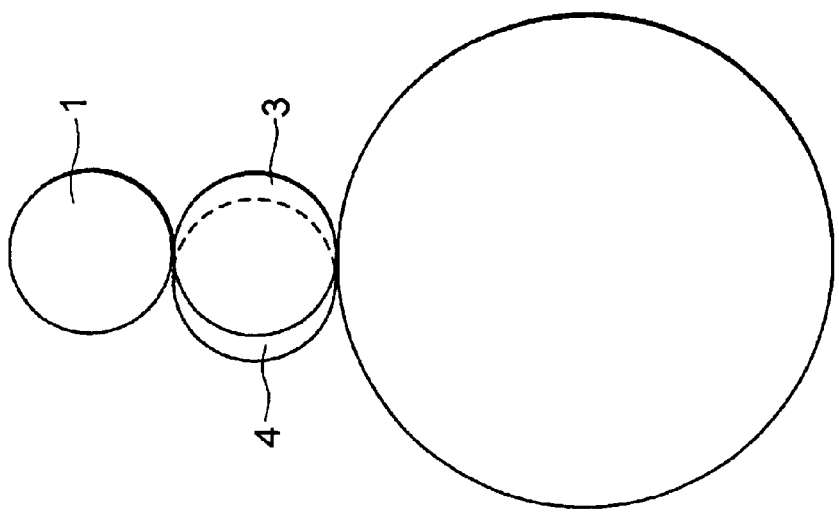
FIG. 1B
FIG. 1A

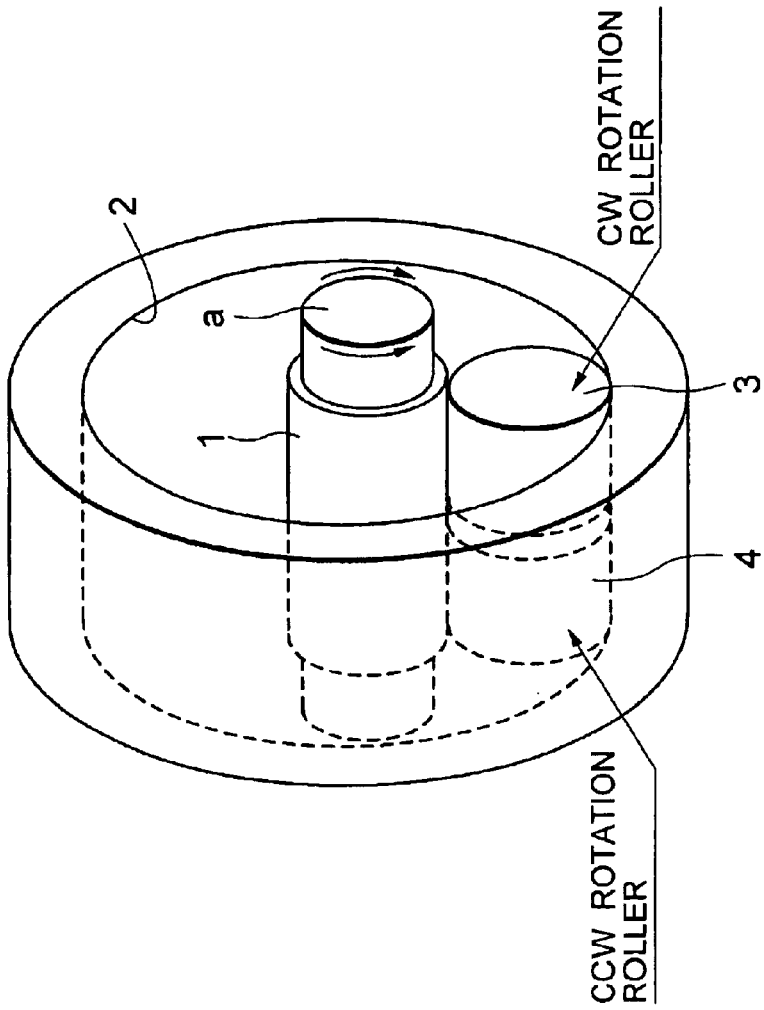
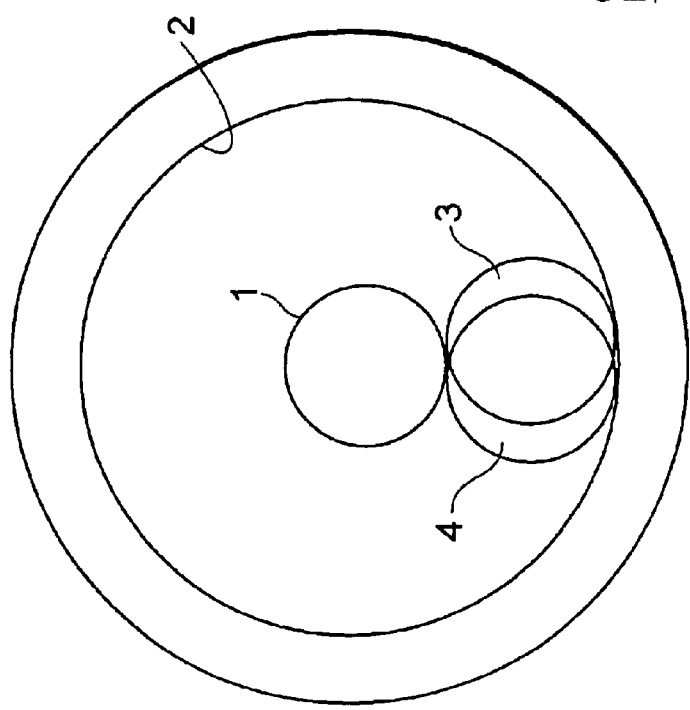
FIG. 3B
FIG. 3A

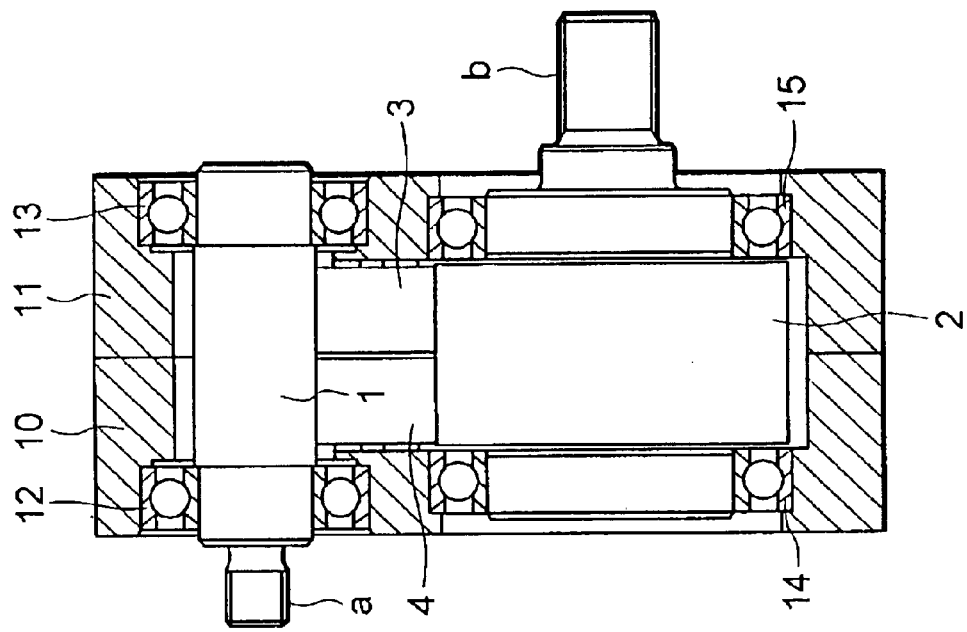
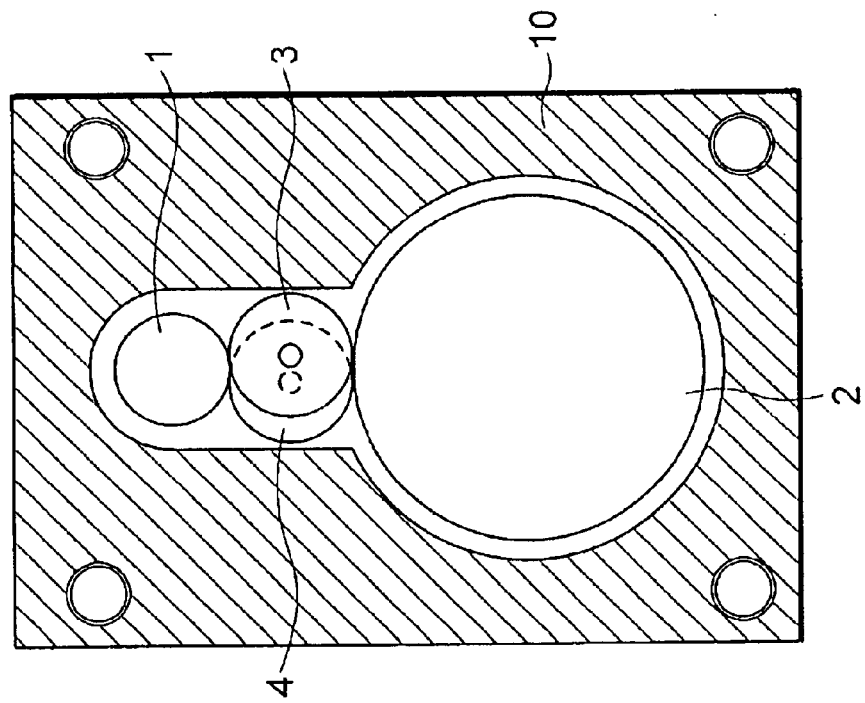

FIG. 6C
FIG. 6D
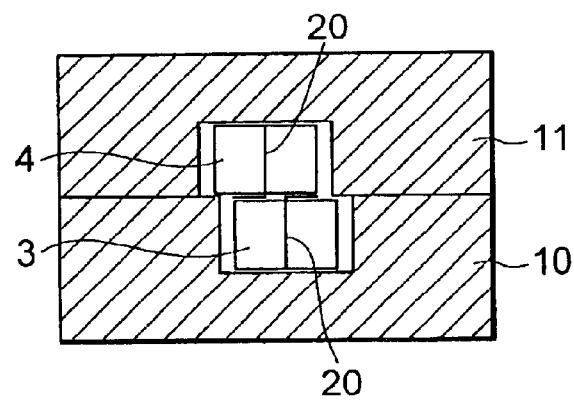
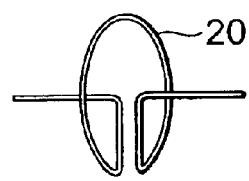
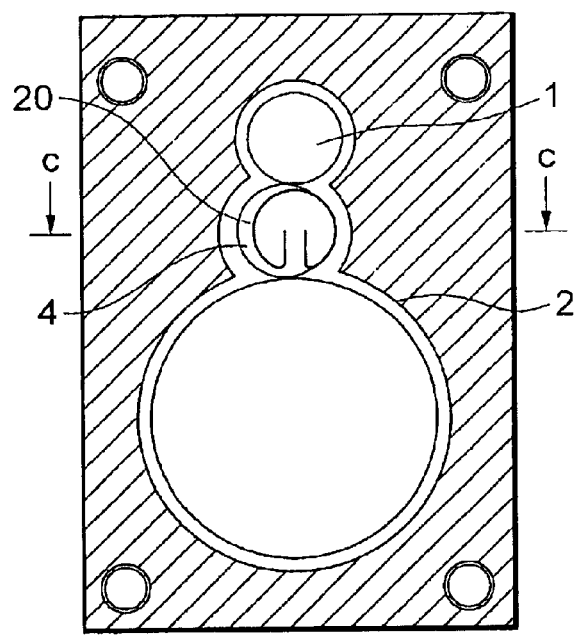
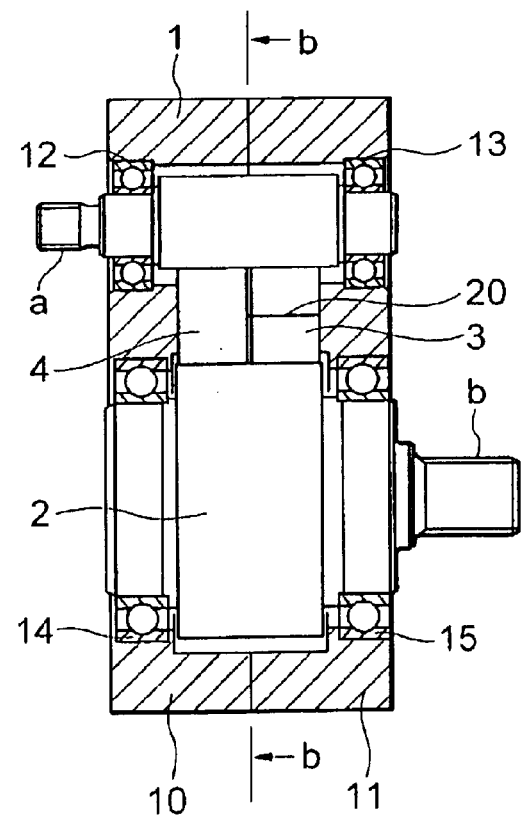
FIG. 6B
FIG. 6A

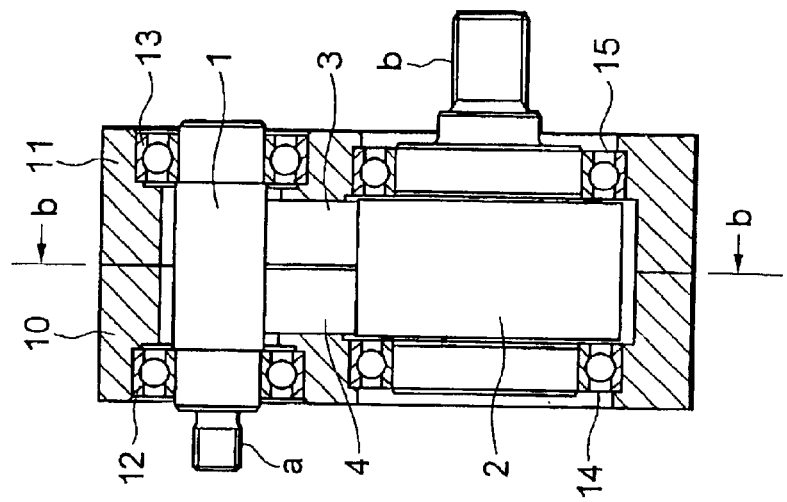
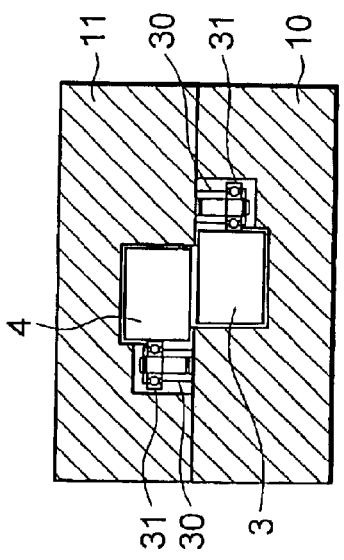
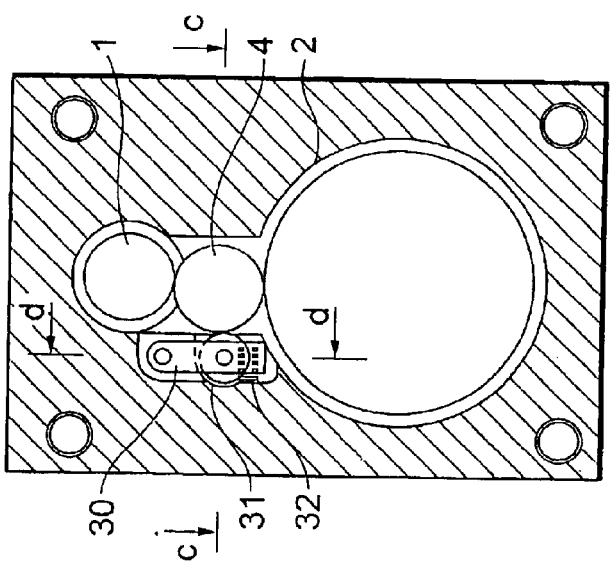
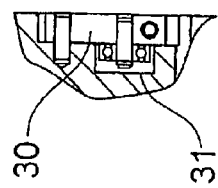

FIG. 11C
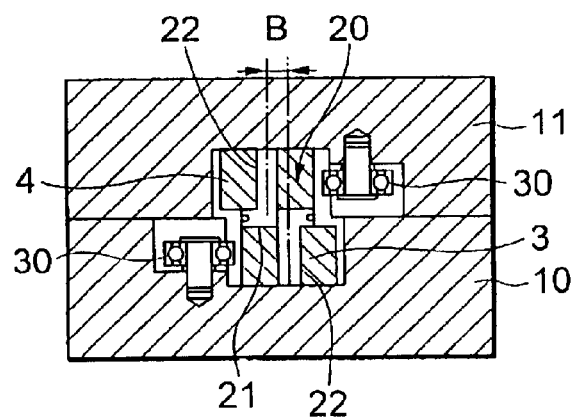
FIG. 11A
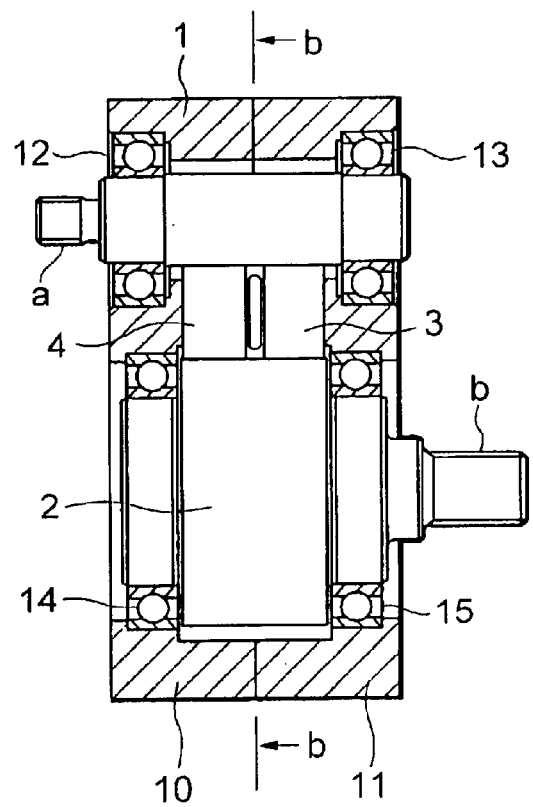
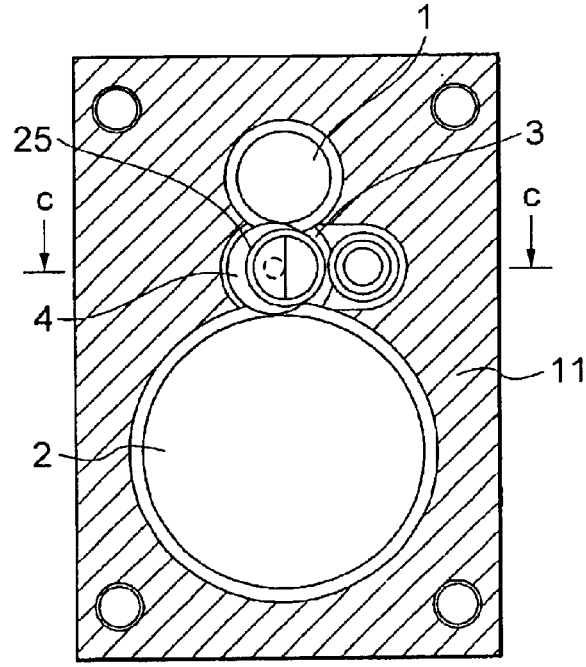
FIG. 11B

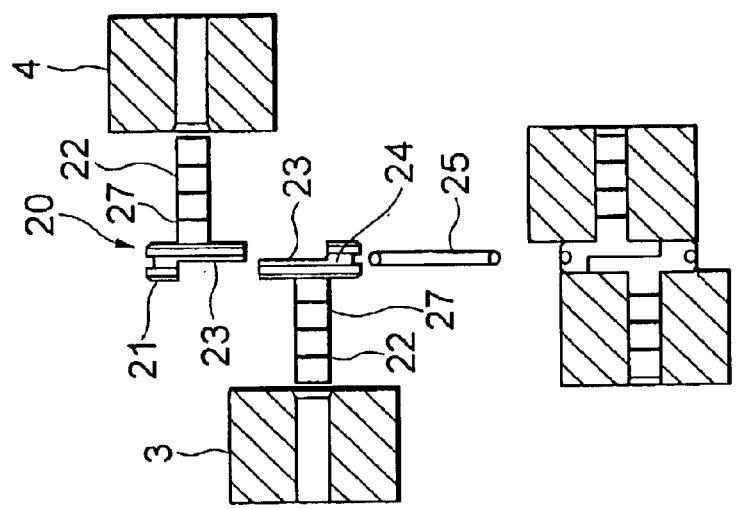

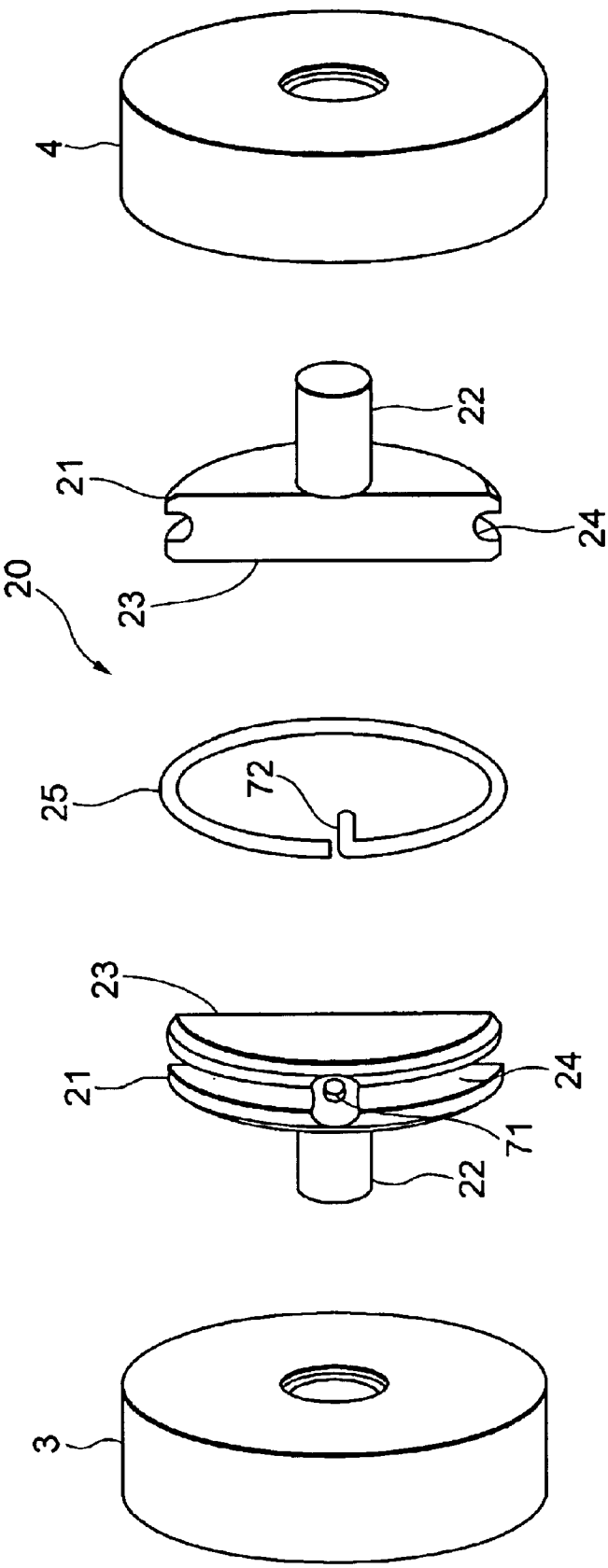

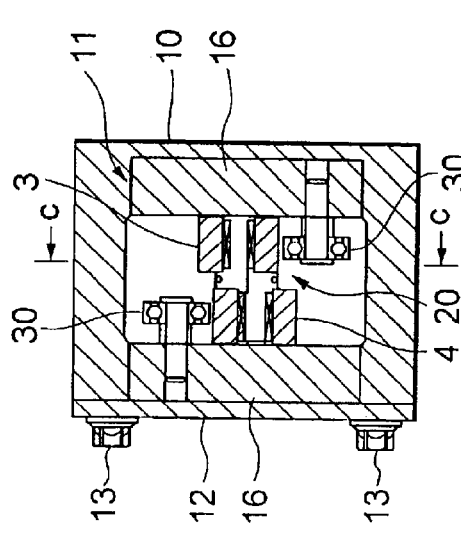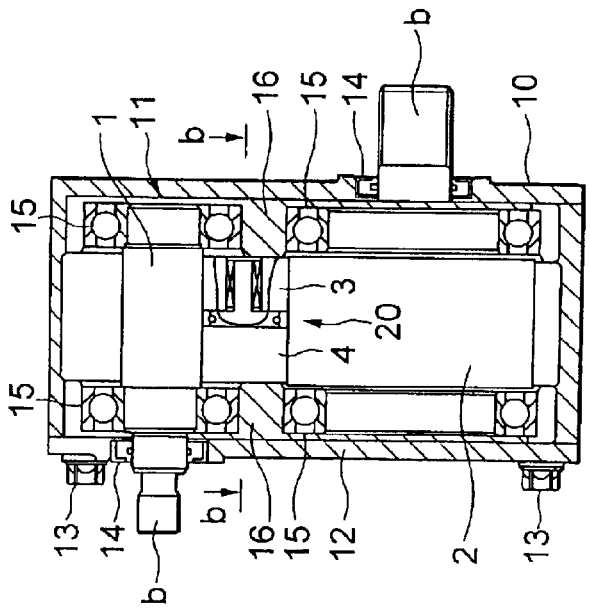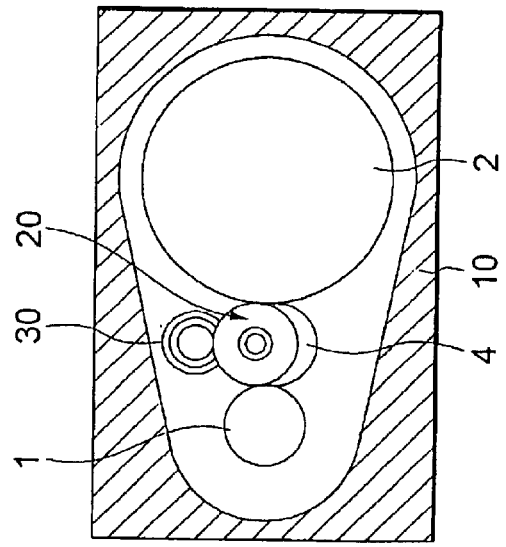

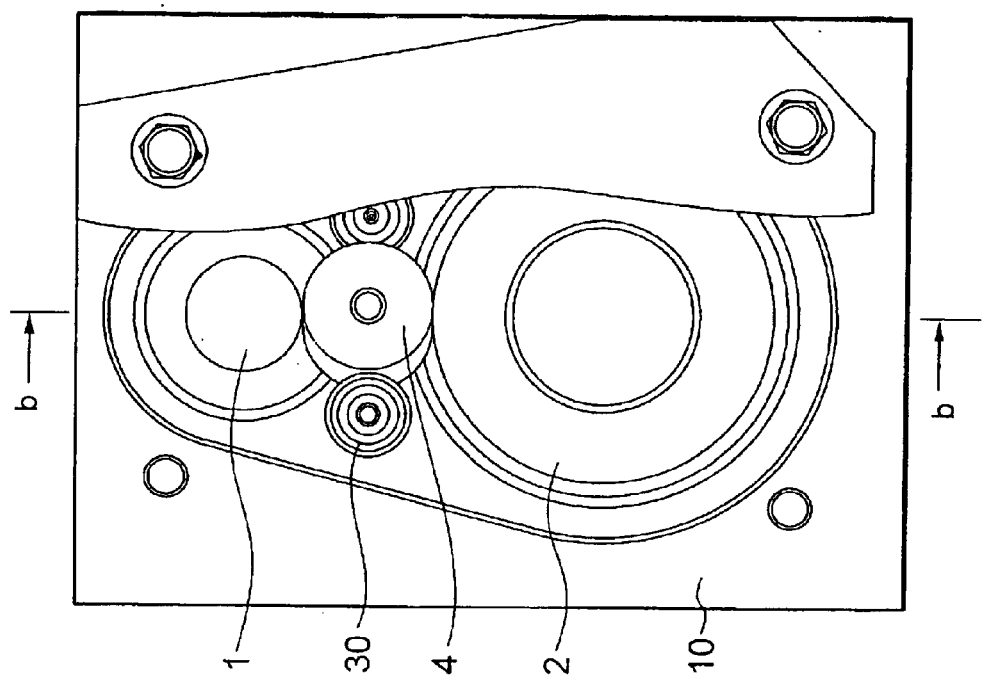
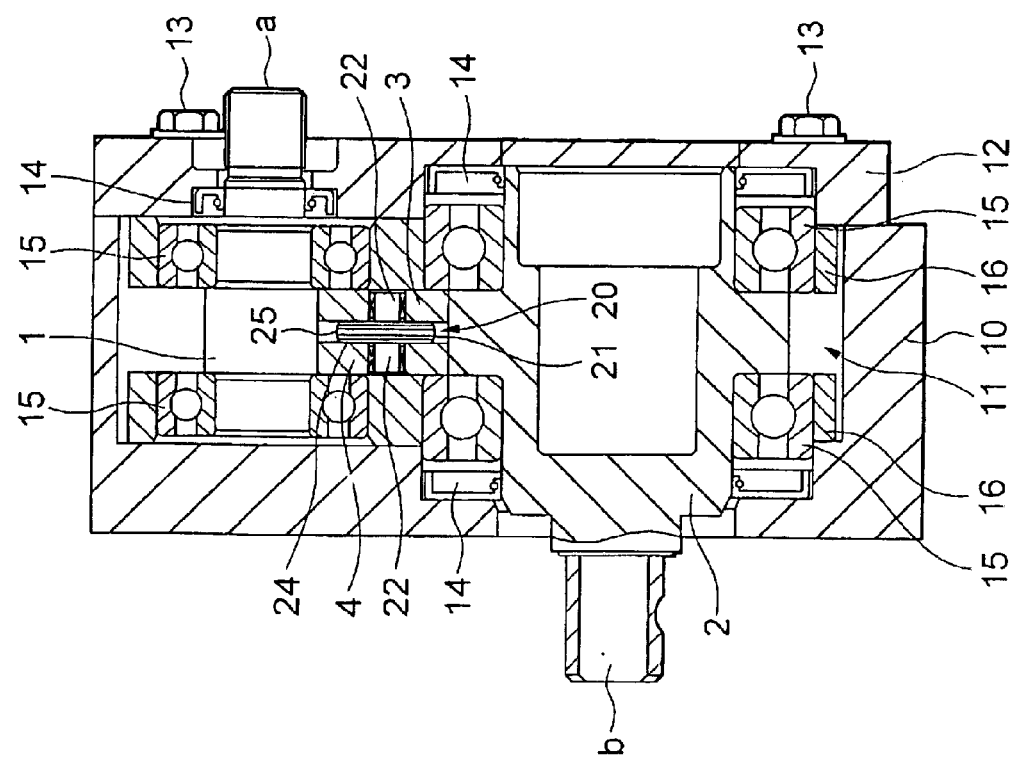

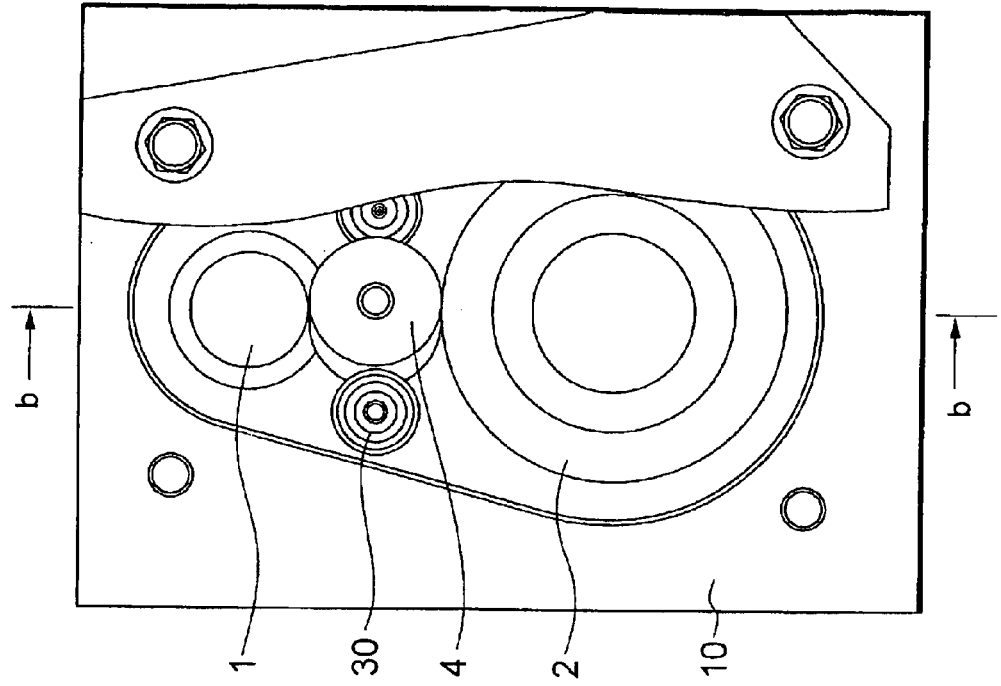
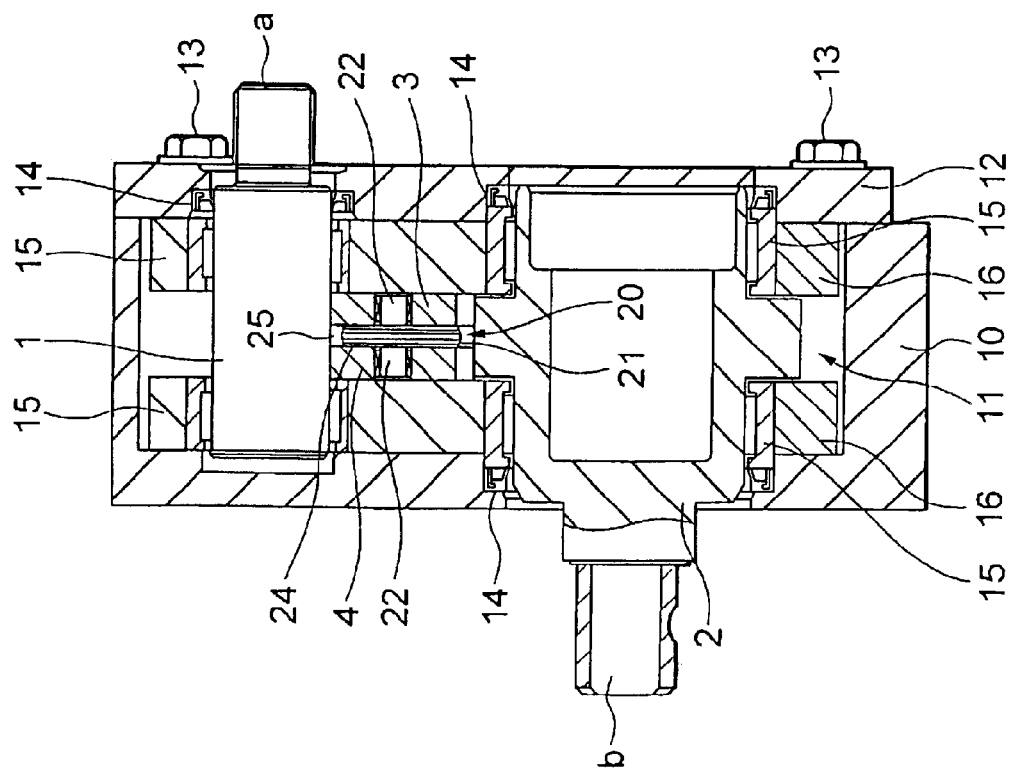

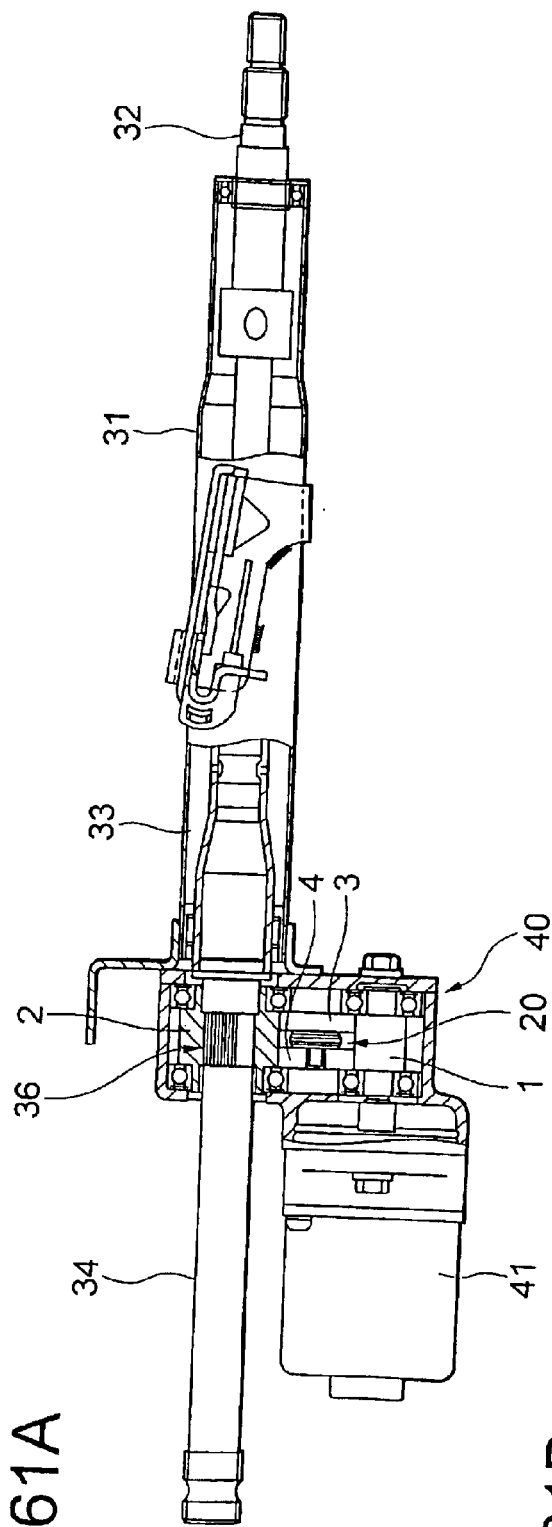
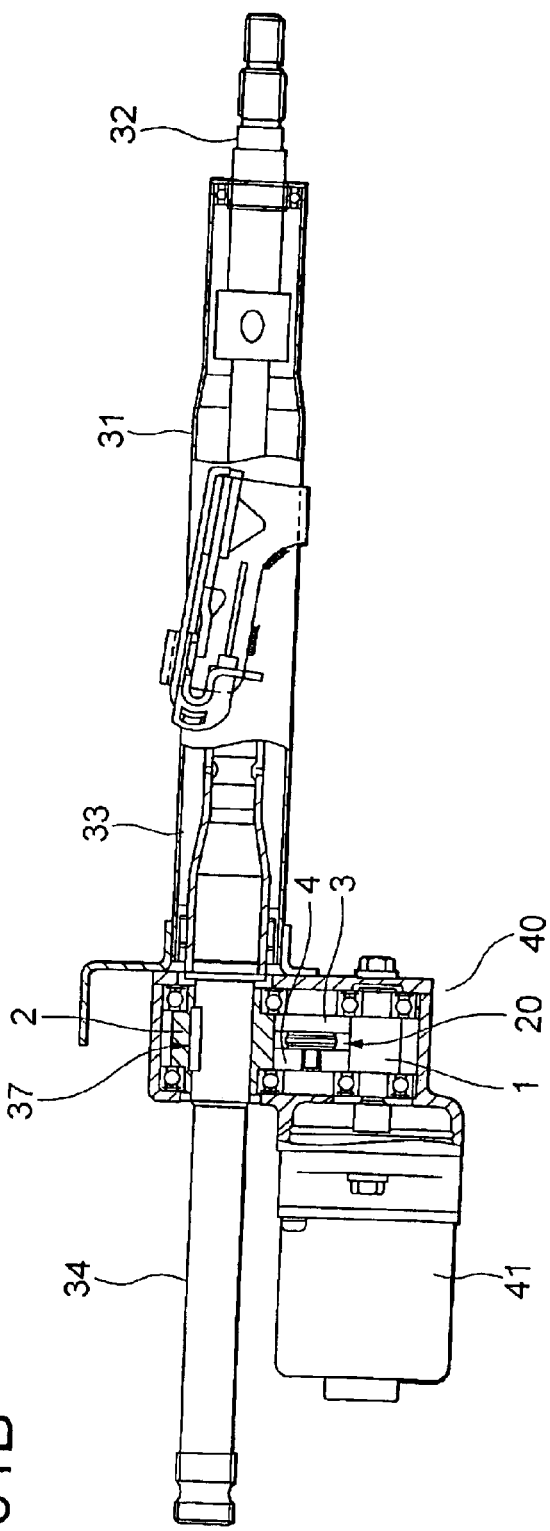
FIG. 61A
FIG. 61B

DISTANCE BETWEEN THE SHAFTS
LARGE ──────────────► SMALL

GEAR RATIO
LARGE ──────────────► SMALL

FRICTIONAL ROLLER TRANSMISSION

This application claims the benefit of Japanese Patent Applications No. 2001-110366, No. 2001-141463, No. 2001-159207, No. 2001-159198, No. 2001-159162, No. 2002-039093, No. 2002-045332 and No. 2002-045338 which are hereby incorporated by reference.

BACKGROUND OF THE INVENTION

1. Field of the Invention

The present invention relates to a frictional roller transmission.

2. Related Background Art

As a transmission for transmitting an engine power between shafts, a geared transmission is generally and widely used. In the geared transmission, an appropriate backlash is inevitably required for a smooth operation because of a configurational error, or the like, in manufacturing of the gear. However, when the geared transmission is used in a case when the transmission is to be frequently rotated forward and backward, the gear surface is impacted when the rotational direction is reversed due to the backlash, thereby generating a noise.

To cope with this inconvenience, there is conventionally known a frictional roller transmission, as power transmission means with no play (backlashless), which presses rollers to use a frictional force therebetween, thereby transmitting the power. For example, in a planetary roller reduction gear, planetary rollers which are disposed around the central roller and a ring roller inscribing the planetary rollers therein are assembled by shrinkage fit, or the like, with an interference so that a predetermined pressurizing power is generated between the rollers owing to elastic deformation of the respective rollers, thereby transmitting the engine power.

In a normal frictional roller transmission, a predetermined inter-roller pressing force is caused to work to generate a frictional force for power transmission. For this reason, the power transmission can be carried out only to the extent of the initially set pressing force, so that it is necessary to apply at the initial stage a very large pressing force which is corresponding to the maximum possible transmission torque.

However, in the normal frictional roller transmission, since it always has a very large pressing load applied thereon, an internal loss due to repeated elastic deformation upon rotation is generated irrespective of an actual transmission torque, and moreover, a loss due to an increase of a working torque of a bearing for receiving the load is also generated. As a result, there arises a problem that the working torque becomes very large, so that in an area in which a transmission torque is small, a loss is large and the efficiency in transmission becomes very poor.

According to Japanese Patent Application Laid-Open No. 6-135339, between a frictional roller on an input side and a frictional roller on an output side, there is interposed torque-restricting intermediate roller which transmits torque and is separated from the above both rollers when receiving torque having a predetermined magnitude or more. With this arrangement, when receiving the torque having the predetermined magnitude or more, the intermediate roller is separated from the both rollers so that an excessively large torque does not work on the respective rollers.

Further, according to Japanese Patent Application Laid-Open No. 6-288453, there is disclosed a torque cam transmission (perpendicular type rolling transmission device) as a transmission for working a pressing load in response to a transmission torque. This transmission device is effective for adjusting the pressing force in one-directional rotation, but has a defect that, if this transmission device is of a transmission direction reversible type, a large displacement of the roller for changing a cam surface is generated upon reversal of the rotational direction of the torque cam. As a result, there is a problem that a transmission delay or a colliding sound between the cam surface and the roller is produced.

Also, according to Japanese Patent Application Laid-Open No. 2000-16313 or Japanese Patent Application Laid-Open No. 2000-16314, there is disclosed a wedge roller transmission in which a ring roller and a sun roller are made slightly eccentric to each other in a planetary roller transmission to provide a planetary roller with a wedge effect, thereby obtaining a pressing power corresponding to the torque. However, this transmission has a problem that it can transmit the engine power only in one-directional rotation.

SUMMARY OF THE INVENTION

A first invention of the present application is contrived by taking the above circumstances into consideration, and an object thereof is to provide a frictional roller transmission which is capable of torque transmission without creating a delay or colliding sound even when the direction of rotation is reversed.

According to the first invention, there is provided a frictional roller transmission characterized in that:

a first roller and a second roller are disposed around two shafts which are separated from each other in such a manner that the two rollers are not brought into contact;

a third roller and a fourth roller which are brought into contact with both the first and second rollers are disposed between said first roller and said second roller and on an opposite side over a line for connecting the center of said first roller and that of said second roller; and an angle which is made by a tangential line between said first roller and said third roller (or said fourth roller) and a tangential line between said second roller and said third roller (or said fourth roller) is set at two times as large as an angle of friction which is obtained from a coefficient of friction between said respective rollers or smaller.

In the frictional roller transmission according to the first invention, the shaft of said first roller and the shaft of said second roller can be preferably made parallel to each other.

In the frictional roller transmission according to the first invention, the diameter of said third roller and the diameter of said fourth roller can be preferably made larger than the shortest distance between the peripheral surfaces of the first roller and the second roller.

Further, in the frictional roller transmission according to the first invention, a frictional portion thereof can be preferably disposed outside each of the rollers.

Still further, in the frictional roller transmission according to the first invention, the frictional portion thereof can be preferably disposed inside either one of the first roller and the second roller.

Still further, the frictional roller transmission according to the first invention can be used in an electric power steering apparatus.

Still further, in the frictional roller transmission according to the first invention, it is preferable that a coefficient of linear expansion of a housing is equal to that of each roller.

Still further, in the frictional roller transmission according to the first invention, it is possible to use the first and second rollers both in forward and backward rotations by overlapping the third and fourth rollers thereon.

According to the present invention, it is possible to constitute a transmission path from the first roller to the third roller, and to the second, in turn, and another transmission path from the first roller to the fourth roller and to the second roller, thereby allowing both the forward and backward rotations in a backlashless frictional roller transmission. It is also possible to minimize an increment of a working torque by generating a roller pressing power corresponding to a transmission torque, whereby the efficiency in an area of low transmission torque can be particularly improved. In addition, since each of the rollers for power transmission is arranged for each direction of rotation to be brought into contact to each other, it is possible to carry out torque transmission even when the direction of rotation is reversed without generating a delay or a colliding sound.

An object of a second invention of the present application is to provide a frictional roller transmission which is capable of preventing an increase of a working torque by restraining the third and fourth roller from being close to each other within a predetermined distance and giving a necessary initial thrust load which is required for stabilizing the starting operation.

In order to achieve the above object, according to the second invention, there is provided a frictional roller transmission characterized in that:

a first roller and a second roller are disposed around two shafts which are separated from each other in such a manner that the two rollers are not brought into contact;

a third roller and a fourth roller which are brought into contact with both the first and second rollers are disposed between said first roller and said second roller and on an opposite side over a line connecting the center of said first roller and that of said second roller;

an angle which is made by a tangential line between said first roller and said third roller (or said fourth roller) and a tangential line between said second roller and said third roller (or said fourth roller) is set at two times as large as an angle of friction which is obtained from a coefficient of friction between said respective rollers or smaller; and which transmission further comprises:

a member for rotatably holding the third roller;

a member for rotatably holding the fourth roller; and an elastic member for applying an elasticity in a direction in which the both members are close to each other and for coupling the both members to each other, an axial distance between the third and the fourth rollers being not less than a predetermined distance.

As described, according to the second invention of the present application, the third roller and the fourth roller are restrained from being close to each other within a predetermined distance and the necessary initial thrust load is applied for stabilizing the starting operation, so that an increase of the working torque can be prevented.

An object of a third invention of the present application is to provide a frictional roller transmission which is capable of preventing a damage of a transmission path which may be caused by an excessive torque by limiting a displacement of the third roller into a predetermined amount to prevent riding-over, thereby preventing torque transmission in not less than a predetermined amount.

According to the third invention of the present application, there is provided a frictional roller transmission characterized in that:

a first roller and a second roller are disposed around two shafts which are separated from each other in such a manner that the two rollers are not brought into contact;

a third roller and a fourth roller which are brought into contact with both the first and second rollers are disposed between said first roller and said second roller and on an opposite side over a line connecting the center of said first roller and that of said second roller;

an angle which is made by a tangential line between said first roller and said third roller (or said fourth roller) and a tangential line between said second roller and said third roller (or said fourth roller) is set at two times as large as an angle of friction which is obtained from a coefficient of friction between said respective rollers or smaller; and a back-up roller is provided to be contacted to the third and fourth rollers for limiting an amount of displacement of these rollers into a predetermined amount.

As described above, according to the friction roller transmission of the third invention, it is possible to prevent a damage of a transmission path which may be caused by an excessive torque by limiting a displacement of the third roller into a predetermined amount to prevent riding-over, thereby preventing torque transmission in not less than a predetermined amount.

An object of a fourth invention of the present application is to provide a frictional roller transmission which is capable of reducing its weight.

According to the fourth invention of the present application, there is provided a frictional roller transmission characterized in that:

a first roller and a second roller are disposed around two shafts which are separated from each other in such a manner that the two rollers are not brought into contact;

a third roller and a fourth roller which are brought into contact with both the first and second rollers are disposed between said first roller and said second roller and on an opposite side over a line connecting the center of said first roller and that of said second roller;

an angle which is made by a tangential line between said first roller and said third roller (or said fourth roller) and a tangential line between said second roller and said third roller (or said fourth roller) is set at two times as large as an angle of friction which is obtained from a coefficient of friction between said respective rollers or smaller; and two coupling plates for coupling bearings for rotatably support the first roller and the second roller to each other at the both end portions of the both rollers are formed of a material having substantially the same coefficient of linear expansion as that of said rollers.

As described, according to the frictional roller transmission of the fourth invention, it is possible to reduce the weight of the transmission since the two coupling plates for coupling the bearings which rotatably support the first roller and the second roller respectively at the both end portions of the both rollers are formed of the material having substantially the same coefficient of linear expansion as that of each roller.

An object of a fifth invention is to provide a frictional roller transmission in which a distance between the two coupling plates each for coupling the two bearings which rotatably support, respectively, a first roller and a second roller can be set at a desirable value.

In order to achieve the last mentioned object, according to the fifth invention, there is provided a frictional roller transmission, characterized in that:

a first roller and a second roller are disposed around two shafts which are separated from each other to be in parallel in such a manner that the two rollers are not brought into contact;

a third roller and a fourth roller which are brought into contact with both the first and second rollers are disposed between said first roller and said second roller and on an opposite side over a line for connecting the center of said first roller and that of said second roller;

an angle which is made by a tangential line between said first roller and said third roller (or said fourth roller) and a tangential line between said second roller and said third roller (or said fourth roller) is set to be two times as large as an angle of friction which is obtained from a coefficient of friction between said respective rollers or smaller; and setting members are further provided for setting the distance between the two coupling plates each for coupling two bearings to each other which rotatably support the first roller and the second roller, respectively, at the both end portions of the both rollers at a desirable value.

As described above, according to the fifth invention, the distance between the coupling plates each for coupling the bearings to each other which rotatably support the first roller and the second roller, respectively, at the both end portions of the both rollers, can be set at a desirable value.

An object of a sixth invention is to provide a steering column for an automobile, which is provided with a frictional roller transmission utilizing a wedge effect and serving as a speed reducing apparatus of an actuator.

In order to achieve the last mentioned object, according to the sixth invention, there is provided a steering column for an automobile, which is provided with a frictional roller transmission utilizing a wedge effect and serving as a speed reducing apparatus of an actuator, characterized in that:

said frictional roller transmission is adapted to transmit a motive power through at least two rollers.

According to a seventh invention, there is provided a steering column for an automobile, which is provided with a frictional roller transmission utilizing a wedge effect and serving as a speed reducing apparatus of an actuator, wherein:

said frictional roller transmission comprises:

a first roller and a second roller disposed around two shafts which are separated from each other to be in parallel in such a manner that the two rollers are not brought into contact;

a third roller and a fourth roller which are brought into contact with both the first and second rollers, being disposed between said first roller and said second roller and on an opposite side over a line for connecting the center of said first roller and that of said second roller; and an angle which is made by a tangential line between said first roller and said third roller (or said fourth roller) and a tangential line between said second roller and said third roller (or said fourth roller) being set to be two times as large as an angle of friction which is obtained from a coefficient of friction between said respective rollers or smaller.

As described above, according to the sixth and seventh inventions, it is possible to provide a steering column for an automobile, which is provided with a frictional roller transmission utilizing a wedge effect and serving as a speed reducing apparatus of an actuator.

BRIEF DESCRIPTION OF THE DRAWINGS

FIG. 1A is a side view of a frictional roller transmission (speed reducing apparatus) according to a first embodiment of the present invention, and FIG. 1B is a schematic perspective view of the frictional roller transmission (speed reducing apparatus) shown in FIG. 1A;

FIG. 3A is a side view of a frictional roller transmission (speed reducing apparatus) according to a second embodiment of the present invention, and FIG. 3B is a schematic perspective view of the frictional roller transmission (speed reducing apparatus) shown in FIG. 3A;

FIGS. 5A and 5B are views for showing a frictional roller transmission (speed reducing apparatus) according to a third embodiment of the present invention, in which FIG. 5A is a frontal cross sectional view and FIG. 5B is a lateral cross sectional view of this frictional roller transmission;

FIGS. 6A through 6D are views for showing a frictional roller transmission (speed reducing apparatus) according to a fourth embodiment of the present invention, in which FIG. 6A is a lateral cross sectional view of the transmission, FIG. 6B is a cross sectional view along line b—b in FIG. 6A, FIG. 6C is a cross sectional view along line c—c in FIG. 6B, and FIG. 6D is a perspective view of a spring;

FIGS. 7A through 7D are views for showing a frictional roller transmission (speed reducing apparatus) according to a fifth embodiment of the present invention, in which FIG. 7A is a lateral cross sectional view of the transmission, FIG. 7B is a cross sectional view along line b—b in FIG. 7A, FIG. 7C is a cross sectional view along line c—c in FIG. 7D, and FIG. 7D is a cross sectional view along line d—d in FIG. 7B;

FIGS. 8A through 8C are views for showing a frictional roller transmission (speed reducing apparatus) according to a sixth embodiment of the present invention, in which FIG. 8A is a lateral cross sectional view of the transmission, FIG. 8B is a cross sectional view along line b—b in FIG. 8A, and FIG. 8C is a cross sectional view along line c—c in FIG. 8B;

FIGS. 11A through 11C are views for showing a frictional roller transmission (speed reducing apparatus) according to an eighth embodiment of the present invention, in which FIG. 11A is a lateral cross sectional view of the transmission, FIG. 11B is a cross sectional view along line b—b in FIG. 11A, and FIG. 11C is a cross sectional view along line c—c in FIG. 11B;

FIGS. 12A through 12C are exploded cross sectional views respectively showing the third and the fourth rollers;

FIGS. 16A through 16C are views for showing a frictional roller transmission (speed reducing apparatus) according to a tenth embodiment of the present invention, in which FIG. 16A is a partially cut-away side view of the transmission, FIG. 16B is a cross sectional view along line b—b in FIG. 16A, and FIG. 16C is a cross sectional view along line c—c in FIG. 16A;

FIGS. 17A and 17B are views related to a first example of the frictional roller transmission (speed reducing apparatus) according to the tenth embodiment of the present invention, in which FIG. 17A is an exploded cross sectional view of the third and fourth rollers, and FIG. 17B is a side view showing an assembled state of the third and fourth rollers;

FIG. 18 is an exploded perspective view of the third and fourth rollers shown in FIGS. 17A and 17B;

FIGS. 19A and 19B are views related to a second example of the frictional roller transmission (speed reducing apparatus) according to the tenth embodiment of the present invention, in which FIG. 19A is an exploded cross sectional view of the third and fourth rollers, and FIG. 19B is a side view showing an assembled state of the third and fourth rollers;

FIGS. 21A and 21B are views related to a third example of the frictional roller transmission (speed reducing apparatus) according to the tenth embodiment of the present invention, in which FIG. 21A is an exploded cross sectional view of the third and fourth rollers, and FIG. 21B is a side view showing an assembled state of the third and fourth rollers;

FIGS. 23A and 23B are views related to a fourth example of the frictional roller transmission (speed reducing apparatus) according to the tenth embodiment of the present invention, in which FIG. 23A is an exploded cross sectional view of the third and fourth rollers, and FIG. 23B is a side view showing an assembled state of the third and fourth rollers;

FIGS. 25A and 25B are views related to a fifth example of the frictional roller transmission (speed reducing apparatus) according to the tenth embodiment of the present invention, in which FIG. 25A is an exploded cross sectional view of the third and fourth rollers, and FIG. 25B is a side view showing an assembled state of the third and fourth rollers;

FIGS. 27A through 27D are views for showing a frictional roller transmission (speed reducing apparatus) according to an eleventh embodiment of the present invention, in which FIG. 27A is a lateral cross sectional view of the transmission, FIG. 27B is a cross sectional view along line b—b in FIG. 27A, FIG. 27C is a cross sectional view along line c—c in FIG. 27B, and FIG. 27D is a cross sectional view along line d—d in FIG. 27B;

FIGS. 28A through 28D are views of a frictional roller transmission (speed reducing apparatus) according to a variation of the eleventh embodiment of the present invention, in which FIG. 28A is a lateral cross sectional view of the transmission, FIG. 28B is a cross sectional view along line b—b in FIG. 28A, FIG. 28C is a cross sectional view along line c—c in FIG. 28B, and FIG. 28D is a cross sectional view along line d—d in FIG. 28B;

FIGS. 35A through 35C are views of a frictional roller transmission (speed reducing apparatus) according to a thirteenth embodiment of the present invention, in which FIG. 35A is a lateral cross sectional view of the transmission, FIG. 35B is a cross sectional view along line b—b in FIG. 35A, and FIG. 35C is a cross sectional view along line c—c in FIG. 35B;

FIGS. 40A and 40B are views for showing a frictional roller transmission (speed reducing apparatus) according to a fifteenth embodiment of the present invention, in which FIG. 40A is a side view thereof partially cut-away, and FIG. 40B is a cross sectional view taken along line b—b in FIG. 40A;

FIGS. 41A and 41B are views for showing a frictional roller transmission (speed reducing apparatus) according to the sixteenth embodiment of the present invention, in which FIG. 41A is a side view thereof partially cut-away, and FIG. 41B is a cross sectional view taken along line b—b in FIG. 41A;

FIGS. 58A and 58B are views for showing a frictional roller transmission (speed reducing apparatus) according to a twenty-fifth embodiment of the present invention, in which FIG. 58A is a side view thereof partially cut-away, and FIG. 58B is a cross sectional view taken along line b—b in FIG. 58A;

FIGS. 61A and 61B are, respectively, a longitudinal cross-sectional view of a steering column for an automobile according to a twenty-seventh embodiment of the present invention and a longitudinal cross-sectional view of a steering column for an automobile according to a twenty-eighth embodiment of the present invention;

FIGS. 63A through 63D are views for showing a steering column for an automobile according to a thirtieth embodiment of the present invention, in which FIG. 63A is a front view, FIG. 63B is a longitudinal cross-sectional view, FIG. 63C is a back side view partially cut-away, and FIG. 63D is a lateral cross-sectional view of the steering column.

DETAILED DESCRIPTION OF THE PREFERRED EMBODIMENTS

Description will be made on a frictional roller transmission (speed reducing apparatus) according to an embodiment of the present invention with reference to the drawings.
(First Embodiment)

Figure 2B:
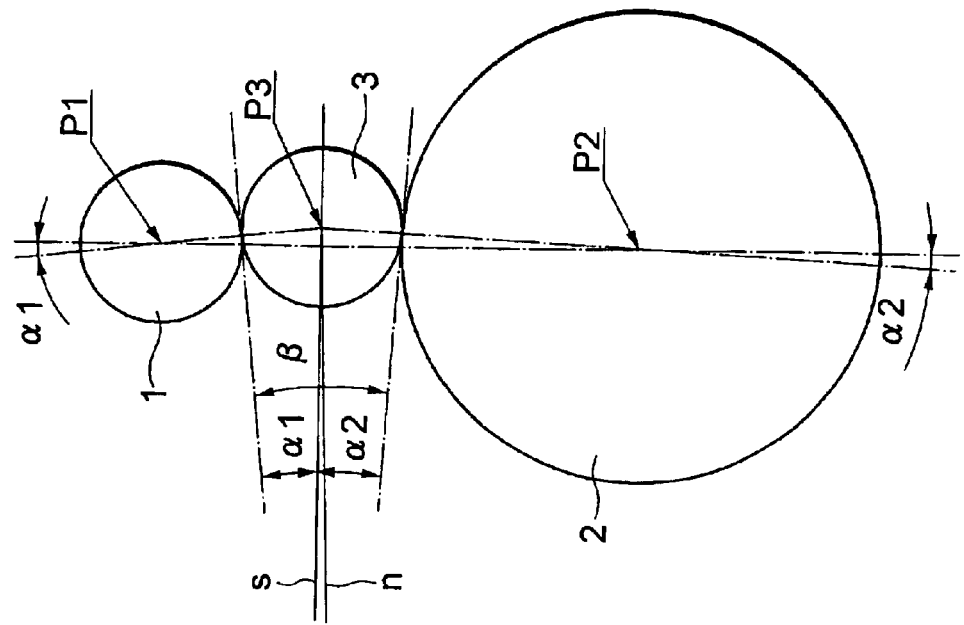
FIG. 2B is a side view of the same (a view for showing a transmission path from the first roller to the third roller, and then to the second roller)
Figure 2A:
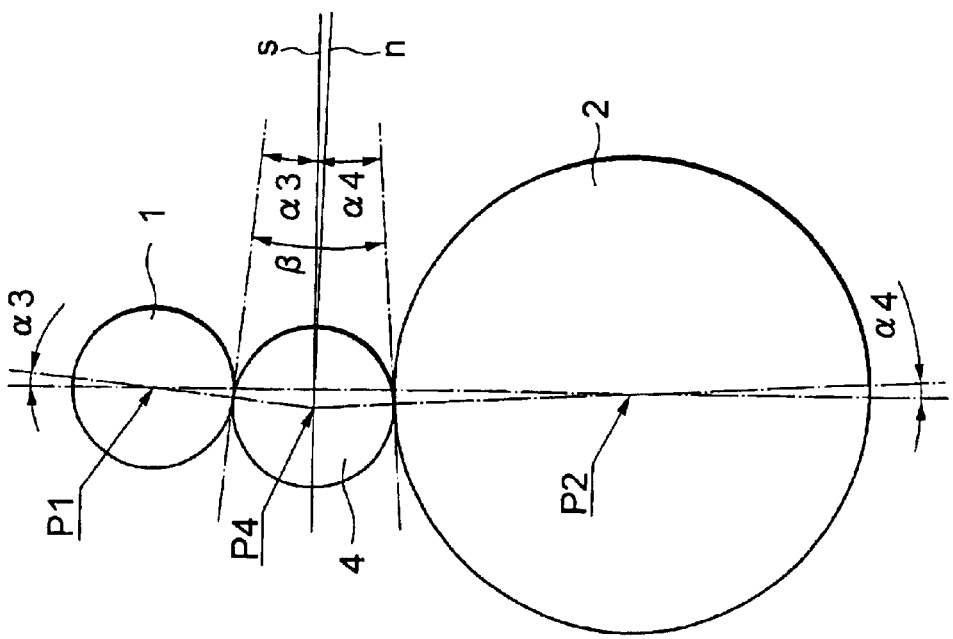
FIG. 2A is a side view of the frictional roller transmission (speed reducing apparatus) according to the first embodiment of the present invention (a view for showing a transmission path from the first roller to the fourth roller, and then to the second roller)

FIG. 1A is a side view of a frictional roller transmission (speed reducing apparatus) according to the first embodiment of the present invention, and FIG. 1B is a schematic perspective view of the frictional roller transmission (speed reducing apparatus) shown in FIG. 1A. FIG. 2A is a side view of the frictional roller transmission (speed reducing apparatus) according to the first embodiment of the present invention (a view for showing a transmission path from the first roller to the fourth roller, and then to the second roller), and FIG. 2B is a side view of the same (a view for showing a transmission path from the first roller to the third roller, and to the second roller).

According to this first embodiment, in the frictional roller transmission (speed reducing apparatus), as shown in FIGS. 1A and 1B and FIGS. 2A and 2B, on two shafts a and b which are separated from each other to be in parallel, there are provided a first roller 1 having a small diameter and a second roller 2 having a large diameter respectively being around the above shafts so as not to be brought into contact.

Between the first roller 1 and the second roller 2 and on the opposite side thereto over a line which connects the center of the first roller to that of the second roller, a third roller 3 and a fourth roller 4 both having the equal diameter are preferably disposed to be in parallel to each other so as to be in contact with both the first and the second rollers 1 and 2.

Both of the diameter of the third roller 3 and that of the fourth roller 4 are larger than the shortest distance between the peripheral surface of the first roller 1 and that of the second roller 2.

An angle which is formed by a tangential line between the first roller 1 and the third roller 3 (or the fourth roller 4) and a tangential line between the second roller 2 and the third roller 3 (or the fourth roller 4) is not more than two times as large as a frictional angle which is obtained from a coefficient of friction between the rollers, and the frictional portion thereof is arranged to be outside of each roller.

In other words, it is determined that, when the centers of the rollers are P1 to P4, a sum of an angle which is formed by the line P1P2 and the line P1P3 ($\alpha 1: \angle P2P1P3$) and the line P1P2 and the line P2P3($\alpha 2: \angle P1P2P3$), and a sum of an angle which is formed by the line P1P2 and the line P1P4 ($\alpha 3$:∠P2P1P4) and the line P1P2 and the line P2P4 ($\alpha 4$:∠P1P2P4) are not more than two times as large as the frictional angle ($\theta=\tan^{-1} \mu$).

That is, $\beta=\alpha 1+\alpha 2 \leq 2 \cdot \tan^{-1} \mu$ and $\beta=\alpha 3+\alpha 4 \leq 2 \cdot \tan^{-1} \mu$.

Note that an angle of contact can be defined as an angle which is formed with a perpendicular line for connecting the center of the first roller and that of the second roller (s is the fiducial line). However, the magnitude of a contact force which acts on a contact portion is equal in the both parts, so that the resultant force acts in a direction of a bisector (n) of an angle formed by and between the respective tangential lines. The direction of the fiducial line (s) which defines the angle of contact and the direction of this bisector (n) are coincident with each other when the diameter of the input roller and that of the output roller are equal to each other. However, if there is a difference between the two diameters, the forces in the two normal directions acting on a wedge roller from the input and output rollers in the contact portion (the direction for connecting the centers) are also well balanced on the basis of the bisector (a surface containing n) since the angle formed with the aforementioned bisector (n) are equal to each other. On the basis of the force acting on the wedge roller, the angle of contact should be defined based on a line (surface) on which the forces in the normal directions on the contact portions are balanced.

With this arrangement, since the frictional angle is small, it is inevitable to dispose the third and fourth rollers 3 and 4 to be overlapped each other in the axial direction.

In the above arrangement, a pressing force corresponding to transmission torque can be obtained. Accordingly, a pressing force which is required for the transmission of friction (for pressing the third and fourth rollers 3 and 4 against the first and second rollers 1 and 2) is no longer required. However, it is preferable to apply a slight pressing force for maintaining the initial contacted state in a non-rotating state. Each of these rollers may be constituted by a single roller only, or may be constituted by a plurality of rollers.

Description will be made on a mode of operation with the first roller as an input roller.

As shown in FIG. 1B and FIG. 2B, when the first roller 1 is rotated clock-wise (in the CW direction), the tangential line between the third roller 3 and the first roller 1 and the tangential line between the third roller 3 and the second roller 2 form an angle which is not more than two times as large as the frictional angle, so that each angle of contact is not larger than the frictional angle and the third roller 3 and the first roller 1 do not slide relative to each other on a contact portion. As a result, the third roller 3 is affected by a tangential force from the first roller 1. This tangential force works in a direction in which the third roller 3 approaches the first roller 1, so that the third roller 3 receives the rotating force in the counter clock-wise direction (the CCW direction) owing to this tangential force.

On a contact portion between the third roller 3 and the second roller 2, the tangential line between the third roller 3 and the first roller 1 and the tangential line between the third roller 3 and the second roller 2 form an angle which is not more than two times as large as the frictional angle, so that each frictional angle is not more than the frictional angle. As a result, the third roller 3 and the second roller 2 do not slide relative to each other on the contact portion. For this reason, the second roller 2 is affected by the tangential force from the third roller 3 so that the rotating force in the CW rotating direction is transmitted. As a reaction thereof, another tangential force contrary to the above is generated in the third roller 3. This tangential force works in a direction in which the third roller 3 approaches the second roller 2.

The tangential force working on the third roller 3 acts in a direction in which the third roller 3 is pressed against the first and second rollers 1 and 2. Thus, it is possible to obtain the tangential force to be transmitted, that is, an pressing power corresponding to the torque.

In this case, as shown in FIG. 2A, on the fourth roller 4, no relative slide is generated in a contact portion thereof. Thus, though the fourth roller 4 receives the tangential force from the first and second rollers 1 and 2, the direction of this force is a direction in which the fourth roller 4 is separated from the first and second rollers 1 and 2, so that the fourth roller 4 is only rotated while being in contact with the first roller 1 and the second roller 2.

Next, as shown in FIG. 1B and FIG. 2A, when the first roller 1 is conversely rotated in the CCW direction, the function of the fourth roller 4 is replace with that of the third roller 3. However, the fourth roller 4 has been already in contact with the first roller 1 and the second roller 2, so that it is possible to convert the direction of transmission of the engine power smoothly upon reversal of the rotating direction.

Also, in order to carry out torque transmission, it is suffice if the third and fourth rollers 3 and 4 are in a contacted state with the first and second rollers 1 and 2. In order to secure the contacted state, the third and fourth rollers 3 and 4 may be slightly pressed against the first and second rollers 1 and 2.

As described above, according to the first embodiment, it is possible to constitute a transmission path from the first roller 1 to the third roller 3, and further to the second roller 2, and another transmission path from the first roller 1 to the fourth roller 4 and further to the second roller 2, so as to allow reversal of direction of rotation in the backlashless frictional roller transmission (speed reducing apparatus). Also, since the roller pressing force corresponding to the transmission torque is generated, it is possible to minimize an increment of the working torque. It is also possible to improve the efficiency particularly in an area with low transmission torque. In addition, since the rollers for power transmission are arranged for every rotational direction and are contacted with each other all the time, the torque transmission can be carried out without a delay or a colliding sound even when the rotational direction is reversed.

(Second Embodiment)

Figure 4B:
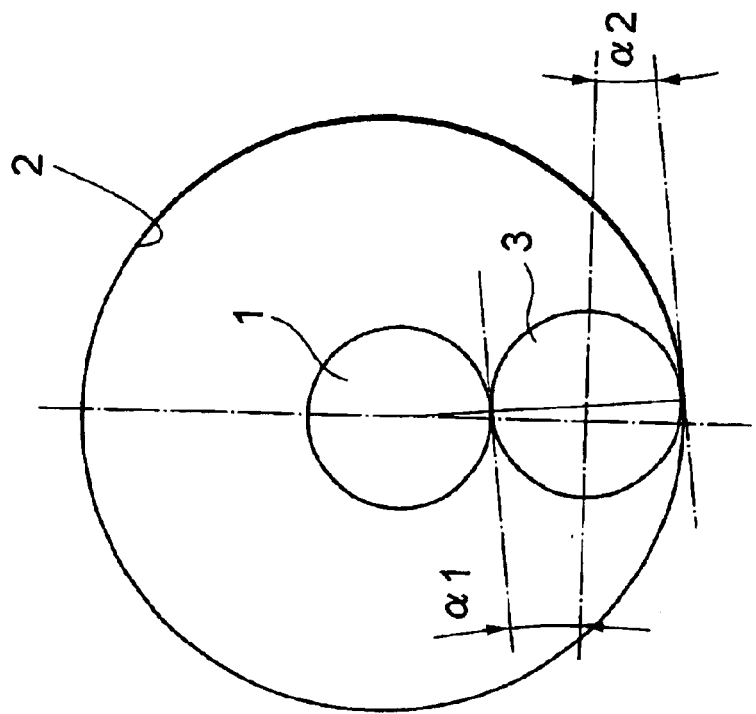
FIG. 4B is a side view of the same (a view for showing a transmission path from the first roller to the third roller, and to the second roller)
Figure 4A:
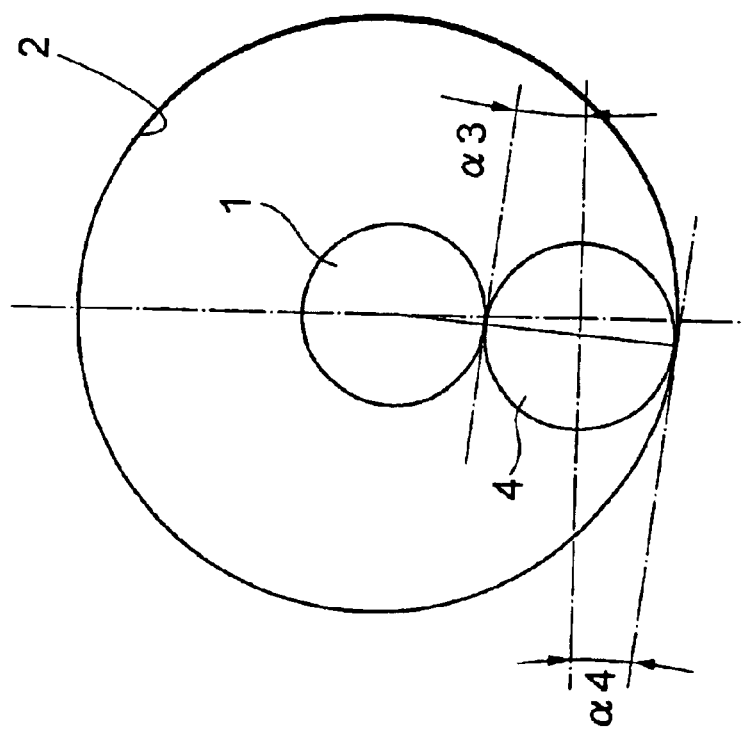
FIG. 4A is a side view of the frictional roller transmission (speed reducing apparatus) according to the second embodiment of the present invention (a view for showing a transmission path from the first roller to the fourth roller, and then to the second roller)

FIG. 3A is a side view of a frictional roller transmission (speed reducing apparatus) according to the second embodiment of the present invention, and FIG. 3B is a schematic perspective view of the frictional roller transmission (speed reducing apparatus) shown in FIG. 3A. FIG. 4A is a side view of the frictional roller transmission (speed reducing apparatus) according to the second embodiment of the present invention (a view for showing the transmission path from the first roller to the fourth roller, and to the second roller), and FIG. 4B is a side view of the same (a view for showing the transmission path from the first roller to the third roller, and to the second roller).

In the frictional roller transmission (speed reducing apparatus) according to the second embodiment, as shown in FIGS. 3A and 3B and FIGS. 4A and 4B, on the two shafts a and b which are separated from each other to be in parallel, the first roller 1 having a small diameter and the second roller 2 having a large diameter respectively being around the above shafts are disposed so as not to be brought into contact, and the third roller 3 and the fourth roller 4 which are arranged to be in contact with both the first and second rollers 1 and 2 are disposed between the first roller 1 and the second roller 2. Between the first roller 1 and the second roller 2 and on the opposite side thereto over a line which connects the center of the first roller to that of the second roller, a third roller and a fourth roller both having the equal diameter are disposed to be in parallel to each other so as to be in contact with both the first and the second rollers 1 and 2. Both of the diameter of the third roller and that of the fourth roller are larger than the shortest distance between the peripheral surface of the first roller and that of the second roller. An angle which is formed by a tangential line between the first roller 1 and the third roller 3 (or the fourth roller 4) and a tangential line between the second roller 2 and the third roller 3 (or the fourth roller 4) is not more than two times as large as a frictional angle which is obtained from a coefficient of friction between the rollers, and the frictional portion thereof is arranged to be inside of each roller.

Specifically, it is arranged such that a roller is developed to a wedge roller usable in both-directional rotation, the axial distance is set to be smaller than a sum of radiuses of the first roller 1 and the second roller 2, and the second roller 2 is assumed to be an inner peripheral surface. The frictional angle and the contact angle can be considered the same if an angle which is formed by and between a line perpendicular to the line for connecting the center of the first roller 1 and the center of the second roller 2 and each tangential line is assumed to be the contact angle.

As described above, also in the second embodiment, it is possible to constitute a transmission path from the first roller 1 to the third roller 3, and further to the second roller 2, and another transmission path from the first roller 1 to the fourth roller 4 and further to the second roller 2. It is also possible, in the backlashless frictional roller transmission (speed reducing apparatus), to reverse the direction of rotation. Also, it is possible to minimize an increment of the working torque by generating the roller pressing force corresponding to the transmission torque. It is possible to improve the efficiency particularly in an area with low transmission torque. In addition, since the rollers for the power transmission are arranged for every rotational direction and are contacted with each other all the time, the torque transmission can be carried out without a delay or a colliding sound even when the rotational direction is reversed.

(Third Embodiment)

FIGS. 5A and 5B are views for showing a frictional roller transmission (speed reducing apparatus) according to the third embodiment of the present invention, in which FIG. 5A is a frontal cross sectional view and FIG. 5B is a lateral cross sectional view of this frictional roller transmission.

The third embodiment is to concretize the first embodiment, and has the same arrangement as that of the first embodiment with respect to the layout of the first to fourth rollers 1 to 4, the contact angle, and the frictional angle, except that the idle rollers (third and fourth rollers) are not pressed slightly.

In a pair of housings 10 and 11, an input shaft a is rotatably supported by a pair of bearings 12 and 13. Also, in the housings 10 and 11, an output shaft b is rotatably supported by a pair of bearings 14 and 15.

Note that the coefficient of linear expansion of the paired housings 10 and 11 and that of the first to fourth rollers 1 to 4 are set to be equal to each other.

As described above, also in the third embodiment, it is possible to constitute a transmission path from the first roller 1 to the third roller 3, and further to the second roller 2, and another transmission path from the first roller 1 to the fourth roller 4 and further to the second roller 2, and it is also possible, in the backlashless frictional roller transmission (speed reducing apparatus), to reverse the direction of rotation. Also, since the roller pressing force corresponding to the transmission torque is generated, it is possible to minimize an increment of the working torque. It is possible to improve the efficiency particularly in an area with low transmission torque. In addition, since the rollers for power transmission are arranged for every rotational direction and are contacted with each other all the time, the torque transmission can be carried out without a delay or a colliding sound even when the rotational direction is reversed.

(Fourth Embodiment)

FIGS. 6A through 6D are views for showing a frictional roller transmission (speed reducing apparatus) according to the fourth embodiment of the present invention, in which FIG. 6A is a lateral cross sectional view of the transmission, FIG. 6B is a cross sectional view along line b—b in FIG. 6A, FIG. 6C is a cross sectional view along line c—c in FIG. 6B, and FIG. 6D is a perspective view of a spring.

The fourth embodiment is to concretize the first embodiment, and has the same arrangement as that of the first embodiment with respect to the layout of the first to fourth rollers 1 to 4, the contact angle, and the frictional angle, in which the idle rollers (third and fourth rollers) are pressed slightly.

In a pair of housings 10 and 11, an input shaft a is rotatably supported by a pair of bearings 12 and 13. Also, in the housings 10 and 11, an output shaft b is rotatably supported by a pair of bearings 14 and 15.

Ring-shaped springs 20 are hooked respectively on the third and fourth rollers 3 and 4, whereby a slight pressing force is applied on the third and fourth rollers 3 and 4 to secure the initial contact.

Note that the coefficient of linear expansion of the paired housings 10 and 11 and that of the first to fourth rollers 1 to 4 are set to be equal to each other.

As described above, also in the fourth embodiment, it is possible to constitute a transmission path from the first roller 1 to the third roller 3, and further to the second roller 2, and another transmission path from the first roller 1 to the fourth roller 4 and further to the second roller 2. It is also possible, in the backlashless frictional roller transmission (speed reducing apparatus), to reverse the direction of rotation. Also, since the roller pressing force corresponding to the transmission torque is generated, it is possible to minimize an increment of the working torque. It is possible to improve the efficiency particularly in an area with low transmission torque. In addition, since the rollers for power transmission are arranged for every rotational directions and are contacted with each other all the time, the torque transmission can be carried out without a delay or a colliding sound even when the rotational direction is reversed.

(Fifth Embodiment)

FIGS. 7A through 7D are views for showing a frictional roller transmission (speed reducing apparatus) according to the fifth embodiment of the present invention, in which FIG. 7A is a lateral cross sectional view of the transmission, FIG. 7B is a cross sectional view along line b—b in FIG. 7A, FIG. 7C is a cross sectional view along line c—c in FIG. 7B, and FIG. 7D is a cross sectional view along line d—d in FIG. 7B.

The fifth embodiment is to concretize the first embodiment, and has the same arrangement as that of the first embodiment with respect to the layout of the first to fourth rollers 1 to 4, the contact angle, and the frictional angle, in which the idle rollers (third and fourth rollers) are pressed slightly.

In a pair of housings 10 and 11, an input shaft a is rotatably supported by a pair of bearings 12 and 13. Also, in the housings 10 and 11, an output shaft b is rotatably supported by a pair of bearings 14 and 15.

Pressing portions are provided respectively on the third and fourth rollers 3 and 4. In each of these pressing portions, a roller 31 is rotatably attached to the tip end of a rockable arm 30, and this roller 31 is elastically pressed against the third or fourth roller 3 or 4 by means of a spring 32, whereby a slight pressing force is applied on the third and fourth rollers 3 and 4 to secure the initial contact.

Note that the coefficient of linear expansion of the paired housings 10 and 11 and that of the first to fourth rollers 1 to 4 are set to be equal to each other.

As described above, also in the fifth embodiment, it is possible to constitute a transmission path from the first roller 1 to the third roller 3, and further to the second roller 2, and another transmission path from the first roller 1 to the fourth roller 4 and further to the second roller 2. It is also possible, in the backlashless frictional roller transmission (speed reducing apparatus), to reverse the direction of rotation. Also, since the roller pressing force corresponding to the transmission torque is generated, it is possible to minimize an increment of the working torque. It is possible to improve the efficiency particularly in an area with low transmission torque. In addition, since the rollers for power transmission are arranged for every rotational direction and are contacted with each other all the time, the torque transmission can be carried out without a delay or a colliding sound even when the rotational direction is reversed.

(Sixth Embodiment)

Figure 8C:
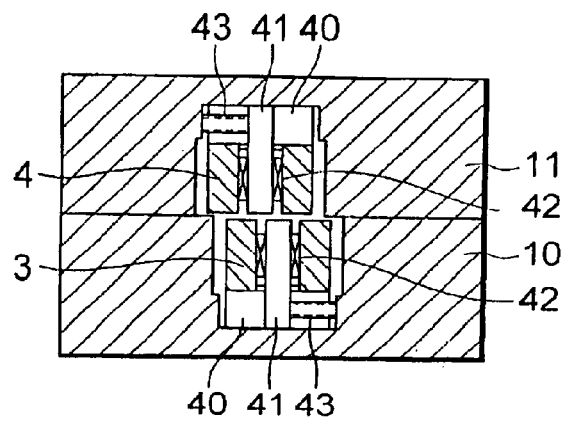
Figure 8A:
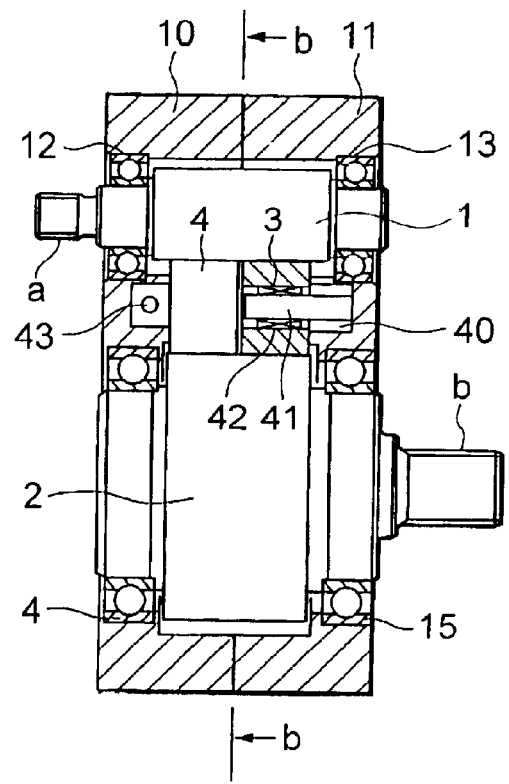
Figure 8B:
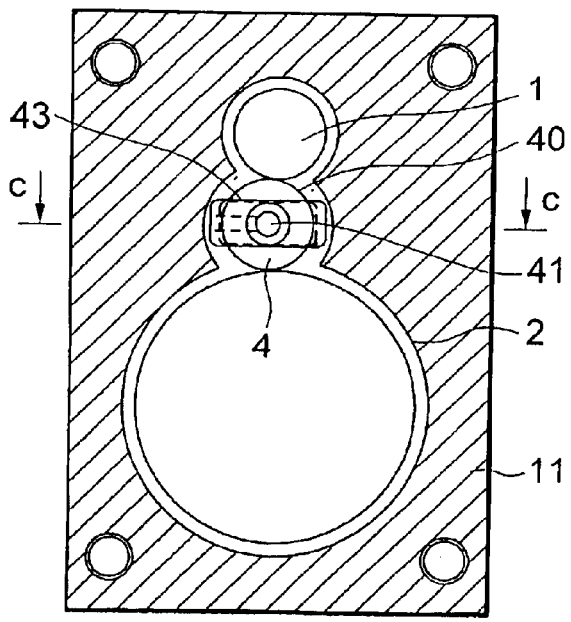

FIGS. 8A through 8C are views for showing a frictional roller transmission (speed reducing apparatus) according to the sixth embodiment of the present invention, in which FIG. 8A is a lateral cross sectional view of the transmission, FIG. 8B is a cross sectional view along line b—b in FIG. 8A, and FIG. 8C is a cross sectional view along line c—c in FIG. 8B.

The sixth embodiment is to concretize the first embodiment, and has the same arrangement as that of the first embodiment with respect to the layout of the first to fourth rollers 1 to 4, the contact angle, and the frictional angle, in which the idle rollers (third and fourth rollers) are pressed slightly.

In a pair of housings 10 and 11, an input shaft a is rotatably supported by a pair of bearings 12 and 13. Also, in the housings 10 and 11, an output shaft b is rotatably supported by a pair of bearings 14 and 15.

Since the third and fourth rollers 3 and 4 are slightly pressed, a supporting member 40 is fitted in each of the housings 10 and 11, and the third and fourth rollers 3 and 4 are rotatably supported by a support shaft 41 provided on this supporting member 40 via a bearing 42. In addition, a spring 43 is provided for adjusting the positions of the supporting member 40 and the support shaft 41, whereby a slight pressing force is applied on the third and fourth rollers 3 and 4 to secure the initial contact.

Note that the coefficient of linear expansion of the paired housings 10 and 11 and that of the first to fourth rollers 1 to 4 are set to be equal to each other.

As described above, also in the sixth embodiment, it is possible to constitute a transmission path from the first roller 1 to the third roller 3, and further to the second roller 2, and another transmission path from the first roller 1 to the fourth roller 4 and further to the second roller 2. It is also possible, in backlashless the frictional roller transmission (speed reducing apparatus), to reverse the direction of rotation. Also, since the roller pressing force corresponding to the transmission torque is generated, it is possible to minimize an increment of the working torque. It is possible to improve the efficiency particularly in an area with low transmission torque. In addition, since the rollers for power transmission are arranged for every rotational direction and are contacted with each other all the time, the torque transmission can be carried out without a delay or a colliding sound even when the rotational direction is reversed.

(Seventh Embodiment)

Next, description will be made on a seventh embodiment of the present invention in which the embodiment of the present invention described above is applied to an electric power steering apparatus of an automobile with reference to FIG. 9 and FIGS. 10A and 10B.

Figure 9:
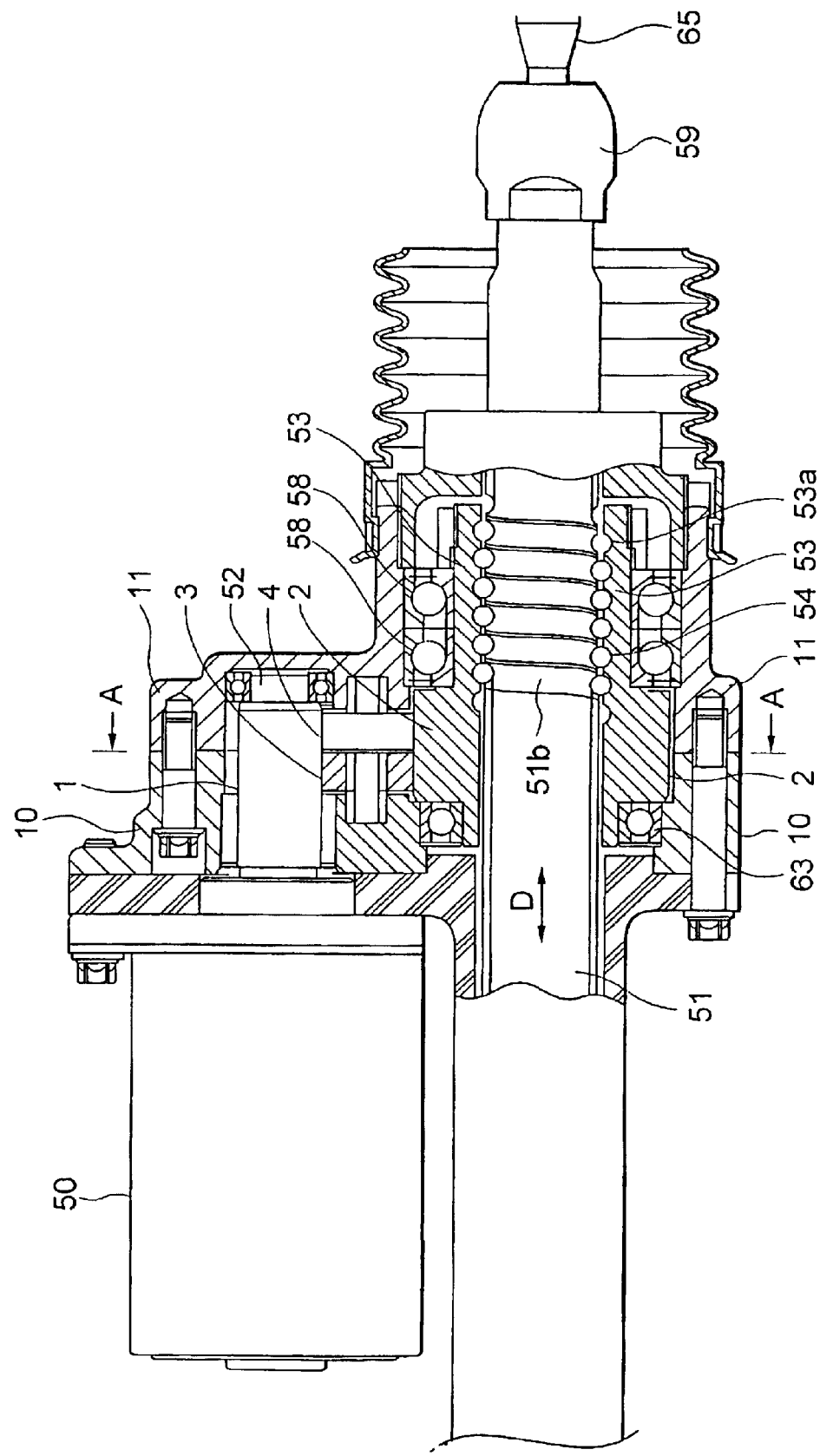
FIG. 9 is a view for showing a sectional configuration of a power steering apparatus of an automobile according to a seventh embodiment of the present invention.

FIG. 9 is a view for showing a sectional configuration of a power steering apparatus of an automobile according to a seventh embodiment of the present invention. FIG. 10A is a cross sectional view along line A—A in FIG. 9, and FIG. 10B is a cross sectional view along line B—B in FIG. 10A.

In FIG. 9, the first roller 1 is fixed in the same axial line of an output rotary shaft of an electric motor 50, which is an electric motor unit, on the output rotary shaft 52.

The second roller 2 is fixedly fitted in a nut-shaped ball screw nut 53, or integrally formed therewith. The ball screw nut 53 is rotatably supported through bearings 58, 58 and 63 with respect to the housings 10 and 11, and is fitted on a rack shaft 51, or surrounds the rack shaft 51. On the rack shaft 51, a helical groove 51b is formed to be engaged with a helical groove 53a of the ball screw nut 53 indirectly through balls 54. That is, the ball screw nut 53 and the rack shaft 51 are indirectly engaged with each other through a large number of spherical balls 54 which are rotatably fitted in a trough of the helical groove 53a and the helical groove 51b, and the ball screw nut 53 is fitted on a part of the helical groove 51b in the axial direction thereof. The ball screw nut 53 and the balls 54 constitute a so-called ball screw and nut assembly which is known.

Figure 10B:
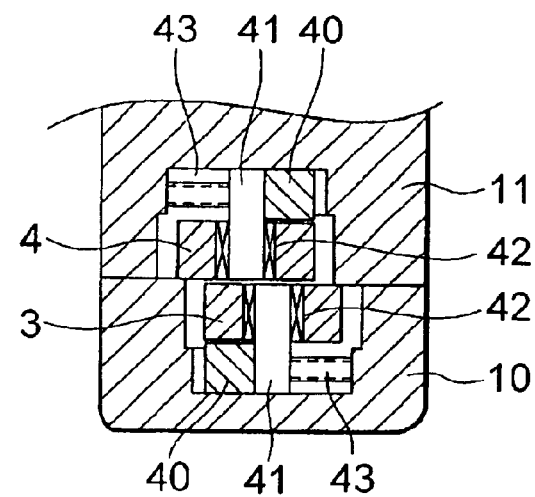
FIG. 10B is a cross sectional view along line B—B in FIG. 10A.
Figure 10A:
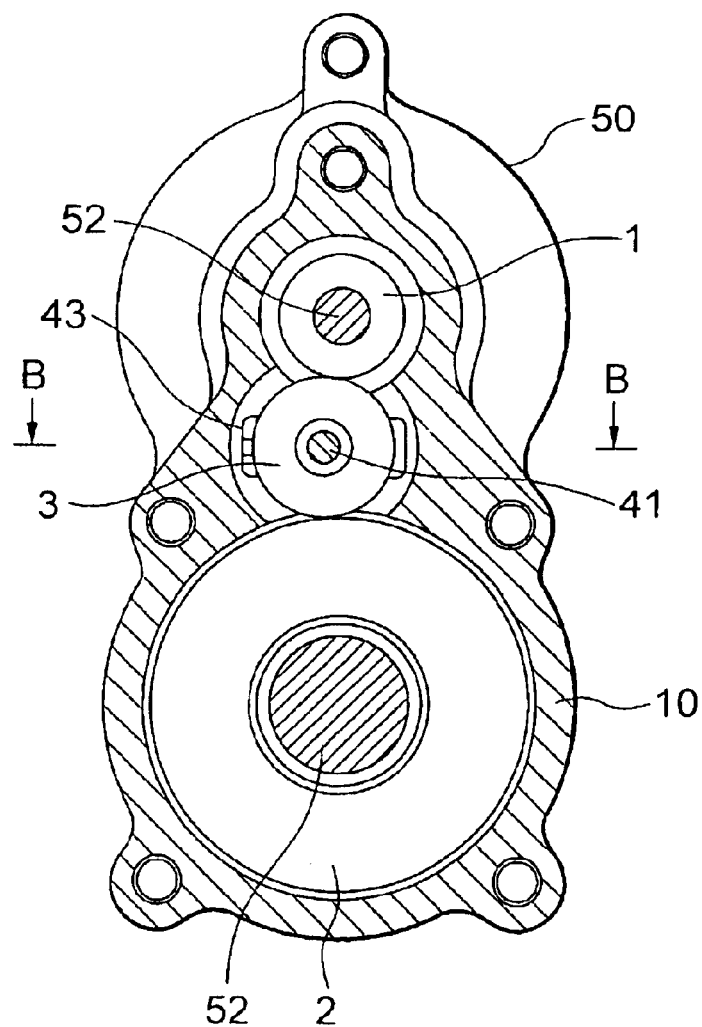
FIG. 10A is a cross sectional view along line A—A in FIG. 9.

Since the third and fourth rollers 3 and 4 are slightly pressed in FIGS. 10A and 10B, supporting members 40 are fitted in the respective housings 10 and 11. The third and fourth rollers 3 and 4 are rotatably supported by the support shafts 41 which are mounted on the supporting members 40 through bearings 42, respectively. A spring 43 is provided for adjusting the positions of the supporting member 40 and the support shaft 41, whereby a slight pressing force is applied on the third and fourth rollers 3 and 4 to secure the initial contact.

Note that the coefficient of linear expansion of the paired housings 10 and 11 and that of the first to fourth rollers 1 to 4 are set to be equal to each other.

As described above, also in the seventh embodiment, it is possible to constitute a transmission path from the first roller 1 to the third roller 3, and further to the second roller 2, and another transmission path from the first roller 1 to the fourth roller 4 and further to the second roller 2. It is also possible, in the backlashless frictional roller transmission (speed reducing apparatus), to reverse the direction of rotation. Also, since the roller pressing force corresponding to the transmission torque is generated, it is possible to minimize an increment of the working torque. It is possible to improve the efficiency particularly in an area with low transmission torque. In addition, since the rollers for power transmission are arranged for every rotational direction and are contacted with each other all the time, the torque transmission can be carried out without a delay or a colliding sound even when the rotational direction is reversed.

The electric motor 50 comprises a stator (not shown), a rotor having a rotary shaft (not shown), etc., and, in case of the present embodiment, is disposed in an axial direction which is substantially parallel to the rack shaft 51. The electric motor 50 may be disposed appropriately in an inclined manner in accordance with a spatial condition of its installation. One end of the rack shaft 51 is connected to a tie rod 65 through a universal joint 59.

In the drawing of the rack shaft 51, a rack (not shown) is formed on a left part (the tip end portion) of the helical groove 51b. This rack is fixedly fitted on a pinion shaft (not shown) which is connected to a lower end portion of a steering shaft (not shown) connected to a handle (not shown) and meshed with a pinion gear (not shown) which is arranged inside a pinion gear box (not shown). The steering shaft and the pinion shaft constitute a rotary shaft means, and the rack and the pinion gear constitute a rack pinion means, respectively. The rack pinion means itself is known as a member for driving to connect the rotary shaft means and the rack shaft 51 to each other.

Brief description will be made on an operation of the above arrangement. Though the driver controls the electric motor 50 on the basis of information including a torque to be applied on the steering wheel, the speed of the automobile, detailed description on a circuit for this controlling operation will be omitted since it is not directly related to the present invention. A control unit controls an output from the electric motor 50 so as to obtain an appropriate auxiliary power in accordance with the detected torque or the speed of the automobile.

The rotary shaft of the electric motor 50 and the shaft of the first roller 1 is coupled to each other. In this case, a rotation of the first roller 1 is transmitted to the ball screw nut 53 through the third roller 3, the fourth roller 4 and then the second roller 2, to thereby rotate the ball screw nut 53. Upon this rotation, the rack shaft 51 is driven in either direction indicated by the arrow D, thereby steering the dirigible wheels. A torque of the steering shaft corresponding to a load to be received by the rack shaft 51 and the speed of the automobile in this case are detected, and an output of the electric motor 50 is controlled in accordance with these detected values, whereby an electric auxiliary power is appropriately applied on a manual steering power.

As described above, according to the first aspect of the invention, it is possible to constitute a transmission path from the first roller 1 to the third roller 3, and further to the second roller 2, and another transmission path from the first roller 1 to the fourth roller 4 and further to the second roller 2. It is also possible, in the backlashless frictional roller transmission (speed reducing apparatus), to reverse the direction of rotation. Also, since the roller pressing force corresponding to the transmission torque is generated, it is possible to minimize an increment of the working torque. It is possible to improve the efficiency particularly in an area with low transmission torque. In addition, since the rollers for power transmission are arranged for every rotational direction and are contacted with each other all the time, the torque transmission can be carried out without a delay or a colliding sound even when the rotational direction is reversed.

(Eighth Embodiment)

FIGS. 11A through 11C are views for showing a frictional roller transmission (speed reducing apparatus) according to the eighth embodiment of the present invention, in which FIG. 11A is a lateral cross sectional view of the transmission, FIG. 11B is a cross sectional view along line b—b in FIG. 11A, and FIG. 11C is a cross sectional view along line c—c in FIG. 11B. FIGS. 12A through 12C are exploded cross sectional views respectively showing the third and the fourth rollers.

Figure 13:
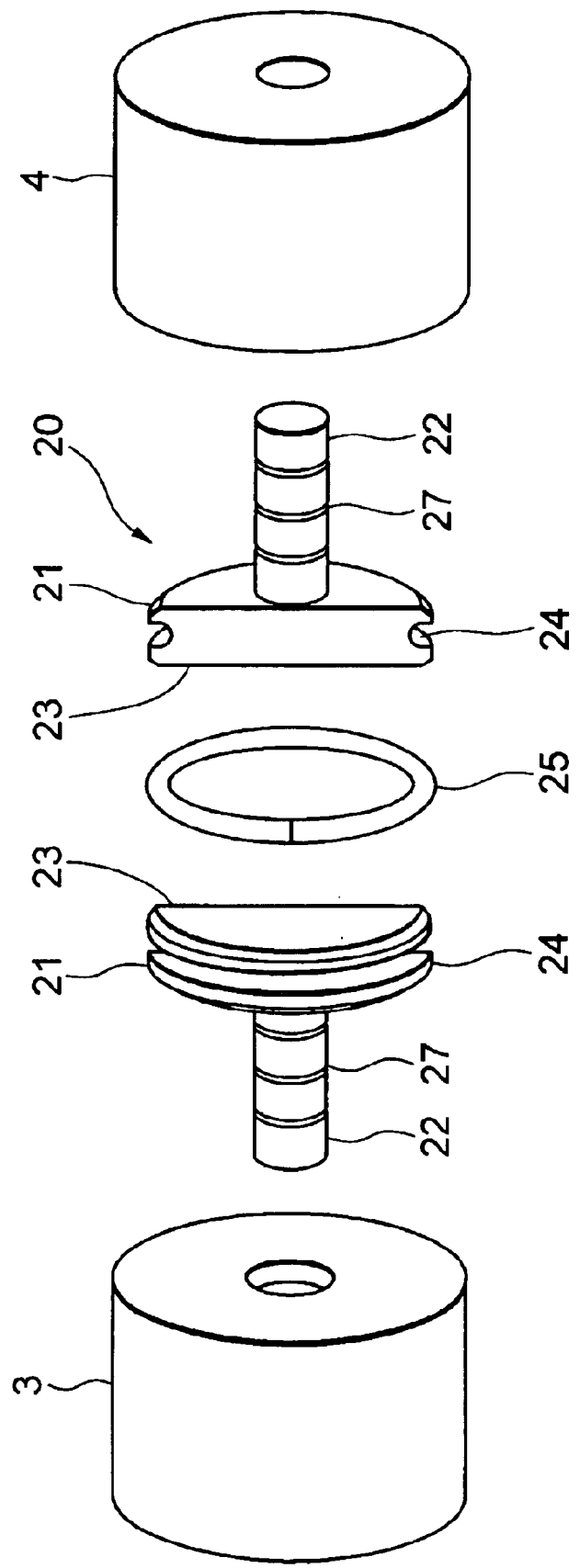
FIG. 13 is an exploded perspective view of the third and fourth rollers shown in FIG. 12B.

FIG. 13 is an exploded perspective view of the third and fourth rollers shown in FIG. 12B.

The eighth embodiment has the same arrangement as that of the first embodiment with respect to the layout of the first to fourth rollers 1 to 4, the contact angle, and the frictional angle.

As shown in FIGS. 11A through 11C, in a pair of housings 10 and 11, an input shaft a is rotatably supported by a pair of bearings 12 and 13. Also, in the housings 10 and 11, an output shaft b is rotatably supported by a pair of bearings 14 and 15. The coefficient of linear expansion of the paired housings 10 and 11 and that of the first to fourth rollers 1 to 4 are set to be equal to each other.

As shown in FIGS. 12A through 12C, in the eighth embodiment, a holder 20 is composed of a flange portion 21 and a shaft portion 22. The flange portion 21 and the shaft portion 22 are eccentric from each other by a predetermined amount, and the flange portion 21 has a substantially semi-circular cross section.

It is possible to couple the holders 20 to each other by arranging the shaft portions 22 thereof in the opposite directions, and a joint surface therebetween serves as a stopper surface 23, with annular grooves 24 on the outer peripheral surface thereof which becomes one piece when the holders are coupled to each other. A wire ring 25 which serves as a spring element is inserted in the annular groove 24, and an elasticity is given to the groove 24 in a direction in which the both shaft portions 22 are close to each other. As a result, the both shaft portions are integrated as a unitary unit.

The third and fourth rollers 3 and 4 are supported rotatably by the shaft portions 22 of the holders 20.

A state in which the both stopper surfaces 23 are brought into contact is a state in which the third roller and the fourth roller is closest to each other, and the distance between the shafts is indicated by A in FIG. 12B.

The dimension denoted by B in FIG. 11C indicates the distance between the shafts of the third roller 3 and the fourth roller 4 when no elastic deformation occurs in the initial state.

Since A<B, in the initial state, the stopper surfaces 23 are separated from each other only by the distance B−A, so as to receive a contact force between the third and fourth rollers and the first and second rollers owing to the elasticity of the spring member 25.

By setting a predetermined value for A, when either one of the third and fourth rollers serves to carry out the power transmission and is displaced by B−A or more in a direction to approach a line for connecting the rotary shafts of the first and second rollers, the stopper surfaces are brought into contact and the distance between the shafts is maintained to be A, so that other roller can be separated from the first and second rollers.

Since only one of the rollers is in contact with the first and second rollers, when there is no input torque generated and the rotation is stopped, the pressing force due to the tangential force is no longer exist so that the roller is pushed out to the position in the initial state due to the elastic force of the elastic deformation of the other rollers, the housings and the bearings. As a result, the pressing force of the roller is not maintained and the working torque remains only for a predetermined pressing load in the initial state.

Note that, in an example shown in FIG. 12A, bearings 26 are disposed between the third and fourth rollers and the shaft portion 22, and the flange portion 21 has a substantially semicircular cross section.

In the examples shown in FIG. 12B and FIG. 13, an oil retaining groove (labyrinth groove) 27 is disposed on the shaft portion 22 of the holder 20, and the flange portion 21 has a semicircular cross section.

In the example shown in FIG. 12C, the oil retaining groove (labyrinth groove) 27 is disposed on the shaft portion 22 of the holder 20, and the flange portion 21 has a step-shaped cross section.

Note that the present invention is not limited to the foregoing embodiments, but can be modified in various ways. A frictional roller transmission (speed reducing apparatus) according to the present invention may be used, for example, in an electric power steering apparatus of an automobile.

(Ninth Embodiment)

Next, the ninth embodiment of the present invention will be described with reference to FIG. 14 and FIGS. 15A and 15B, in which the eighth embodiment of the present invention described above is applied to an electric power steering apparatus of an automobile.

Figure 14:
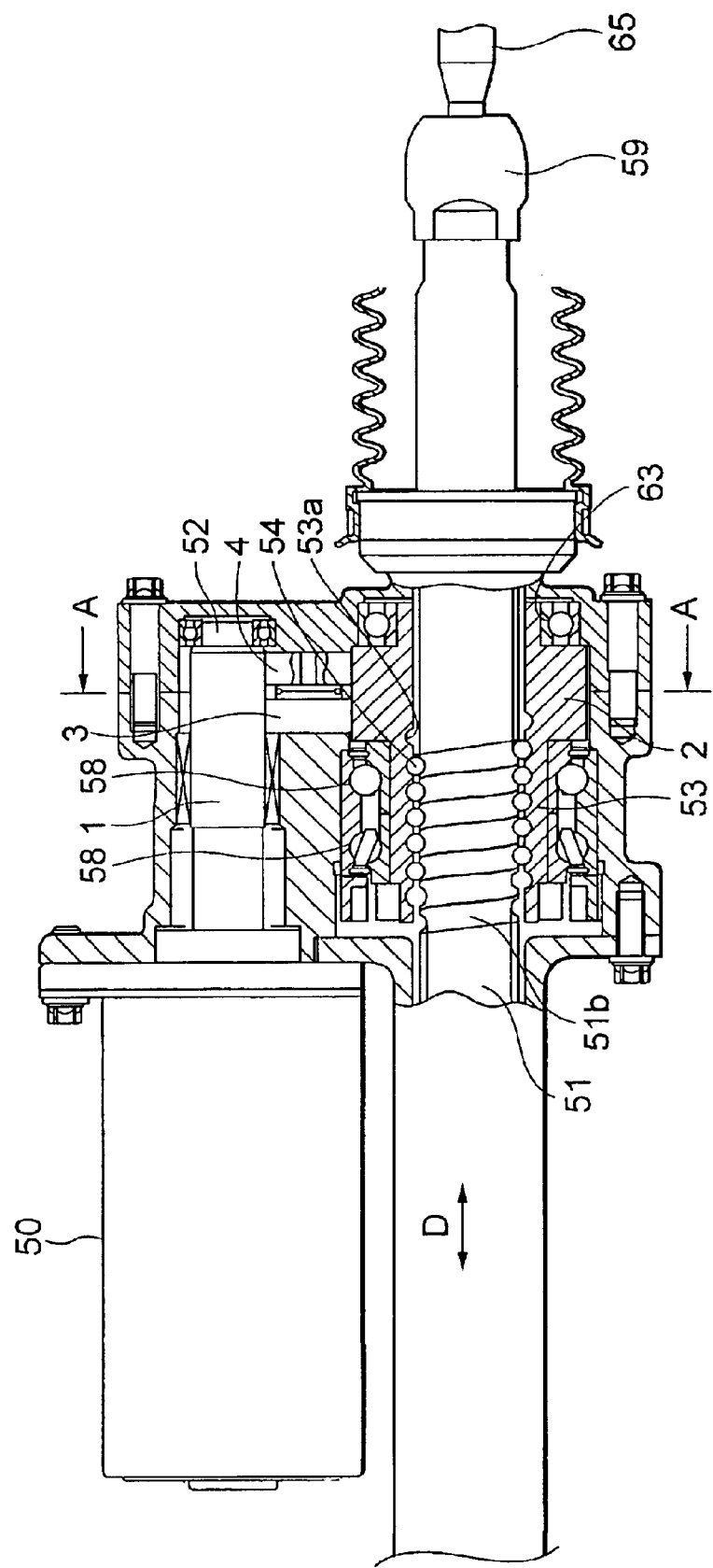
FIG. 14 is a view for showing a sectional configuration of a power steering apparatus of an automobile according to a ninth embodiment of the present invention.

FIG. 14 is a view for showing a sectional configuration of a power steering apparatus of an automobile according to the ninth embodiment of the present invention. FIG. 15A is a cross sectional view along line A—A in FIG. 14 for showing a part of the frictional roller transmission serving as rotation decelerating means, and FIG. 15B is a cross sectional view along line B—B in FIG. 15A.

In FIG. 14, the first roller 1 is fixed in the same axial line of an output rotary shaft of an electric motor 50, which serves as an electric motor unit, on the output rotary shaft 52.

The second roller 2 is fixedly fitted on nut-shaped ball screw nut 53, or integrally formed therewith. The ball screw nut 53 is rotatably supported through bearings 58, 58 and 63 with respect to the housings 10 and 11, and is fitted on a rack shaft 51, or is wound around the rack shaft 51. On the rack shaft 51, a helical groove 51b is formed to be engaged with a helical groove 53a of the ball screw nut 53 indirectly through balls 54. That is, the ball screw nut 53 and the rack shaft 51 are indirectly engaged with each other through a large number of spherical balls 54 which are rotatably fitted in troughs of the helical groove 53a and the helical groove 51b, and the ball screw nut 53 is fitted on a part of the helical groove 51b in the axial direction thereof. The ball screw nut 53 and the ball 54 constitute a so-called ball screw and unt assembly which is known.

Figure 15B:
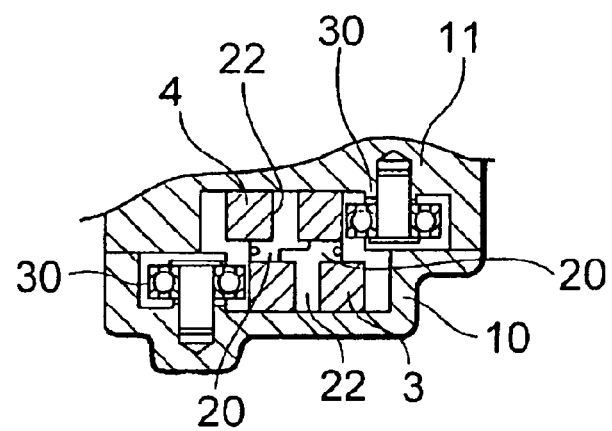
FIG. 15B is a cross sectional view along line B—B in FIG. 15A.
Figure 15A:
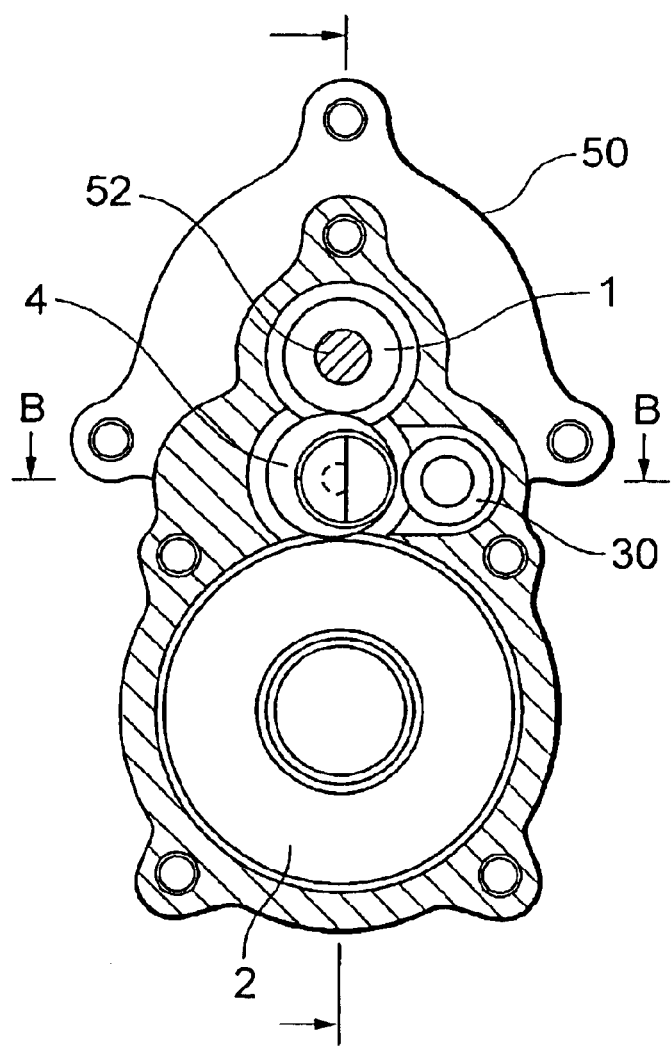
FIG. 15A is a cross sectional view along line A—A in FIG. 14.

Since the third and fourth rollers 3 and 4 are slightly pressed in FIG. 15B, holders 20 and 20 are fitted respectively in the housings 10 and 11. The third and fourth rollers 3 and 4 are rotatably supported respectively by support shafts 22, 22 mounted on these holders 20, 20 through bearings (not shown). The configurations of the hollers 20, 20 are the same as those in the foregoing eighth embodiment, so that detailed description thereof will be omitted.

Note that the coefficient of linear expansion of the paired housings 10 and 11 and that of the first to fourth rollers 1 to 4 are set to be equal to each other.

As described above, also in the ninth embodiment, it is possible to constitute a transmission path from the first roller 1 to the third roller 3, and further to the second roller 2, and another transmission path from the first roller 1 to the fourth roller 4 and further to the second roller 2. It is also possible, in the backlashless frictional roller transmission (speed reducing apparatus), to reverse the direction of rotation. Also, since the roller pressing power corresponding to the transmission torque is generated, it is possible to minimize an increment of the working torque. It is possible to improve the efficiency particularly in an area with low transmission torque. In addition, since the rollers for power transmission are arranged for every rotational direction and are contacted with each other all the time, the torque transmission can be carried out without a delay or a colliding sound even when the rotational direction is reversed.

The above electric motor 50 comprises a stator (not shown), a rotor having a rotary shaft (not shown), etc., and, in case of the present embodiment, is disposed in an axial direction which is substantially parallel to the rack shaft 51. The electric motor 50 may be disposed appropriately in an inclined manner depending on a spatial condition of installation thereof. One end of the rack shaft 51 is connected to a tie rod 65 through a universal joint 59.

In the drawing of the rack shaft 51, a rack (not shown) is formed on a left part (the tip end portion) of the helical groove 51b. This rack is fixedly fitted on a pinion shaft (not shown) which is connected to a lower end portion of a steering shaft (not shown) connected to a steering wheel (not shown) and is meshed with a pinion gear (not shown) which is arranged inside a pinion gear box (not shown). The steering shaft and the pinion shaft constitute a rotary shaft means, while the rack and the pinion gear constitute a rack pinion means, respectively. The rack pinion means itself is known as a member for driving to connect the rotary shaft means and the rack shaft 51 to each other.

Brief description will be made on an operation of the above arrangement. Though the driver controls the electric motor 50 on the basis of information including a torque to be applied on the steering wheel, the speed of the automobile, detailed description on a circuit for this controlling operation will be omitted since it is not directly related to the present invention. A control unit controls an output from the electric motor 50 so as to obtain an appropriate auxiliary power corresponding to the detected torque or the speed of the automobile.

The rotary shaft of the electric motor 50 and the shaft of the first roller 1 is coupled to each other. In this case, a rotation of the first roller 1 is transmitted to the ball screw nut 53 through the third roller 3, the fourth roller 4 and then the second roller 2, to thereby rotate the ball screw nut 53. Upon this rotation, the rack shaft 51 is driven in either one direction indicated by the arrow D, thereby steering dirigible wheels. A torque of the steering shaft corresponding to a load applied on the rack shaft 51 and the speed of the automobile in this case are detected, and an output of the electric motor 50 is controlled in accordance with these detected values, whereby an electric auxiliary power is appropriately applied on a manual steering power.

(Tenth Embodiment)

In the foregoing eighth and ninth embodiments, since a wire ring of C type is used as a wire ring to be attached to the holder which supports each of the third and fourth rollers rotatably, the phase of the wire ring is sometimes shifted when the transmission is operated. Since the initial contact power between the third and fourth rollers changes in accordance with the phase of the wire ring, the coefficient of elasticity is changed between the two holders when the phase is shifted, thereby fluctuating the initial contact power.

In the tenth embodiment, a stable initial contact power is obtained by fixing the phase of the wire ring.

Figure 16C:
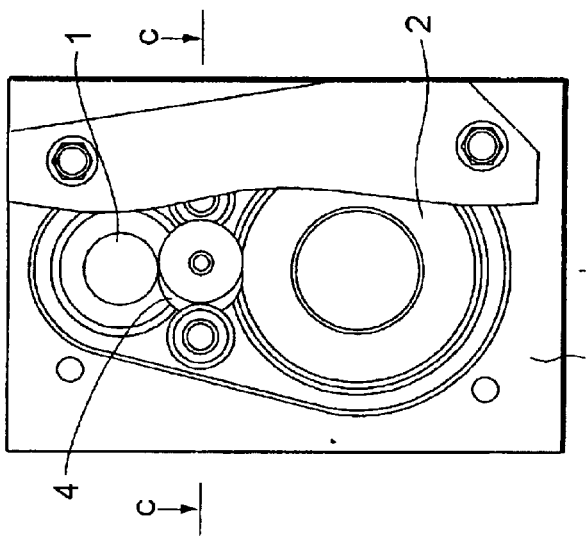
Figure 16A:
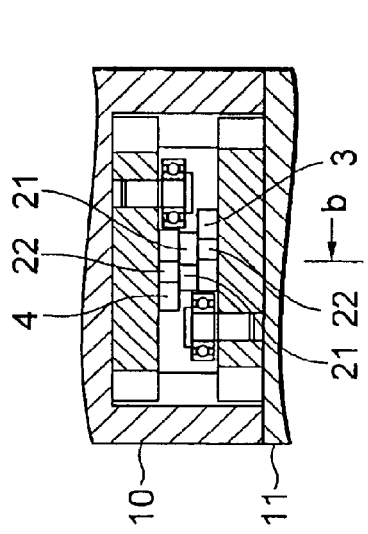
Figure 16B:
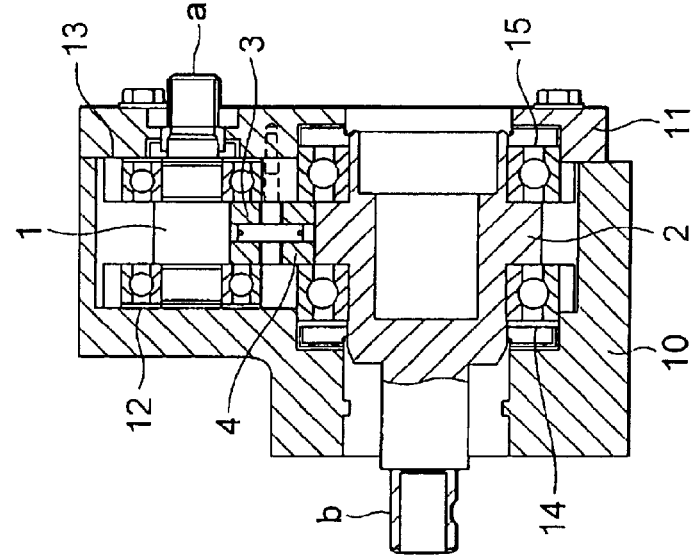

FIGS. 16A through 16C are views for showing a frictional roller transmission (speed reducing apparatus) according to the tenth embodiment of the present invention, in which FIG. 16A is a partially cut-away side view of the transmission, FIG. 16B is a cross sectional view along line b—b in FIG. 16A, and FIG. 16C is a cross sectional view along line c—c in FIG. 16A.

In the tenth embodiment, the layout of the first to fourth rollers 1 to 4, the contact angle and the frictional angle are arranged basically in the same manner as in the foregoing embodiments.

As shown in FIGS. 16A to 16C, in a pair of housings 10 and 11, an input shaft a is rotatably supported by a pair of bearings 12 and 13. Also, in the housings 10 and 11, an output shaft b is rotatably supported by a pair of bearings 14 and 15. Note that the coefficient of linear expansion of the paired housings 10 and 11 and that of the first to fourth rollers 1 to 4 are set to be equal to each other.

Figure 17A:
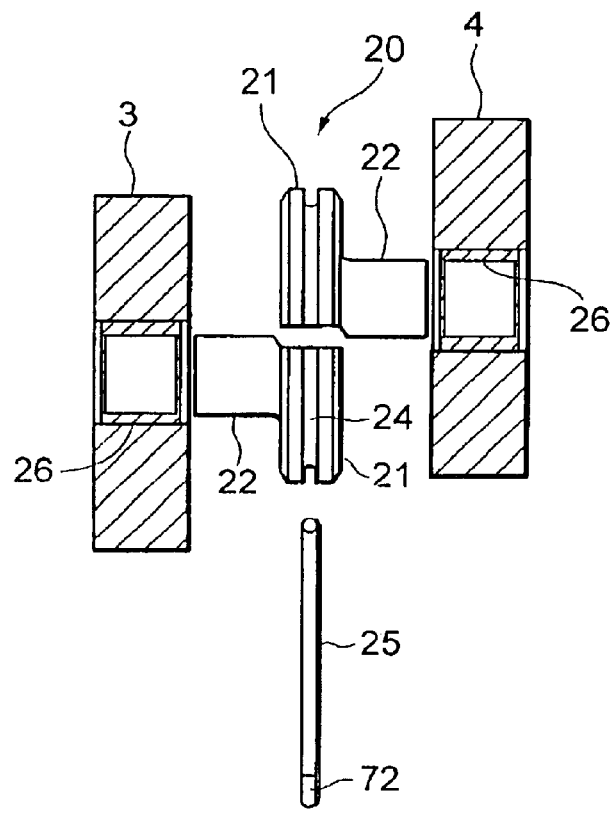
Figure 17B:
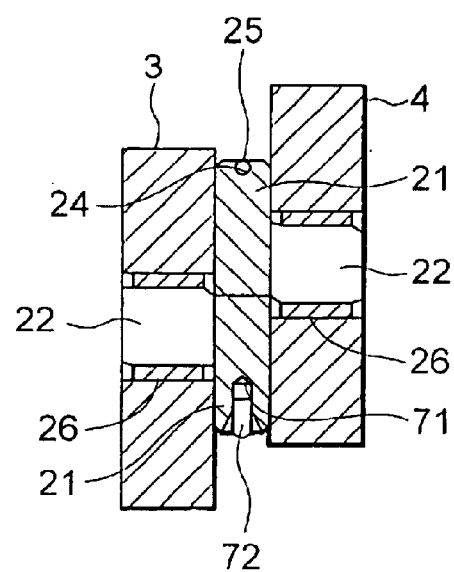

FIGS. 17A and 17B are views related to a first example of the frictional roller transmission (speed reducing apparatus) according to the tenth embodiment of the present invention, in which FIG. 17A is an exploded cross sectional view of the third and fourth rollers, and FIG. 17B is a side view showing an assembled state of the third and fourth rollers. FIG. 18 is an exploded perspective view of the third and fourth rollers shown in FIGS. 17A and 17B.

A holder 20 is composed of a flange portion 21 and a shaft portion 22. The flange portion 21 and the shaft portion 22 are eccentric from each other by a predetermined amount, and the flange portion 21 has a substantially semicircular cross section. It is possible to couple the holders 20 to each other by arranging the shaft portions 22 thereof in the opposite directions, and a joint surface therebetween serves as a stopper surface 23, with annular grooves 24 on the outer peripheral surface thereof which becomes one piece when the holders are coupled to each other. A wire ring 25 which serves as a spring element is inserted in the annular groove 24, and an elasticity is given to the groove 24 in a direction in which the both shaft portions 22 are close to each other. As a result, the both shaft portions are integrated as a unitary unit. Both the shaft portions 22 are supported rotatably by the third and fourth rollers 3 and 4 respectively through the bearings 26.

On one of the holders, there is formed a hole 71 which is perpendicular to the stopper surface and is deeper than the annular groove 24 on the annular groove 24. A protrusion 72 from a wire ring of G type is inserted in this hole 71 so as to fix the phase.

Figure 19A:
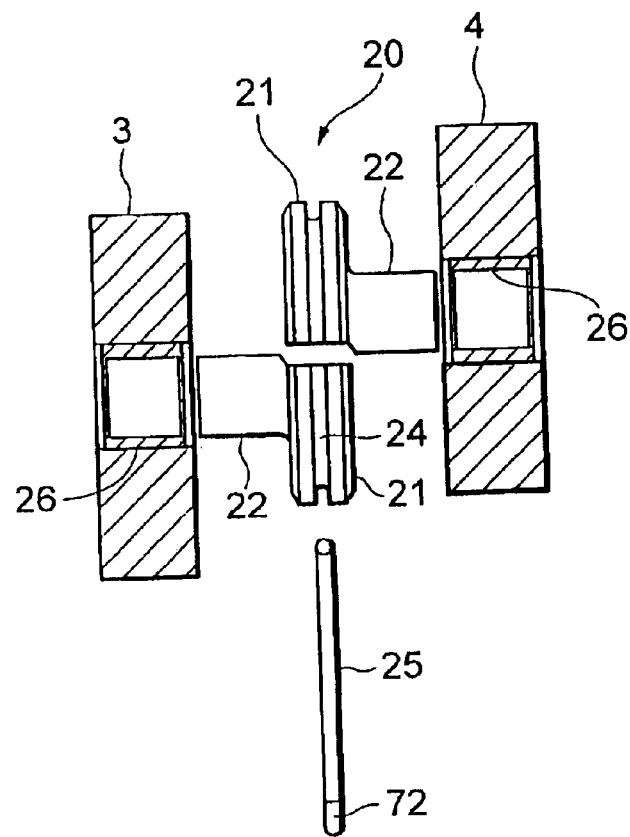
Figure 19B:
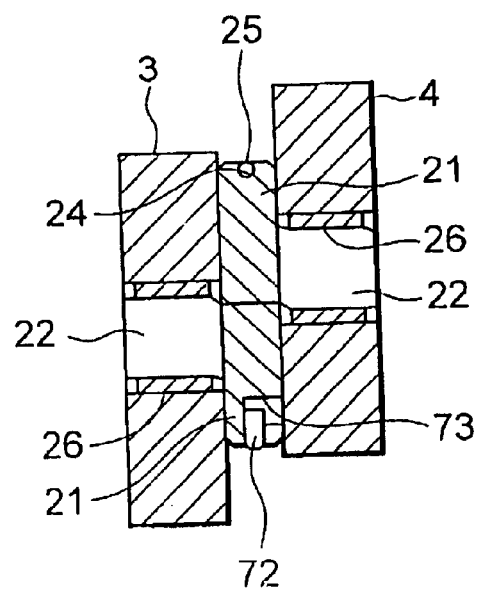
Figure 20:
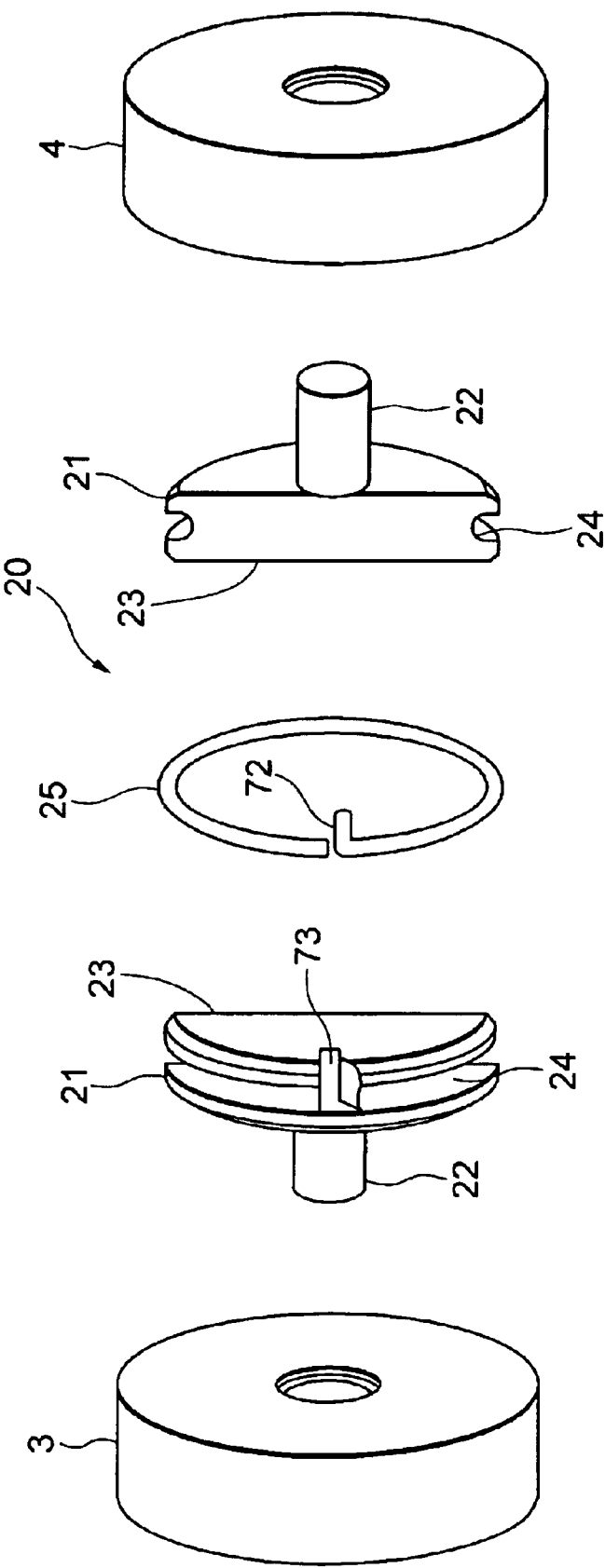
FIG. 20 is an exploded perspective view of the third and fourth rollers shown in FIGS. 19A and 19B.

FIGS. 19A and 19B are views related to a second example of the frictional roller transmission (speed reducing apparatus) according to the tenth embodiment of the present invention, in which FIG. 19A is an exploded cross sectional view of the third and fourth rollers, and FIG. 19B is a side view showing an assembled state of the third and fourth rollers. FIG. 20 is an exploded perspective view of the third and fourth rollers shown in FIGS. 19A and 19B.

A holder 20 is composed of a flange portion 21 and a shaft portion 22. The flange portion 21 and the shaft portion 22 are eccentric from each other by a predetermined amount, and the flange portion 21 has a substantially semicircular cross section. It is possible to couple the holders 20 to each other by arranging the shaft portions 22 thereof in the opposite directions, and a joint surface therebetween serves as a stopper surface 23, with annular grooves 24 on the outer peripheral surface thereof which becomes one piece when the holders are coupled to each other. A wire ring 25 which serves as a spring element is inserted in the annular groove 24, and an elasticity is given to the groove 24 in a direction in which the both shaft portions 22 are close to each other. As a result, the both shaft portions are integrated as a unitary unit. Both the shaft portions 22 are supported rotatably by the third and fourth rollers 3 and 4 respectively through the bearings 26.

On one of the holders, there is formed a hole 73 which is perpendicular to the stopper surface and is deeper than the annular groove 24 on the annular groove 24. A protrusion 72 from a wire ring of G type is inserted in this hole 73 so as to fix the phase.

Figure 21A:
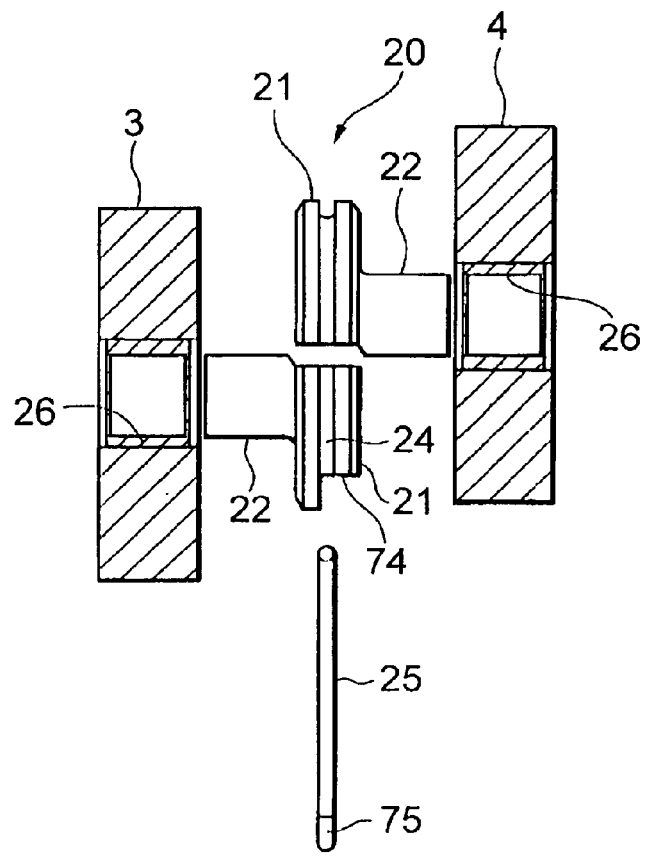
Figure 21B:
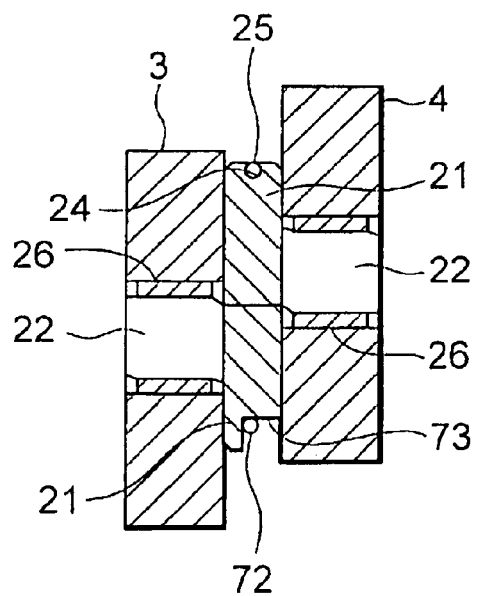
Figure 22:
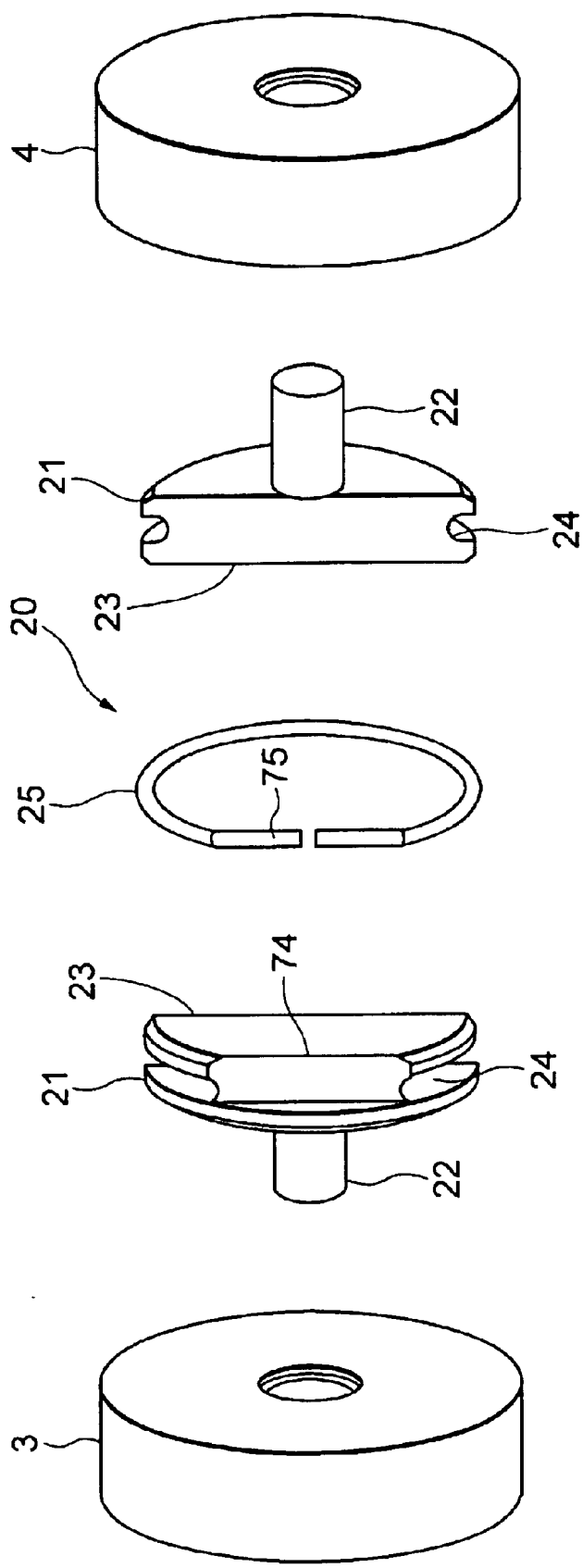
FIG. 22 is an exploded perspective view of the third and fourth rollers shown in FIGS. 21A and 21B.

FIGS. 21A and 21B are views related to a third example of the frictional roller transmission (speed reducing apparatus) according to the tenth embodiment of the present invention, in which FIG. 21A is an exploded cross sectional view of the third and fourth rollers, and FIG. 21B is a side view showing an assembled state of the third and fourth rollers. FIG. 22 is an exploded perspective view of the third and fourth rollers shown in FIGS. 21A and 21B.

A holder 20 is composed of a flange portion 21 and a shaft portion 22. The flange portion 21 and the shaft portion 22 are eccentric from each other by a predetermined amount, and the flange portion 21 has a substantially semicircular cross section. It is possible to couple the holders 20 to each other by arranging the shaft portions 22 thereof in the opposite directions, and a joint surface therebetween serves as a stopper surface 23, with annular grooves 24 on the outer peripheral surface thereof which becomes one piece when the holders are coupled to each other. A wire ring 25 which serves as a spring element is inserted in the annular groove 24, and an elasticity is given to the groove 24 in a direction in which the both shaft portions 22 are close to each other. As a result, the both shaft portions are integrated as a unitary unit. Both the shaft portions 22 are supported rotatably by the third and fourth rollers 3 and 4 respectively through the bearings 26.

On one of the holders, there is formed a surface 74 which is parallel with the stopper surface, and a straight line portion 75 of a wiring of D type is inserted in this parallel surface 74 so as to fix the phase.

Figure 23A:
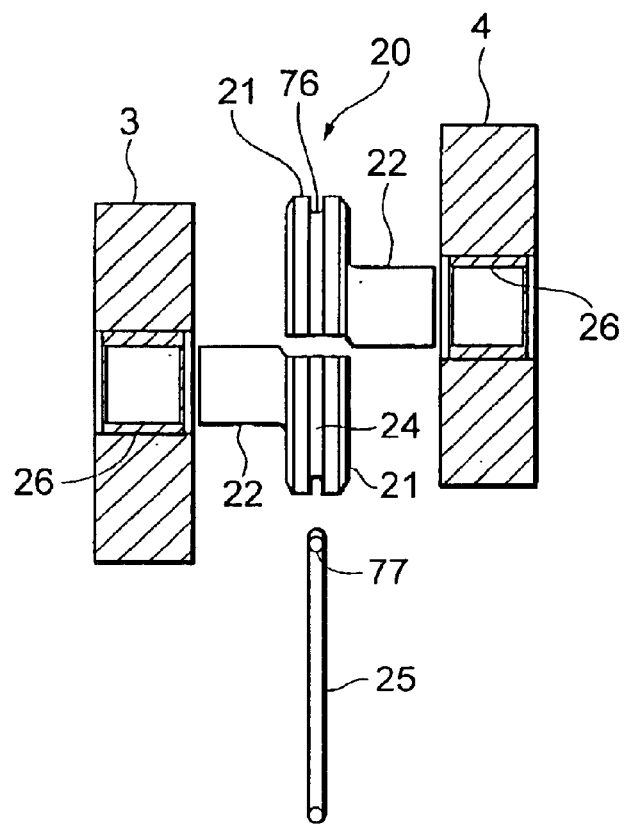
Figure 23B:
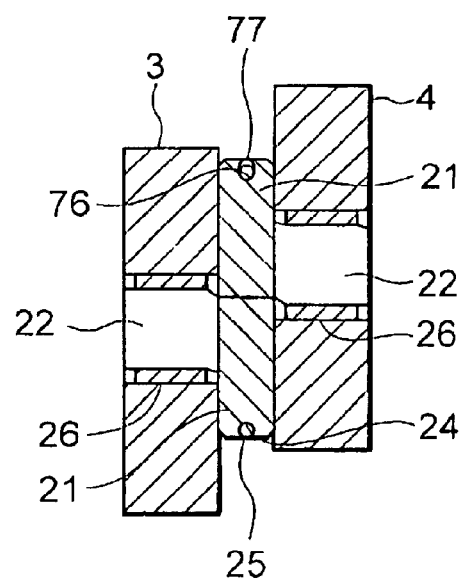
Figure 24:
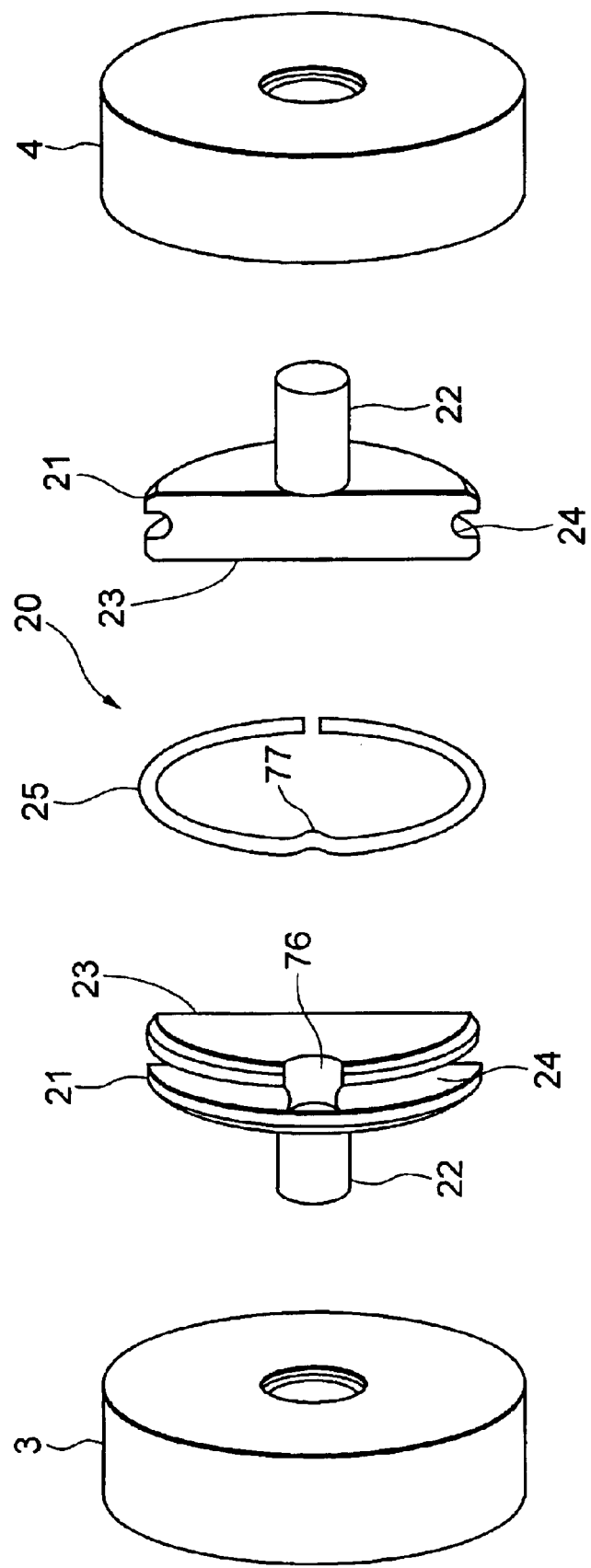
FIG. 24 is an exploded perspective view of the third and fourth rollers shown in FIGS. 23A and 23B.

FIGS. 23A and 23B are views related to a fourth example of the frictional roller transmission (speed reducing apparatus) according to the tenth embodiment of the present invention, in which FIG. 23A is an exploded cross sectional view of the third and fourth rollers, and FIG. 23B is a side view showing an assembled state of the third and fourth rollers. FIG. 24 is an exploded perspective view of the third and fourth rollers shown in FIGS. 23A and 23B.

A holder 20 is composed of a flange portion 21 and a shaft portion 22. The flange portion 21 and the shaft portion 22 are eccentric from each other by a predetermined amount, and the flange portion 21 has a substantially semicircular cross section. It is possible to couple the holders 20 to each other by arranging the shaft portions 22 thereof in the opposite directions, and a joint surface therebetween serves as a stopper surface 23, with annular grooves 24 on the outer peripheral surface thereof which becomes one piece when the holders are coupled to each other. A wire ring 25 which serves as a spring element is inserted in the annular groove 24, and an elasticity is given to the groove 24 in a direction in which the both shaft portions 22 are close to each other. As a result, the both shaft portions are integrated as a unitary unit. Both the shaft portions 22 are supported rotatably by the third and fourth rollers 3 and 4 respectively through the bearings 26.

On one of the holders, there is formed a groove 76 which is perpendicular to the annular groove 24 and is deeper than the annular groove 24 on the annular groove 24. A protrusion 77 from a wire ring which is partially deformed is inserted in this groove 76 so as to fix the phase.

Figure 25A:
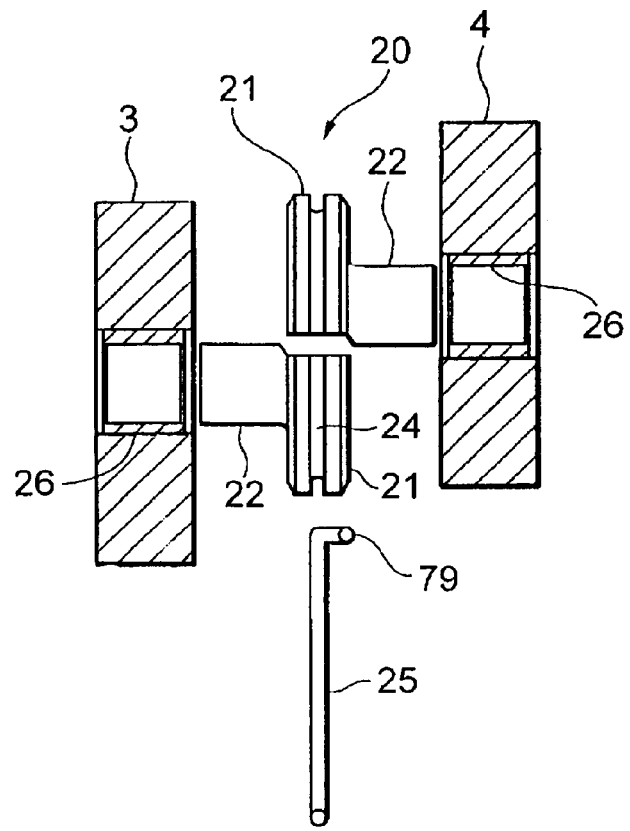
Figure 25B:
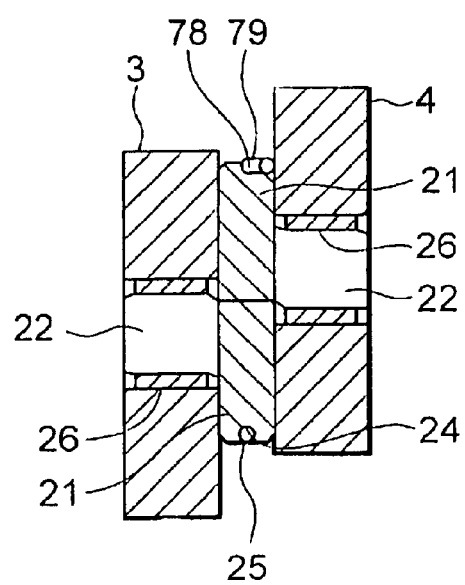
Figure 26:
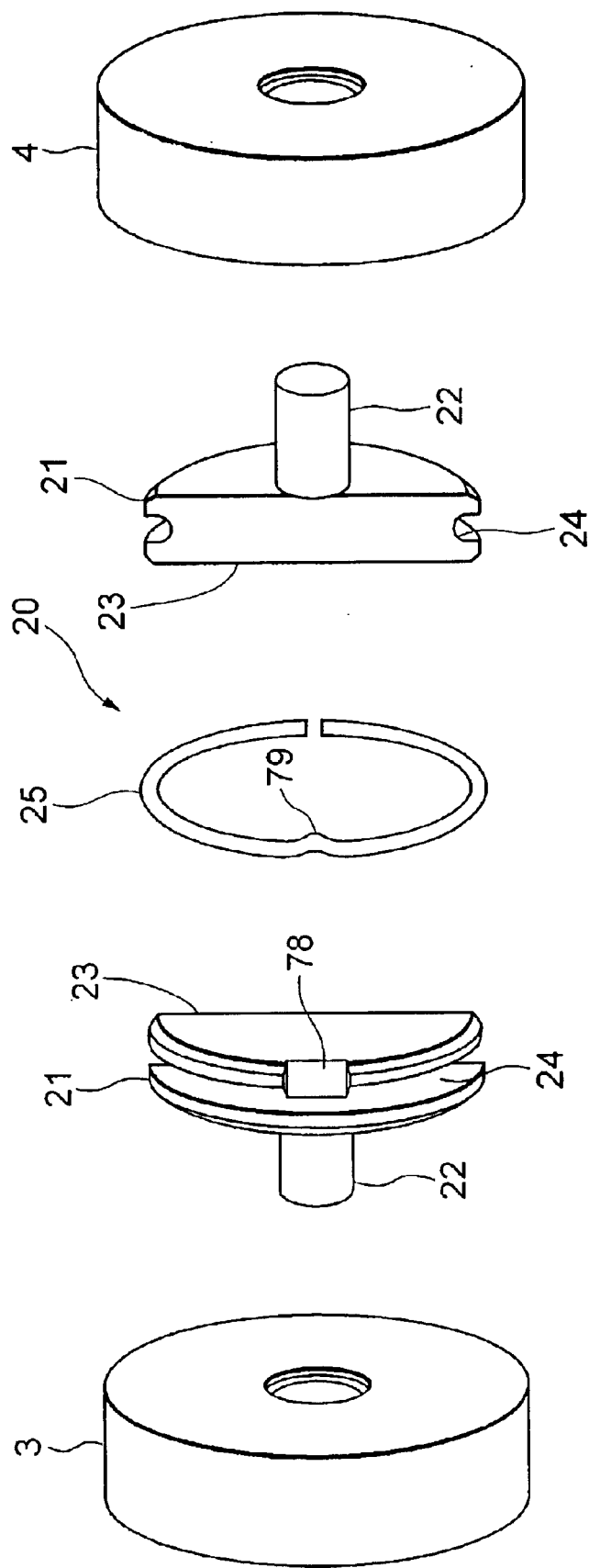
FIG. 26 is an exploded perspective view of the third and fourth rollers shown in FIGS. 25A and 25B.

FIGS. 25A and 25B are views related to a fifth example of the frictional roller transmission (speed reducing apparatus) according to the tenth embodiment of the present invention, in which FIG. 25A is an exploded cross sectional view of the third and fourth rollers, and FIG. 25B is a side view showing an assembled state of the third and fourth roller. FIG. 26 is an exploded perspective view of the third and fourth rollers shown in FIGS. 25A and 25B.

A holder 20 is composed of a flange portion 21 and a shaft portion 22. The flange portion 21 and the shaft portion 22 are eccentric from each other by a predetermined amount, and the flange portion 21 has a substantially semicircular cross section. It is possible to couple the holders 20 to each other by arranging the shaft portions 22 thereof in the opposite directions, and a joint surface therebetween serves as a stopper surface 23, with annular grooves 24 on the outer peripheral surface thereof which becomes one piece when the holders are coupled to each other. A wire ring 25 which serves as a spring element is inserted in the annular groove 24, and an elasticity is given to the groove 24 in a direction in which the both shaft portions 22 are close to each other. As a result, the both shaft portions are integrated as a unitary unit. Both the shaft portions 22 are supported rotatably by the third and fourth rollers 3 and 4 respectively through the bearings 26.

On one of the holders, there is formed a groove 78 s perpendicularly to the annular groove 24. A protrusion 79 of a wire ring which is partially deformed is inserted in this groove 78 so as to fix the phase.

As described above, according to the eighth to tenth embodiments, it is possible to prevent an increase of the working torque by preventing the third and fourth rollers from approaching each other within a predetermined distance therebetween and by giving an initial pressing load which is required for stabilizing the initial operation.

(Eleventh Embodiment)

Figure 27A:
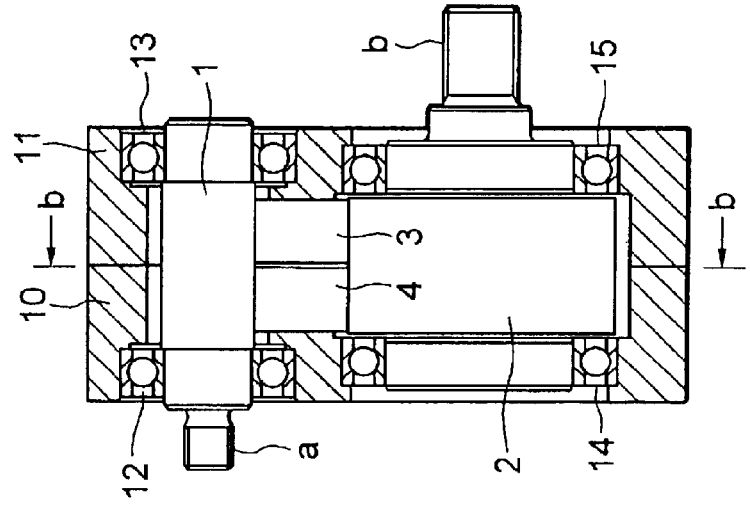
Figure 27C:
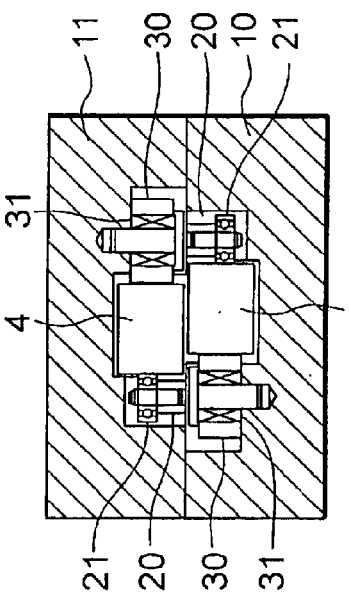
Figure 27B:
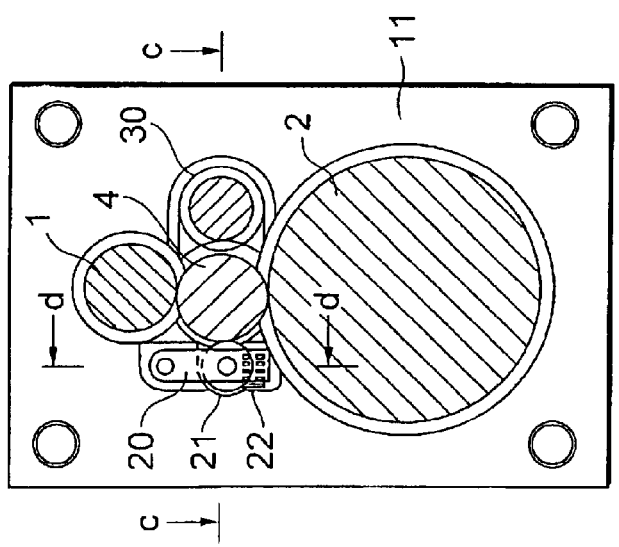
Figure 27D:
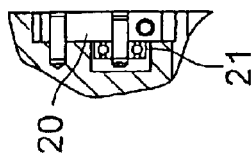

FIGS. 27A through 27D are views for showing a frictional roller transmission (speed reducing apparatus) according to the eleventh embodiment of the present invention, in which FIG. 27A is a lateral cross sectional view of the transmission, FIG. 27B is a cross sectional view along line b—b in FIG. 27A, FIG. 27C is a cross sectional view along line c—c in FIG. 27B, and FIG. 27D is a cross sectional view along line d—d in FIG. 27B.

The eleventh embodiment has basically the same arrangement as that of the first embodiment with respect to the layout of the first to fourth rollers 1 to 4, the contact angle, and the frictional angle, in which the idle rollers (the third and fourth rollers) are slightly pressed.

As shown in FIGS. 27A to 27D, in a pair of housings 10 and 11, an input shaft a is rotatably supported by a pair of bearings 12 and 13. Also, in the housings 10 and 11, an output shaft b is rotatably supported by a pair of bearings 14 and 15. Note that the coefficient of linear expansion of the paired housings 10 and 11 and that of the first to fourth rollers 1 to 4 are set to be equal to each other.

The third and fourth rollers 3 and 4 are respectively provided with pressing portions. In each of these pressing portions, a roller 21 is rotatably attached to the tip end of a rockable arm 20, so that the roller 21 is elastically pressed against the third and fourth rollers 3 and 4 by means of a spring 22, whereby a slight pressing force is given to the third and fourth rollers 3 an 4 to secure the initial contact therebetween.

There is also provided a back-up roller 30 which is brought into contact with the third and fourth rollers 3 and 4 for restricting displacement of the third and fourth rollers 3 and 4 in to a predetermined amount. This back-up roller 30 is rotatably supported by the housing through a needle bearing 31.

Figure 28A:
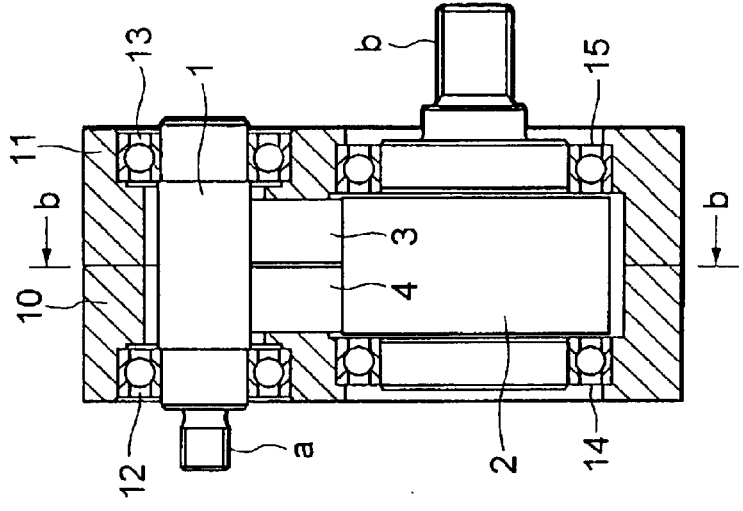
Figure 28C:
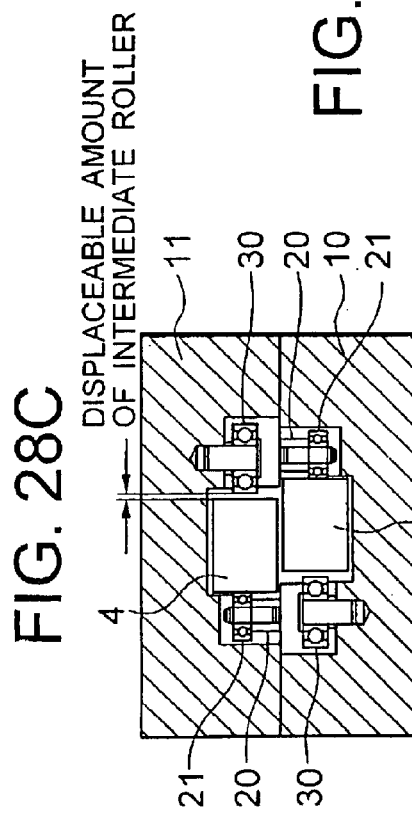
Figure 28B:
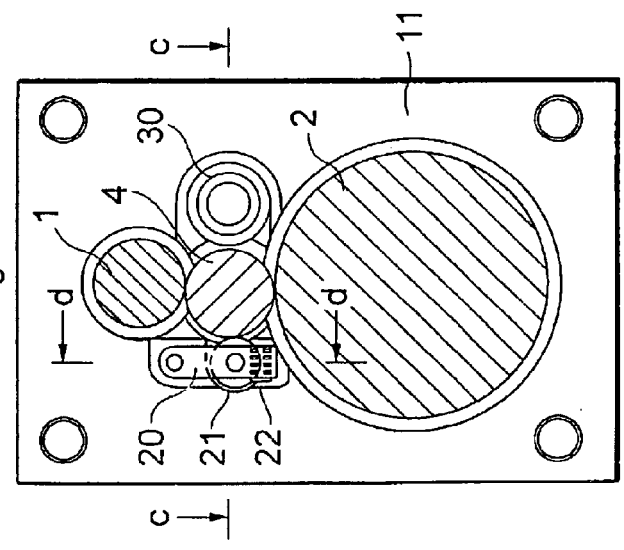
Figure 28D:
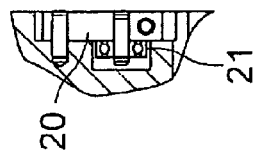

As shown in FIGS. 28A to 28C, the back-up roller 30 may be a rolling bearing with the outer race serving as a contact surface.

As described above, according to the eleventh embodiment, it is possible to prevent a damage of the transmission paths which may be caused by an excessive torque by limiting the displacement of the third roller into a predetermined amount to prevent riding-over, thereby preventing the torque transmission in not less than a predetermined amount.

Note that the frictional roller transmission (speed reducing apparatus) according to the present invention may be used in, for example, an electric power steering apparatus of an automobile.

Next, description will be made on the twelfth embodiment of the present invention in which the eleventh embodiment of the present invention described above is applied to an electric power steering apparatus of an automobile, with reference to FIG. 33 and FIGS. 34A and 34B.

Figure 33:
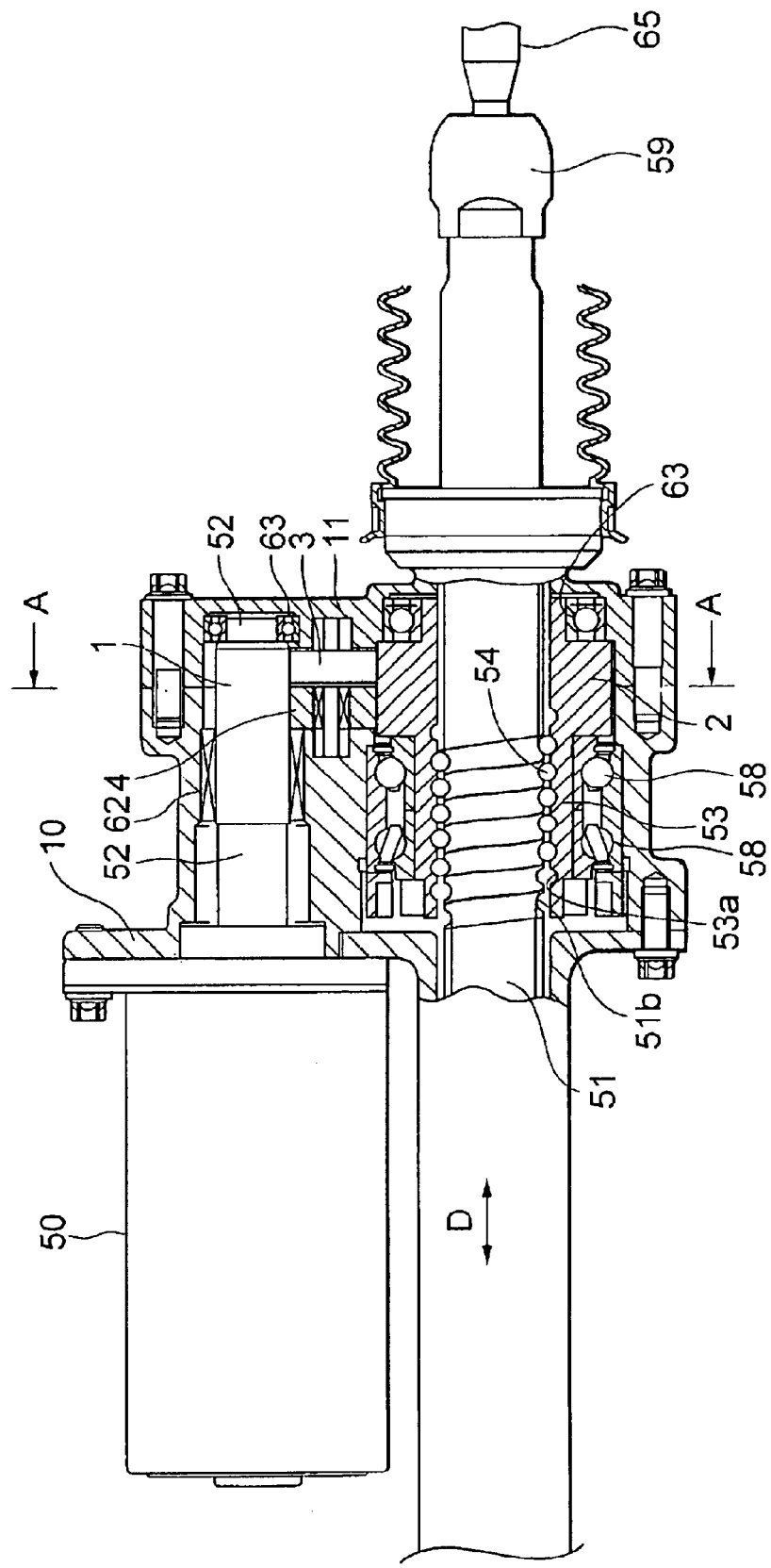
FIG. 33 is a view for showing a sectional configuration of a power steering apparatus of an automobile according to a twelfth embodiment of the present invention.

FIG. 33 is a view for showing a sectional configuration of a power steering apparatus of an automobile according to the twelfth embodiment of the present invention. FIG. 34A is a cross sectional view along line A—A in FIG. 33 for showing a part of the frictional roller transmission serving as rotation decelerating means, and FIG. 34B is a cross sectional view along line B—B in FIG. 34A.

In FIG. 33, the first roller 1 is fixed in the same axial line of an output rotary shaft of an electric motor 50 which serves as an electric motor unit, on the output rotary shaft 52.

The second roller 2 is fixedly fitted in a nut-shaped ball screw nut 53, or integrally formed therewith. The ball screw nut 53 is rotatably supported through bearings 58, 58 and 63 with respect to the housings 10 and 11, and is fitted on a rack shaft 51 or surrounds the rack shaft 51. On the rack shaft 51, a helical groove 51b is formed to be engaged with a helical groove 53b of the ball screw nut 53 indirectly through balls 54. That is, the ball screw nut 53 and the rack shaft 51 are indirectly engaged with each other through a large number of spherical balls 54 which are rotatably fitted in a trough of the helical groove 53b and the helical groove 51b, and the ball screw nut 53 is fitted on a part of the helical groove 51b in the axial direction thereof. The ball screw nut 53 and the ball 54 constitute a so-called ball screw and nut assembly which is known.

There is also provided a back-up roller 30 which is brought into contact with the third and fourth rollers 3 and 4 for restricting the displacement of the third and fourth rollers 3 and 4 into a predetermined amount. This back-up roller 30 may be, for example, a rolling bearing with the outer race serving as a contact surface.

As described above, according to the present embodiment, it is possible to prevent a damage of the transmission paths which may be caused by an excessive torque by limiting the displacement of the third roller into a predetermined amount to prevent riding-over, thereby preventing the torque transmission in not less than a predetermined amount.

Figure 34B:
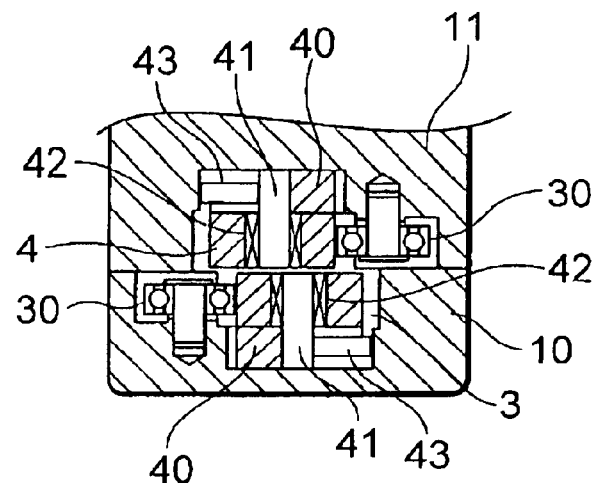
FIG. 34B is a cross sectional view along line B—B in FIG. 34A.
Figure 34A:
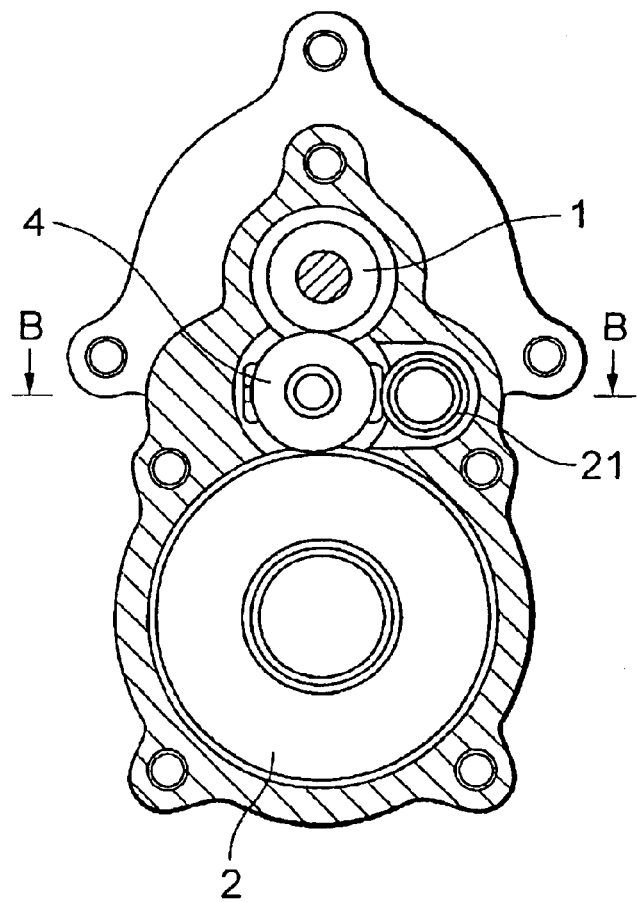
FIG. 34A is a cross sectional view along line A—A in FIG. 33.

In FIGS. 34A and 34B, since the third and fourth rollers 3 and 4 are slightly pressed, supporting members 40 are fitted in the respective housings 10 and 11, and the third and fourth rollers 3 and 4 are rotatably supported by support shafts 41 provided on the supporting members 40 via bearings 42, respectively. In addition, a spring 43 is provided for adjusting the positions of the supporting member 40 and the support shaft 41, whereby a slight pressing force is applied on the third and fourth rollers 3 and 4 to secure the initial contact.

Note that the coefficient of linear expansion of the paired housings 10 and 11 and that of the first to fourth rollers 1 to 4 are set to be equal to each other.

As described above, also in the twelfth embodiment, it is possible to constitute a transmission path from the first roller 1 to the third roller 3, and further to the second roller 2, and another transmission path from the first roller 1 to the fourth roller 4 and further to the second roller 2. It is also possible, in the backlashless frictional roller transmission(speed reducing apparatus), to reverse the direction of rotation. Also, since the roller pressing power corresponding to the transmission torque is generated, it is possible to minimize an increment of the working torque. It is possible to improve the efficiency particularly in an area with low transmission torque. In addition, since the rollers for power transmission are arranged for every rotational direction and are contacted with each other all the time, the torque transmission can be carried out without a delay or a colliding sound even when the rotational direction is reversed.

The electric motor 50 comprises a stator (not shown), a rotor having a rotary shaft (not shown), etc., and, in case of the present embodiment, is disposed in an axial direction which is substantially parallel to the rack shaft 51. The electric motor 50 may be disposed appropriately in an inclined manner in accordance with a spatial condition of its installation. One end of the rack shaft 51 is connected to a tie rod 65 through a universal joint 59.

Brief description will be made on an operation of the above arrangement. Though the driver controls the electric motor 50 on the basis of information including a torque to be applied on the steering wheel, the speed of the automobile, detailed description on a circuit for this controlling operation will be omitted since it is not directly related to the present invention. A control unit controls an output from the electric motor 50 so as to obtain an appropriate auxiliary power in accordance with the detected torque or the speed of the automobile.

The rotary shaft of the electric motor 50 and the shaft of the first roller 1 is coupled to each other. In this case, a rotation of the first roller 1 is transmitted to the ball screw nut 53 through the third roller 3, the fourth roller 4 and the second roller 2, to thereby rotate the ball screw nut 53. Upon this rotation, the rack shaft 51 is driven in either direction indicated by the arrow D, thereby steering dirigible wheels. A torque of the steering shaft corresponding to a load received by the rack shaft 51 in this case and the speed of the automobile are detected, and an output of the electric motor 50 is controlled in accordance with these detected values, whereby the electric auxiliary power is appropriately applied on a manual steering power.

Now, description will be made on the displacement of the third and fourth rollers 3 and 4 with reference to the graphs which show relations related to the input torque, the displacement of the third and fourth rollers, and a contact angle.

Since the third roller is pressed toward the first roller and the second roller, the pressing power causes displacement of the third roller in the direction of the pressing power by an amount of the elastic deformation of the rollers, the housings, the bearings for supporting the rollers, etc.

Figure 29:
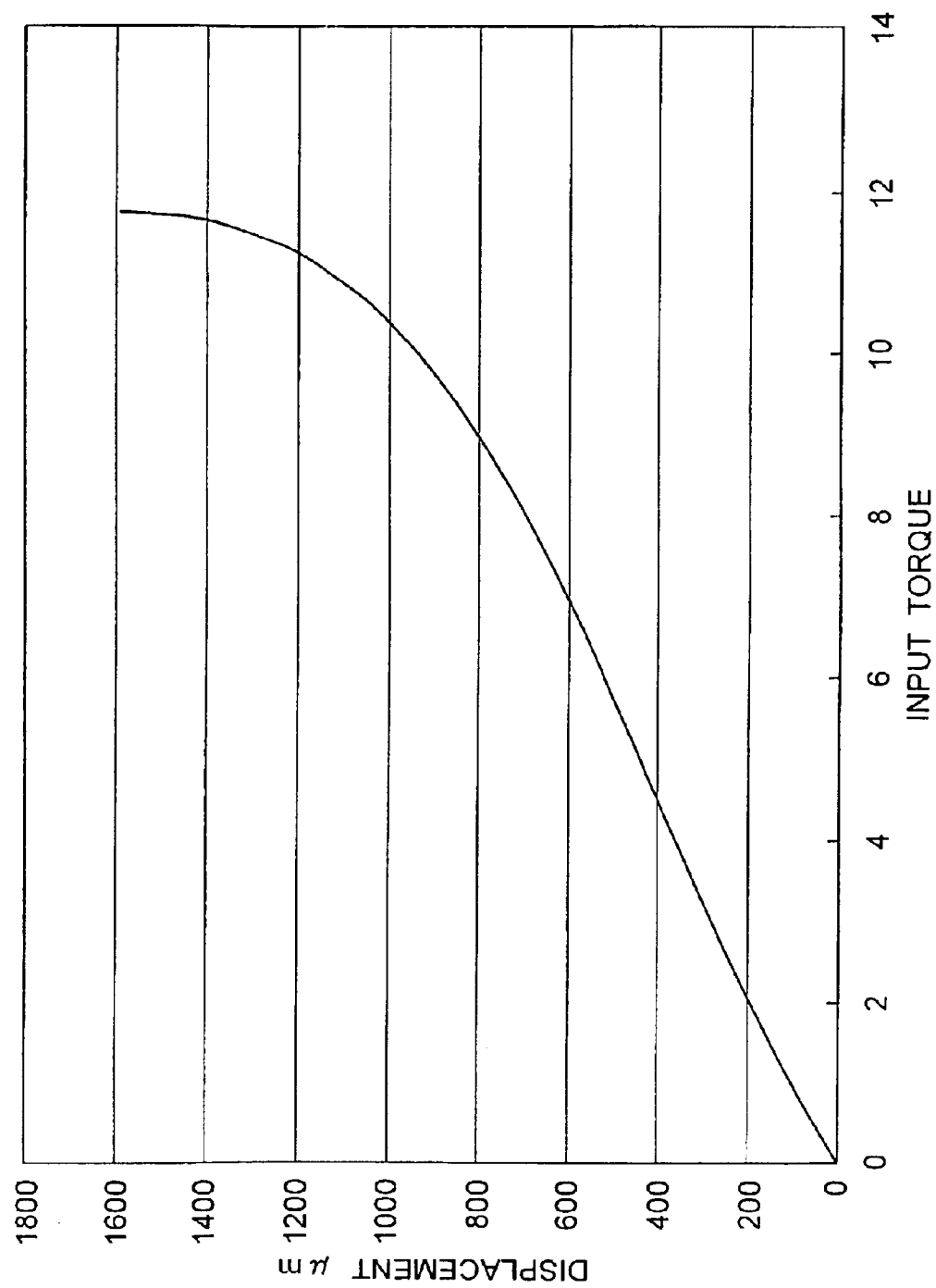
FIG. 29 is a graph for showing a relation of a roller displacement with respect to an input torque.

A relation between the roller displacement and the input torque is shown in FIG. 29. Note that the graph curve is changed, depending on the roller diameter, the dimensions of the roller such as the length, the materials of the rollers and the housings, the rigidity of Bearing.

When the input torque increases, the roller displacement is drastically increased, which is caused because the angle of contact of the roller is decreased due to a decrease of an off-set of the center of the third roller with respect to the line for connecting the center of the first roller to that of the second roller so that a component in a direction of separating the first roller and the second roller from each other with respect to the pressing force is drastically increased, whereby the roller displacement is increased in accordance with the amount of the elastic deformation.

Figure 30:
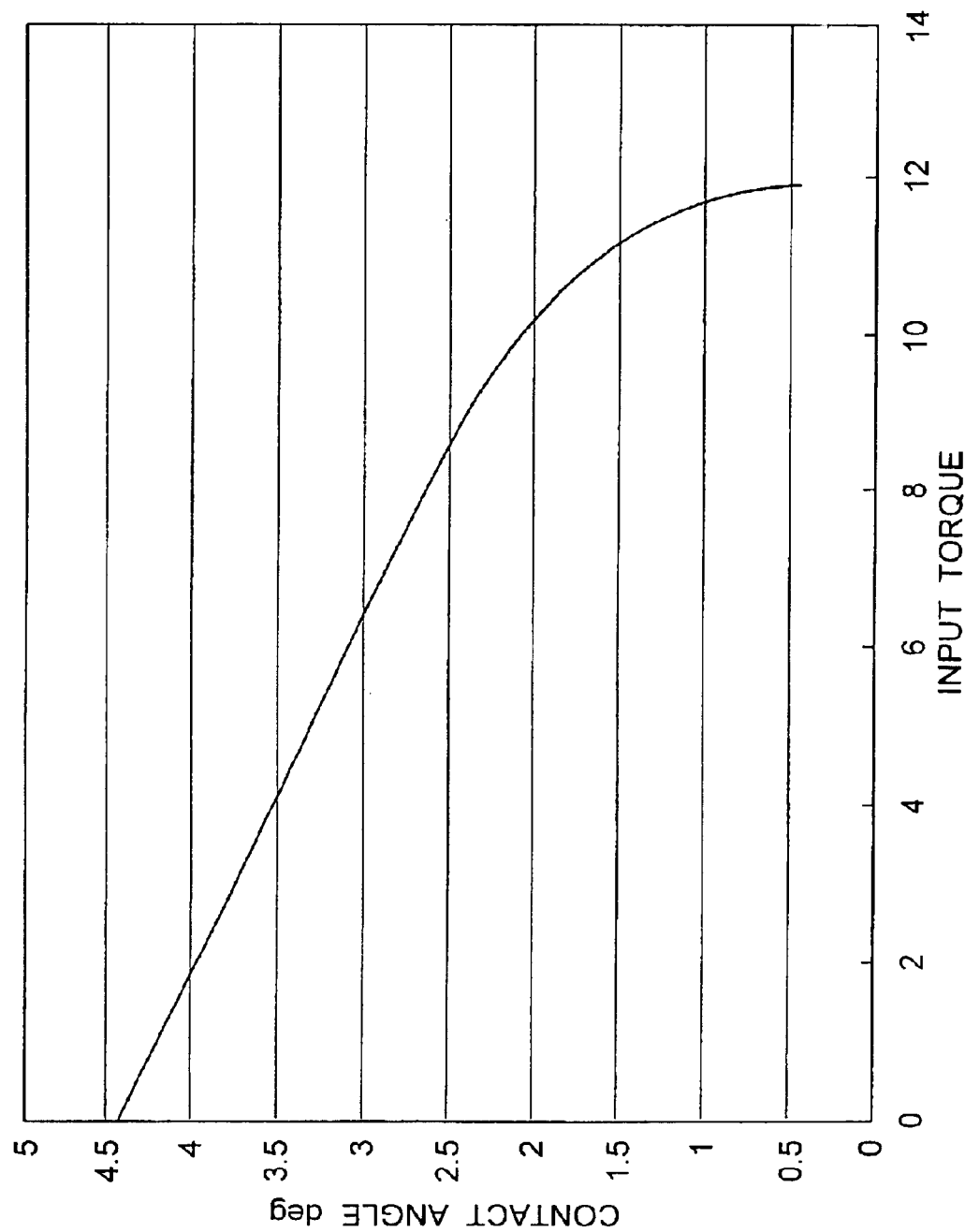
FIG. 30 is a graph for showing a relation of an angle of contact with respect to an input torque.

A relation between the input torque and the angle of contact is shown in FIG. 30.

A pressing power is generated in accordance with the input torque. However, an increment of the pressing power is larger than that of the input torque due to the above phenomenon, so that a transmittable torque with respect to the input torque is sufficiently larger than the input torque.

Figure 31:
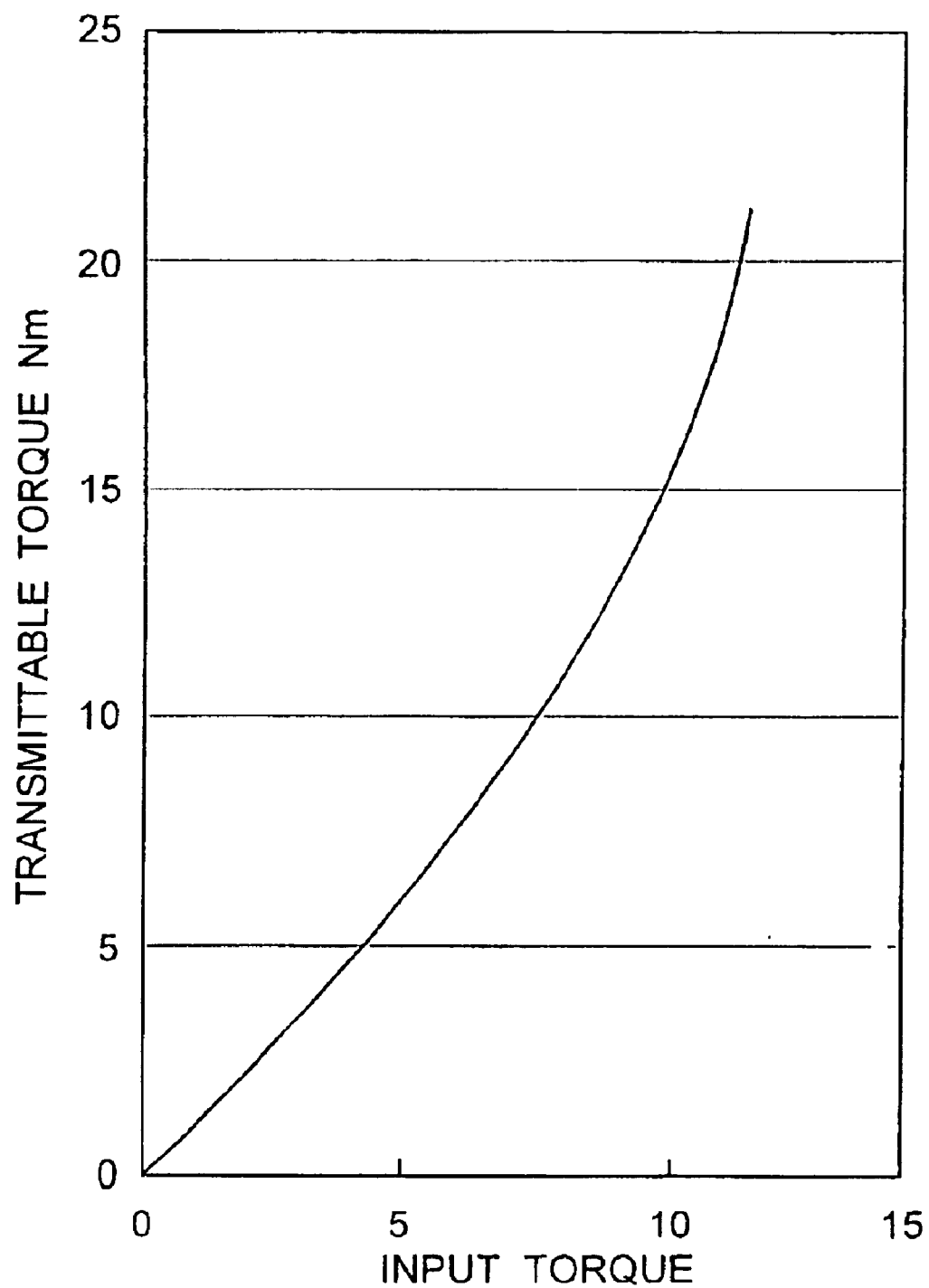
FIG. 31 is a graph for showing a relation between an input torque and a transmittable torque.

FIG. 31 shows a relation between the input torque and the transmittable torque.

Figure 32:
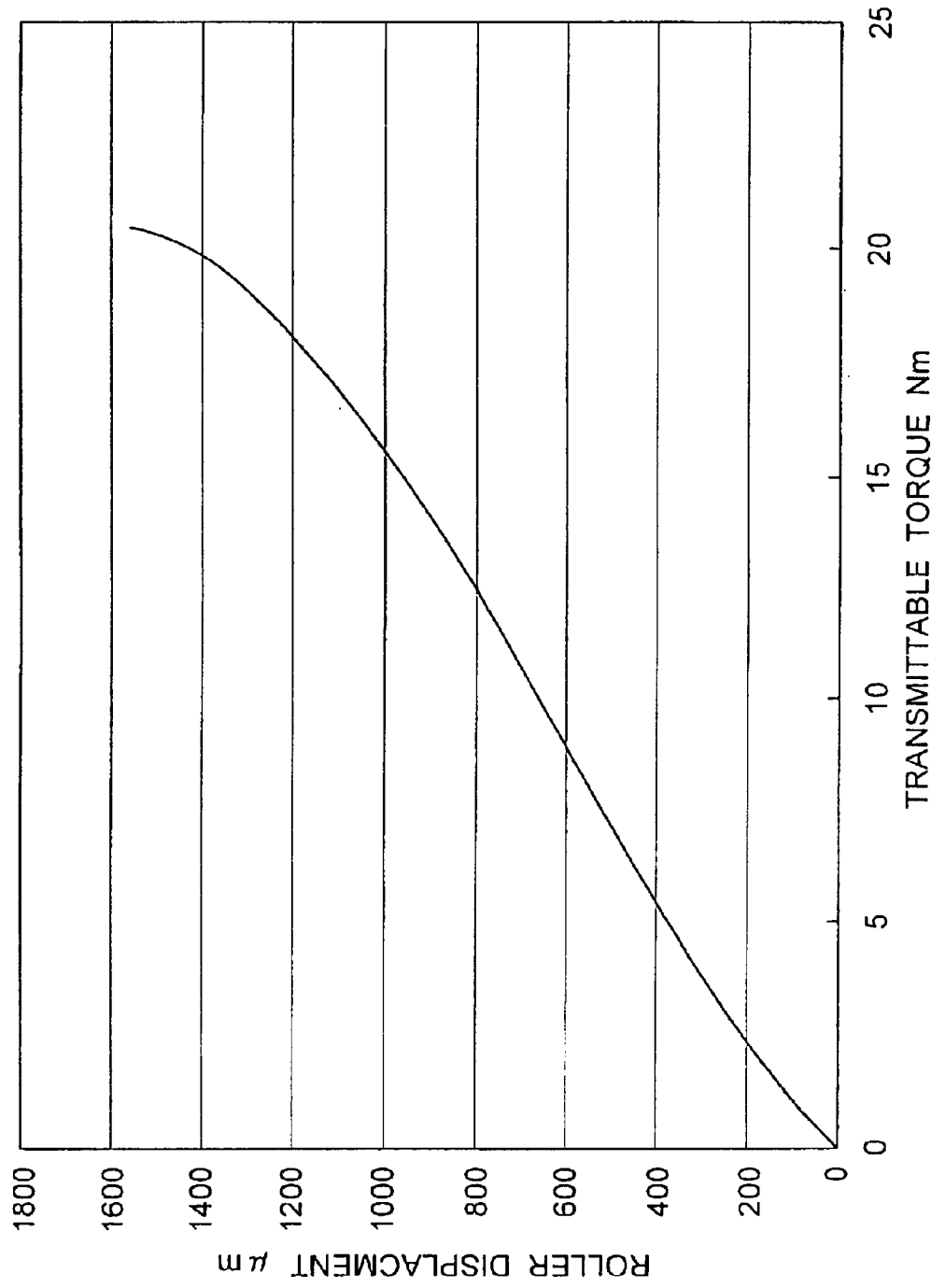
FIG. 32 is a graph for showing a relation between to the transmittable torque and a displacement of the third roller.

FIG. 32 shows a relation between the transmittable torque and a displacement of the third roller.

In accordance with the graph in FIG. 32, the torque for causing transmission is defined as the transmittable torque, so as to obtain a displacement of the third roller at that time, and the back-up roller is fixed rotatably with respect to the housing at a position for preventing further displacement of the third roller, whereby an upper limit for the transmittable torque can be set.

When displacing in accordance with the input torque, the third roller is brought into contact with the back-up roller at a predetermined position, thereby preventing further displacement. When the input torque is further increased, a tangential power between the third roller and the first and second rollers becomes larger, so that the pressing power is increased. However, the increment of the pressing power after the contact is borne by the back-up roller, so that the pressing force between the third roller and the first and second rollers can be maintained at a fixed level. When the transmittable torque reaches a predetermined level, there arises a sliding between the third roller and the first and second rollers, so that a torque of not less than a predetermined amount can not be transmitted.

As described above, according to the eleventh and twelfth embodiments of the present invention, it is possible to prevent a damage of the transmission paths which may be caused by an excessive torque by limiting the displacement of the third roller into a predetermined amount to prevent riding-over, thereby preventing the torque transmission in not less than a predetermined amount.

(Thirteenth Embodiment)

FIGS. 35A through 35C are views of a frictional roller transmission (speed reducing apparatus) according to the thirteenth embodiment of the present invention, in which FIG. 35A is a lateral cross sectional view of the transmission, FIG. 35B is a cross sectional view along line b—b in FIG. 35A, and FIG. 35C is a cross sectional view along line c—c in FIG. 35B.

Figure 36:
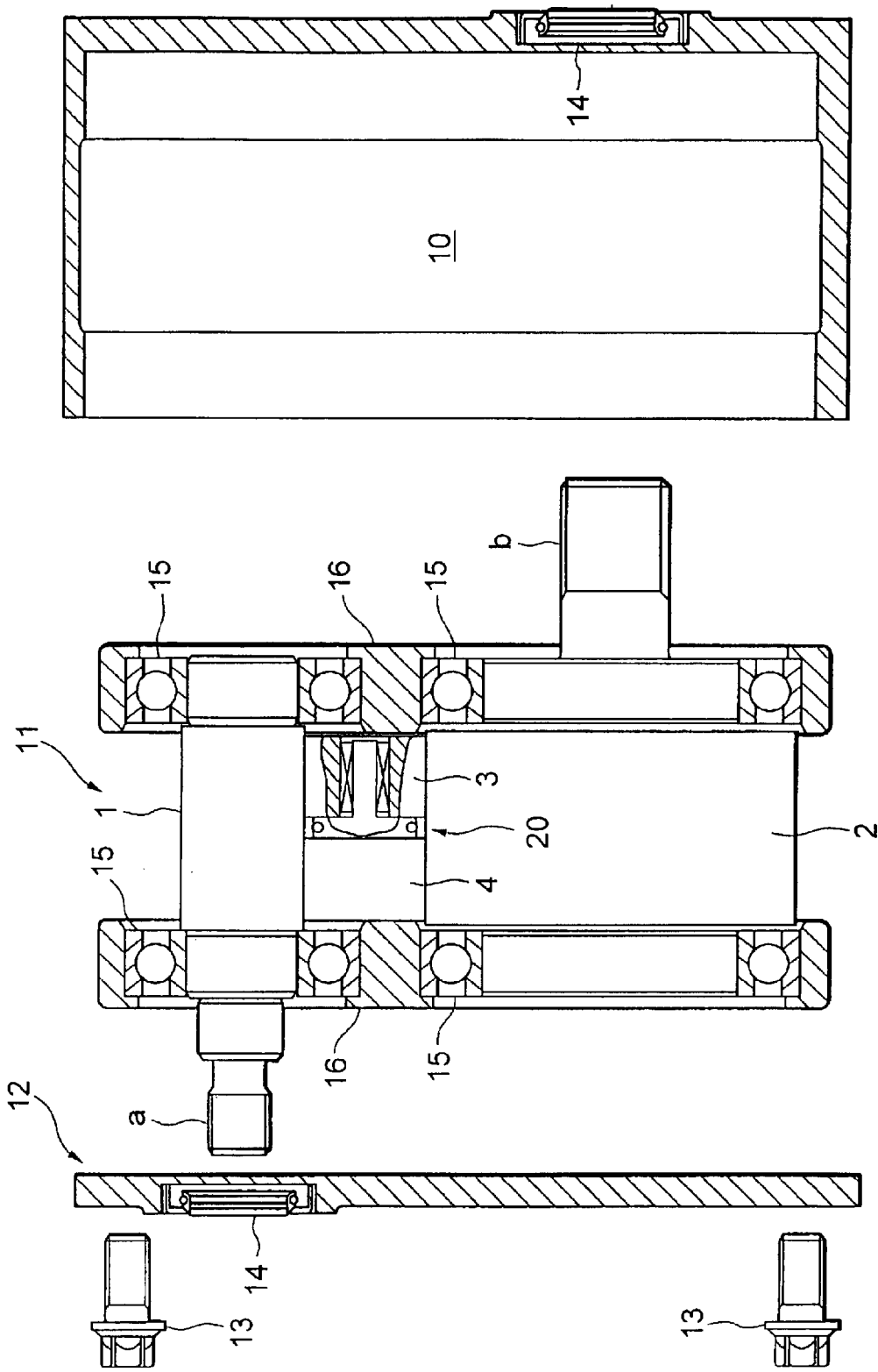
FIG. 36 is an exploded cross sectional view of the frictional roller transmission (speed reducing apparatus) shown in FIGS. 35A through 35C.

FIG. 36 is an exploded cross sectional view of the frictional roller transmission (speed reducing apparatus) shown in FIGS. 35A through 35C.

Figure 37A:
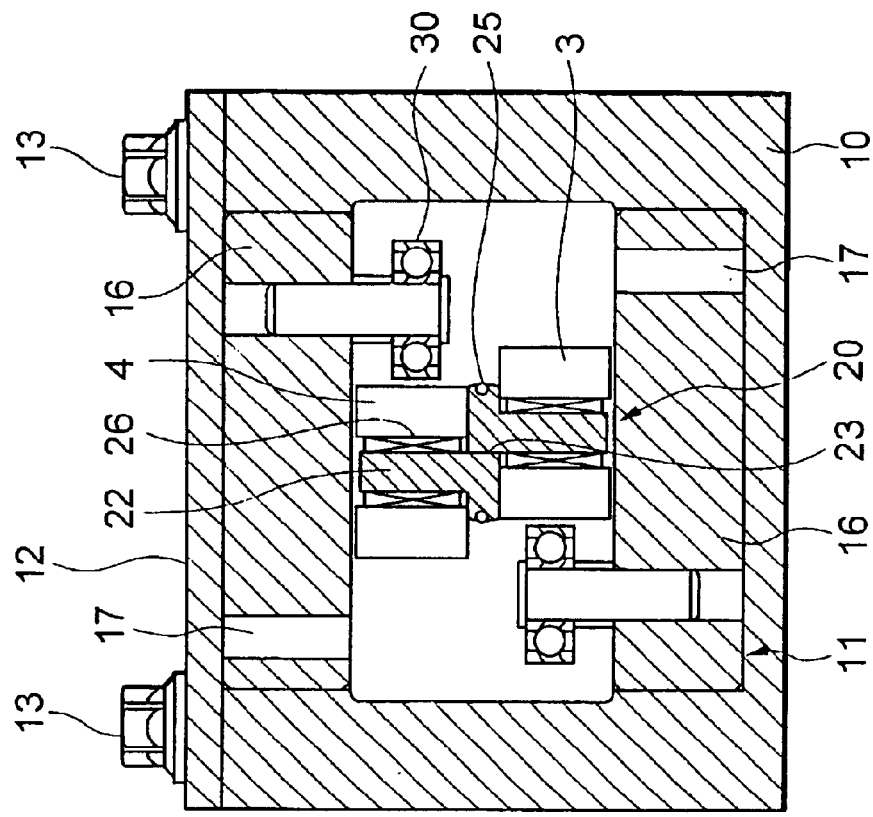
FIGS. 37A is a planar cross sectional view of the frictional roller transmission (speed reducing apparatus) shown in FIGS. 35A through 35C.

FIG. 37A is a planar cross sectional view of the frictional roller transmission (speed reducing apparatus) shown in FIGS. 35A through 35C, and FIG. 37B is a planar cross sectional view of a frictional roller transmission (speed reducing apparatus) according to a variation thereof.

The thirteenth embodiment has basically the same arrangements as those of the foregoing embodiments with respect to the layout of the first to fourth rollers 1 to 4, an angle of contact, and a fictional angle.

As shown in FIGS. 35A through 35C, a unit member 11 is accommodated in a housing frame 10, and a cover 12 is mounted thereon by means of a bolt 13. The housing frame 10 is formed of a light-weight material such as aluminum alloy, and can be formed by die casting or the like.

Note that seal members 14 are provided in a support portion of an output shaft b of the housing frame 10 and a support portion of an input shaft a of the cover 12. When using a bearing with a seal, it is possible to reduce the sliding diameter of the seal, so that an increase of the working torque due to friction of the seal can be reduced.

In the unit member 11, there are provided two coupling plates 16 for coupling a pair of bearings 15 for supporting the first and second rollers 1 and 2 to each other. These coupling plates 16 are formed of a material having substantially the same coefficient of linear expansion as that of the third and fourth rollers 3 and 4.

The surfaces of the coupling plates 16 may be used as sliding surfaces of the third and fourth rollers 3 and 4. However, in a conventional housing of an integral type, the bottom surfaces of insertion holes for the third and fourth rollers 3 and 4 serve as the sliding surfaces, which results in a difficult finishing process. However, according to the present embodiment, the two coupling plates 16 are in simple plate forms, so that the finishing process of the sliding surfaces can be carried out easily. In addition, the coupling plates may be formed by pressing work so that the finishing process itself is no longer required. In addition, the coupling plates having the same form may be used by arranging them to face each other, thereby reducing the processing cost.

As described, in the present embodiment, the two coupling plates 16 for coupling the first and second rollers 1 and 2 to each other through the bearings 15 at the both ends thereof are formed as the assembled unit member 11 of a material having substantially the same coefficient of linear expansion as that of the rollers. Then, this unit member 11 is accommodated in the housing frame 10 formed of a light-weight material such as an aluminum alloy, thereby reducing the weight thereof.

Figure 37B:
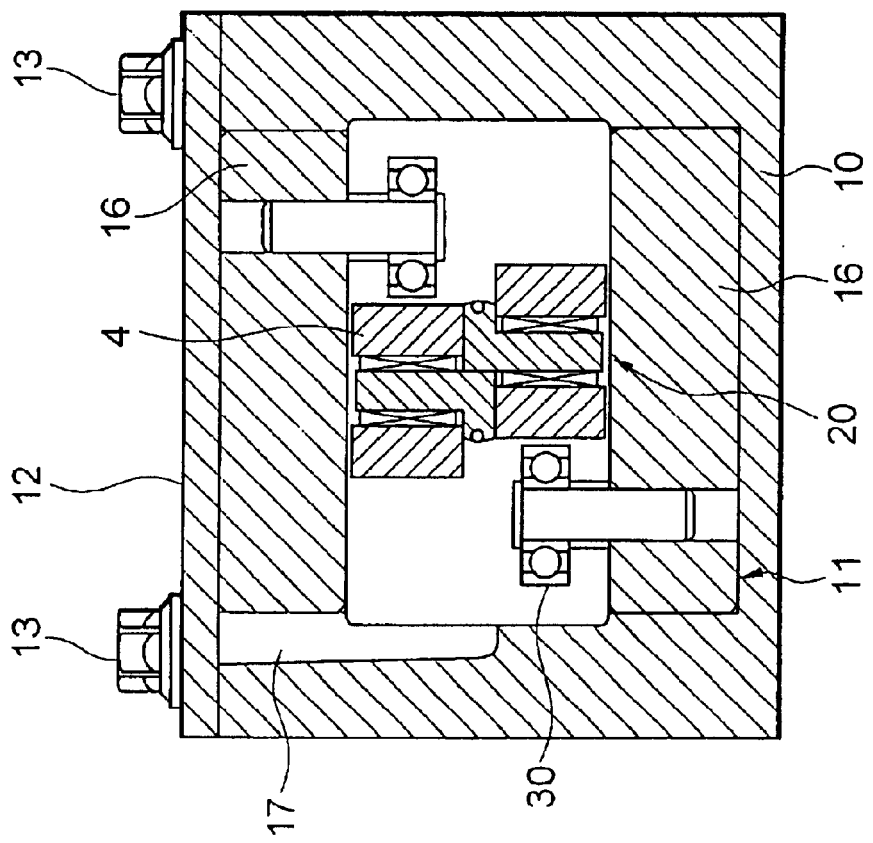
FIG. 37B is a planar cross sectional view of a frictional roller transmission (speed reducing apparatus) according to a variation thereof.

Also, as shown in FIG. 37A, there are provided injection holes 17 through which lubricating oil is injected to the coupling plates 16. Or, as shown in FIG. 37B, there is provided an injection hole 17 through which lubricating oil is injected to the housing frame 10.

Further, as specifically shown in FIG. 37A, a holder 20 is composed of a flange portion 21 and a shaft portion 22. The flange portion 21 and the shaft portion 22 are eccentric from each other by a predetermined amount, and the flange portion 21 has a substantially semicircular cross section. It is possible to couple the holders 20 to each other by arranging the shaft portions 22 thereof in the opposite directions, and a joint surface therebetween serves as a stopper surface 23, with annular grooves 24 on the outer peripheral surface thereof which becomes one piece when the holders are coupled to each other. A wire ring 25 which serves as a spring element is inserted in the annular groove 24, and an elasticity is given to the groove 24 in a direction in which the both shaft portions 22 are close to each other. As a result, the both shaft portions are integrated as a unitary unit. Both the shaft portions 22 are supported rotatably by the third and fourth rollers 3 and 4 respectively through the bearings 26.

There is also provided a back-up roller 30 which is brought into contact with the third and fourth rollers 3 and 4 for restricting the displacement of the third and fourth rollers 3 and 4 into a predetermined amount. This back-up roller 30 may be, for example, a rolling bearing with the outer race serving as a contact surface. As described, according to the present embodiment, it is possible to prevent a damage of the transmission paths which may be caused by an excessive torque by limiting the displacement of the third and fourth rollers 3 and 4 into a predetermined amount to prevent riding-over of these rollers 3 and 4, thereby preventing the torque transmission in not less than a predetermined amount.

Next, description will be made on a fourteenth embodiment of the present invention in which the thirteenth embodiment of the present invention described above is applied to an electric power steering apparatus of an automobile with reference to FIG. 38 and FIGS. 39A and 39B.

Figure 38:
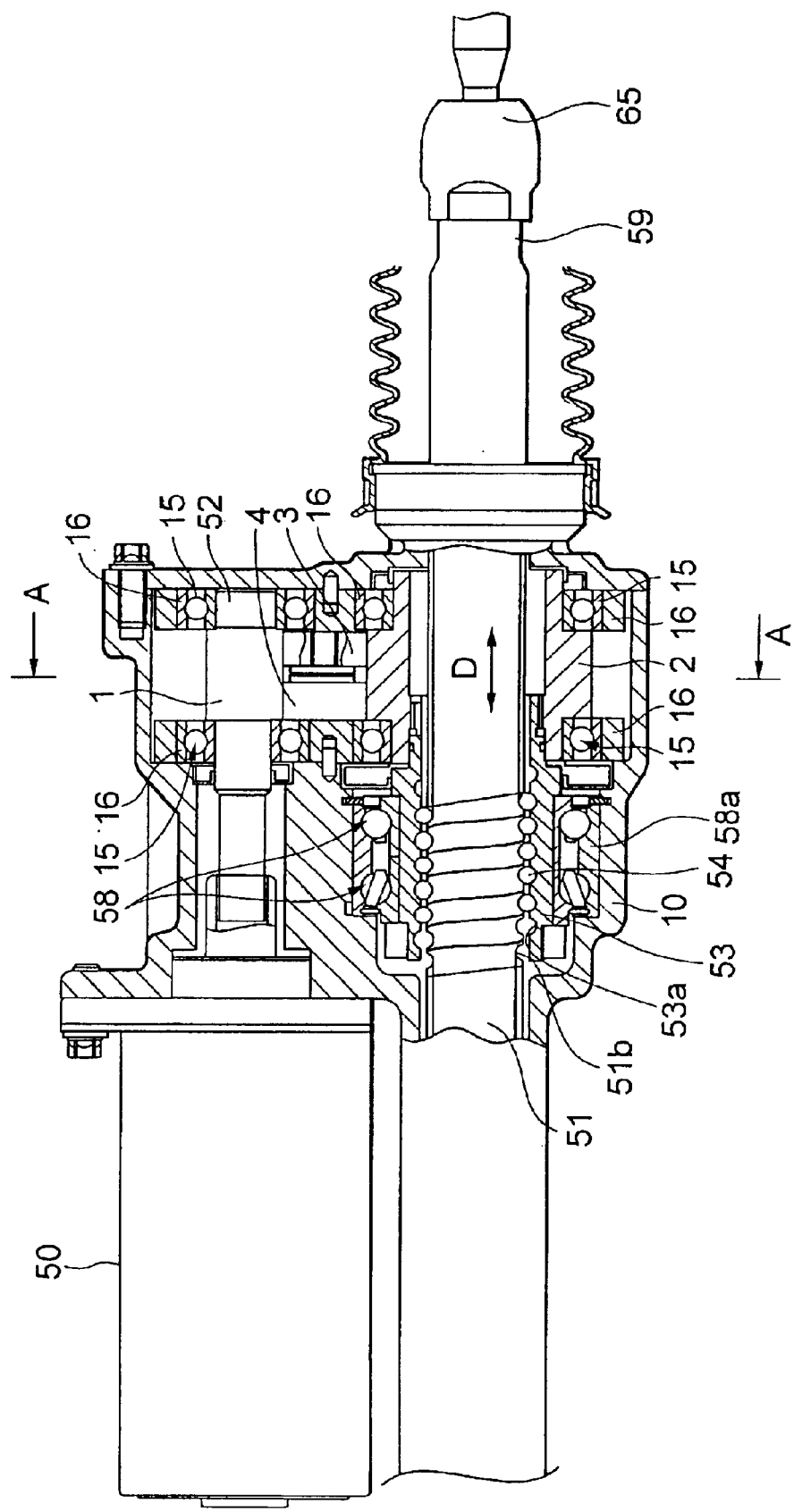
FIG. 38 is a view for showing a sectional configuration of a power steering apparatus of an automobile according to a fourteenth embodiment of the present invention.

FIG. 38 a view for showing a sectional configuration of a power steering apparatus of an automobile according to the fourteenth embodiment of the present invention. FIG. 39A is a cross sectional view along line A—A in FIG. 38 for showing a part of the frictional roller transmission serving as a rotation decelerating means, and FIG. 39B is a cross sectional view along line B—B in FIG. 39A.

In FIG. 38, the first roller 1 is fixed in the same axial line of an output rotary shaft of an electric motor 50, which is an electric motor unit, on the output rotary shaft 52.

The second roller 2 is fixedly fitted in a nut-shaped ball screw nut 53, or integrally formed therewith. The ball screw nut 53 is rotatably supported through bearings 58, 58 and 15, 15 with respect to the housings 10 and 11, and is fitted on a rack shaft 51, or surrounds the rack shaft 51. On the rack shaft 51, a helical groove 51b is formed to be engaged with a helical groove 53a of the ball screw nut 53 indirectly through balls 54. That is, the ball screw nut 53 and the rack shaft 51 are indirectly engaged with each other through a large number of spherical balls 54 which are rotatably fitted in troughs of the helical groove 53a and the helical groove 51b, and the ball screw nut 53 is fitted in a part of the helical groove 51b in the axial direction thereof. The ball screw nut 53 and the ball 54 constitute a so-called ball screw and nut assembly which is known.

Like in the embodiment shown in FIGS. 35A to 35C and FIG. 36, the unit member 11 is accommodated in the housing frame 10.

In the unit member 11, there are provided two coupling plates 16 for coupling a pair of bearings 15 for supporting the first and second rollers 1 and 2 to each other. These coupling plates 16 are formed of a material having substantially the same coefficient of linear expansion as that of the third and fourth rollers 3 and 4.

The surfaces of the coupling plates 16 may be used as sliding surfaces of the third and fourth rollers 3 and 4. However, in the present embodiment, the two coupling plates 16 are in simple plate forms, so that the finishing process of the sliding surfaces can be carried out easily. In addition, the coupling plates may be formed by pressing work so that the finishing process itself is no longer required. In addition, the coupling plates having the same form may be used by arranging them to face each other, thereby reducing the processing cost.

As described, in the fourteenth embodiment, the two coupling plates 16 for coupling the first and second rollers 1 and 2 to each other through the bearings 15 at the both ends thereof are formed as the assembled unit member 11 of a material having substantially the same coefficient of linear expansion as that of the rollers. Then, this unit member 11 is accommodated in the housing frame 10 formed of a light-weight material such as an aluminum alloy, thereby reducing the weight thereof.

Figure 39B:
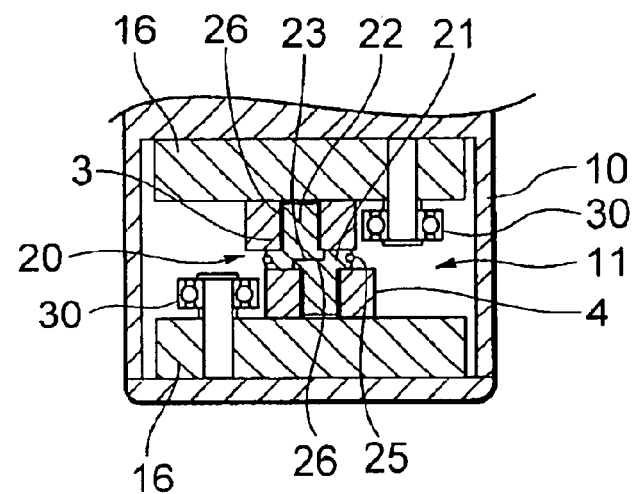
FIG. 39B is a cross sectional view along line B—B in FIG. 39A.
Figure 39A:
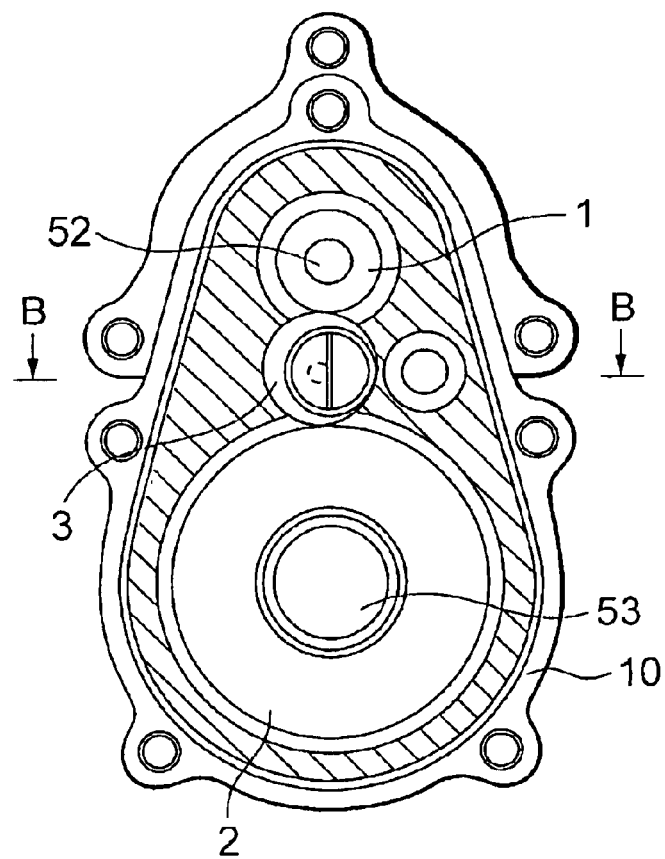
FIG. 39A is a cross sectional view along line A—A in FIG. 38.

Further, as specifically shown in FIG. 39B, a holder 20 is composed of a flange portion 21 and a shaft portion 22. The flange portion 21 and the shaft portion 22 are eccentric from each other by a predetermined amount, and the flange portion 21 has a step-shaped cross section. It is possible to couple the holders 20 to each other by arranging the shaft portions 22 thereof in the opposite directions, and a joint surface therebetween serves as a stopper surface 23, with annular grooves 24 on the outer peripheral surface thereof which becomes one piece when the holders are coupled to each other. A wire ring 25 which serves as a spring element is inserted in the annular groove 24, and an elasticity is given to the groove 24 in a direction in which the both shaft portions 22 are close to each other. As a result, the both shaft portions are integrated as a unitary unit. Both the shaft portions 22 are supported rotatably by the third and fourth rollers 3 and 4 respectively through the bearings 26.

There is also provided a back-up roller 30 which is brought into contact with the third and fourth rollers 3 and 4 for restricting the displacement of the third and fourth rollers 3 and 4 into a predetermined amount. This back-up roller 30 may be, for example, a rolling bearing with the outer race serving as a contact surface. As described above, according to the present embodiment, it is possible to prevent a damage of the transmission paths which may be caused by an excessive torque by limiting the displacement of the third and fourth rollers 3 and 4 into a predetermined amount to prevent riding-over of these rollers 3 and 4, thereby preventing the torque transmission in not less than a predetermined amount.

As described above, also in the fourteenth embodiment, it is possible to constitute a transmission path from the first roller 1 to the third roller 3, and further to the second roller 2, and another transmission path from the first roller 1 to the fourth roller 4 and further to the second roller 2. It is also possible, in the backlashless frictional roller transmission (speed reducing apparatus), to reverse the direction of rotation. Also, since the roller pressing power corresponding to the transmission torque is generated, it is possible to minimize an increment of the working torque. It is possible to improve the efficiency particularly in an area with low transmission torque. In addition, since the rollers for power transmission are arranged for every rotational direction and are contacted with each other all the time, the torque transmission can be carried out without a delay or a colliding sound even when the rotational direction is reversed.

The electric motor 50 comprises a stator (not shown), a rotor having a rotary shaft (not shown), etc., and, in case of the fourteenth embodiment, is disposed in an axial direction which is substantially parallel to the rack shaft 51. The electric motor 50 may be disposed appropriately in an inclined manner in accordance with a spatial condition of its installation. One end of the rack shaft 51 is connected to a tie rod 65 through a ball joint 59.

A rack (not shown) is formed on a part of the rack shaft 51. This rack is fixedly fitted on a pinion shaft (not shown) which is connected to a lower end portion of a steering shaft (not shown) connected to a steering wheel (not shown) and is meshed with a pinion gear (not shown) which is arranged inside a pinion gear box (not shown). The steering shaft and the pinion shaft constitute a rotary shaft means, while the rack and the pinion gear constitute a rack pinion means, respectively. The rack pinion means itself is known as a member for driving to connect the rotary shaft means to the rack shaft 51.

Brief description will be made on an operation of the above arrangement. Though the driver controls the electric motor 50 on the basis of information including a torque to be applied on the steering wheel, the speed of the automobile, detailed description on a circuit for this controlling operation will be omitted since it is not directly related to the present invention. A control unit controls an output of the electric motor 50 so as to obtain an appropriate auxiliary power corresponding to the detected torque or the speed of the automobile.

The rotary shaft of the electric motor 50 and the shaft of the first roller 1 is coupled to each other. In this case, a rotation of the first roller 1 is transmitted to the ball screw nut 53 through the third roller 3, the fourth roller 4 and then the second roller 2, to thereby rotate the ball screw nut 53. Upon this rotation, the rack shaft 51 is driven in either direction indicated by the arrow D, thereby steering dirigible wheels. A torque of the steering shaft corresponding to a load received by the rack shaft 51 in this case and the speed of the automobile are detected, and an output of the electric motor 50 is controlled in accordance with these detected values, whereby the electric auxiliary power is appropriately applied on a manual steering power.

As described above, according to the thirteenth and fourteenth embodiments of the present invention, since the two coupling plates for respectively coupling the bearings for rotatably supporting the first roller and the second roller at the both end portions of the both rollers are formed of the material having substantially the same coefficient of linear expansion as that of the rollers, it is possible to form the housings of a material having a lighter weight, thereby reducing the total weight of the transmission.

(Fifteenth Embodiment)

The fifteenth embodiment is to concretize the basic configuration described above, and has the same arrangement as that of the basic configuration of the foregoing embodiments with respect to the layout of the first to fourth rollers 1 to 4, the contact angle, and the frictional angle.

As shown in FIG. 40A, a unit body 11 is accommodated in a housing frame 10, and a cover 12 is mounted thereon by means of bolts 13. The housing frame 10 is formed of light-weight material such as aluminum alloy, and can be formed by die casting or the like Note that seal members 14 are provided at a support portion of an output shaft b in the housing frame 10 and at a support portion of an input shaft a in the cover 12. It is possible to reduce the sliding diameter of the seal, compared with the case where a bearing with a seal is used, so that an increment of the working torque due to friction of the seal can be reduced.

The unit body 11 is provided with two coupling plates 16, 16 each of which couples a pair of ball bearings 15, 15 for supporting the first and second rollers 1 and 2, to each other. These coupling plates 16, 16 are formed of a material having substantially the same coefficient of linear expansion as that of the third and fourth rollers 3 and 4.

The surfaces of the coupling plates 16, 16 may be used also as sliding surfaces of the third and fourth rollers 3 and 4. However, the two coupling plates 16, 16 take simple plate forms so that the finishing process of the sliding surfaces can be carried out easily. In addition, the coupling plates may be formed by pressing work from a plate material, in which case the finishing process itself is not required. In addition, the coupling plates having the same form may be used by arranging them to face each other, thereby reducing the processing cost.

As described, the two coupling plates 16, 16 for coupling the first and second rollers 1 and 2 to each other through the bearings 15, 15 at the both ends thereof are formed as the assembled unit body 11 of a material having substantially the same coefficient of linear expansion as that of the rollers. Then, this unit body 11 is arranged to be accommodated in the housing frame 10 formed of a light-weight material such as an aluminum alloy. Consequently, the weight of the whole structure can be reduced.

Further, a holder 20 is composed of a flange portion 21 and a shaft portion 22. The flange portion 21 and the shaft portion 22 are eccentric from each other by a predetermined amount, and the flange portion 21 has a substantially semicircular cross section. It is possible to couple the holders 20 to each other by arranging the shaft portions 22 thereof in the opposite directions, and to arrange joint surfaces therebetween to serve as stopper surfaces 23, with annular grooves 24 on the outer peripheral surfaces thereof to become continuous when the holders are coupled to each other. A wire ring 25 which serves as a spring element is inserted in the annular grooves 24, and an elasticity is given in a direction in which the both shaft portions 22 are close to each other. The third and fourth rollers 3 and 4 are rotatably supported by the shaft portions 22 of the holders 20, respectively.

There are also provided back-up rollers 30 which are brought into contact, respectively, with the third and fourth rollers 3 and 4 for restricting the displacements of the third and fourth rollers 3 and 4 into predetermined amounts. The back-up rollers 30 each may be, for example, a rolling bearing with the outer race serving as a contact surface. As described, it is possible to prevent a damage of a torque transmission path which may be caused by an excessive torque by limiting the displacement of the third and fourth rollers 3 and 4 into a predetermined amount to prevent riding-over of these rollers 3 and 4, thereby preventing torque transmission exceeding a predetermined level.

(Sixteenth Embodiment)

FIGS. 41A and 41B are views for showing a frictional roller transmission (speed reducing apparatus) according to the sixteenth embodiment of the present invention, in which FIG. 41A is a side view thereof partially cut-away, and FIG. 41B is a cross sectional view taken along line b—b in FIG. 41A.

In this sixteenth embodiment, the respective pairs of bearings 15, 15 for supporting the first and second rollers 1 and 2 are needle bearings. Other arrangements and operations are the same as those in the above fifteenth embodiment.

(Seventeenth Embodiment)

Figure 42:
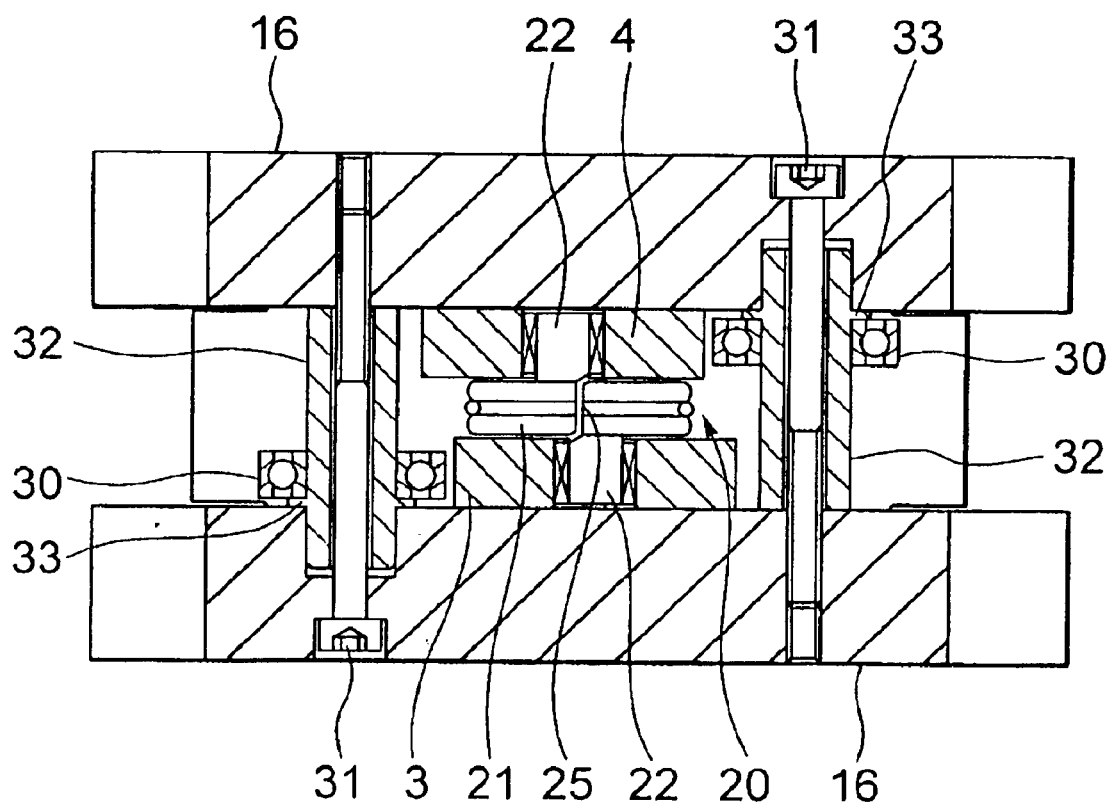
FIG. 42 is a cross sectional view of a part including the third and fourth rollers in the frictional roller transmission (speed reducing apparatus) according to a seventeenth embodiment of the present invention.
Figure 43:
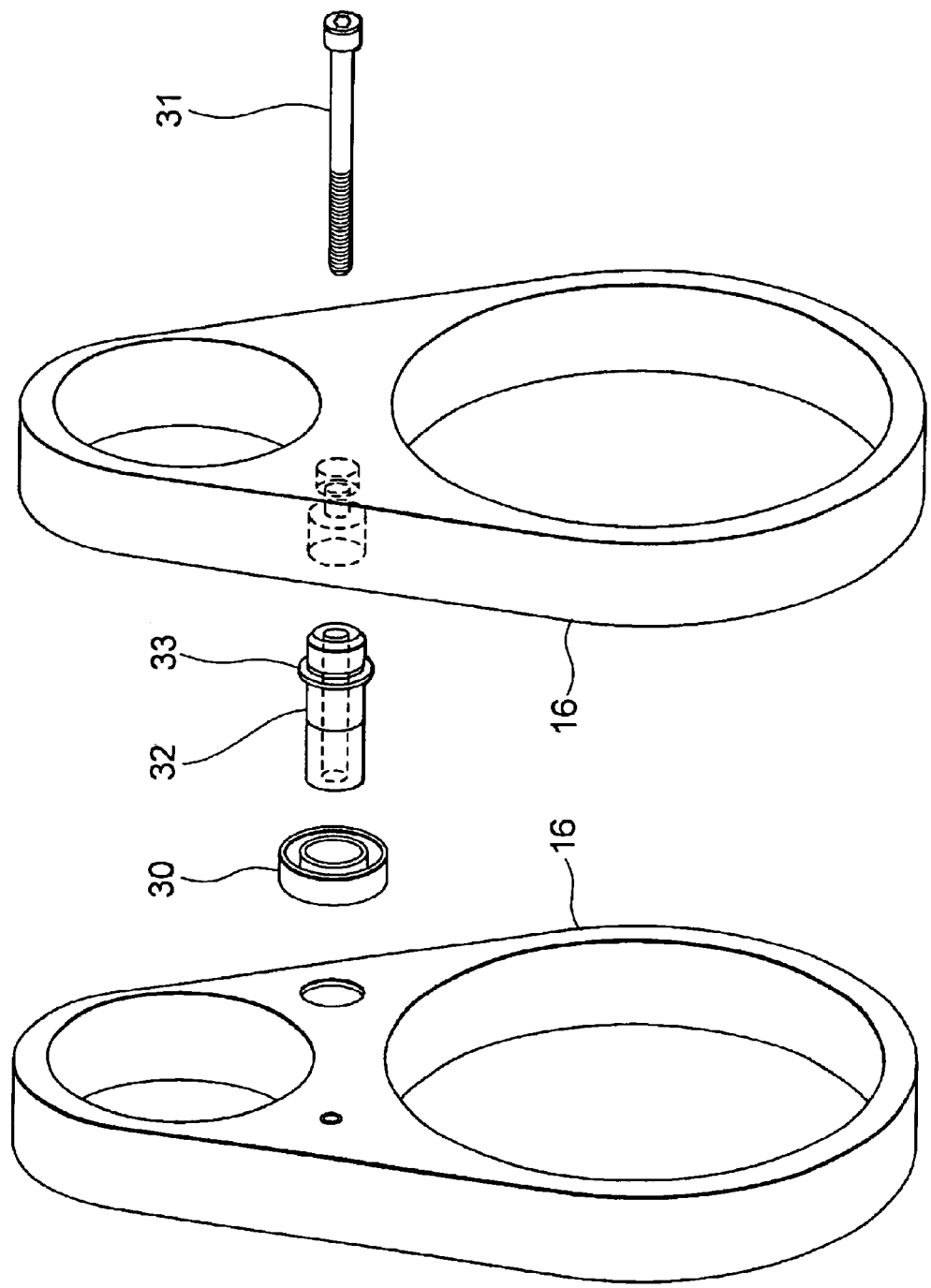
FIG. 43 is an exploded perspective view of a coupling plate and a back-up bearing in the frictional roller transmission (speed reducing apparatus) according to the seventeenth embodiment of the present invention.

FIG. 42 is a cross sectional view of a part including the third and fourth rollers in the frictional roller transmission (speed reducing apparatus) according to the seventeenth embodiment of the present invention. FIG. 43 is an exploded perspective view of coupling plates and a back-up bearing in the frictional roller transmission (speed reducing apparatus) according to the seventeenth embodiment of the present invention.

The bolts 31, 31 are inserted through the coupling plates 16, 16 to be threadably engaged therewith. The bolts 31, 31 are inserted through cylindrical spacers 32, 32, and the cylindrical spacers 32, 32 are respectively formed with flanges 33, 33. On the side surfaces of the flanges 33, 33, there are provided back-up bearings 30, 30 described above. In FIG. 43, only one set of the back-up bearing 30, bolt 31 and cylindrical spacer 32 is shown.

In the seventeenth embodiment, the bolts 31, 31 are inserted through the cylindrical spacers 32, 32 from the end surfaces thereof on the sides of the flanges 33, 33.

The distance between the two coupling plates 16, 16 is set at a predetermined value by the end surfaces of the flanges 33, 33 of the cylindrical spacers 32, 32 and the end surfaces on the opposite sides of the cylindrical spacers 32, 32.

(Eighteenth Embodiment)

Figure 44:
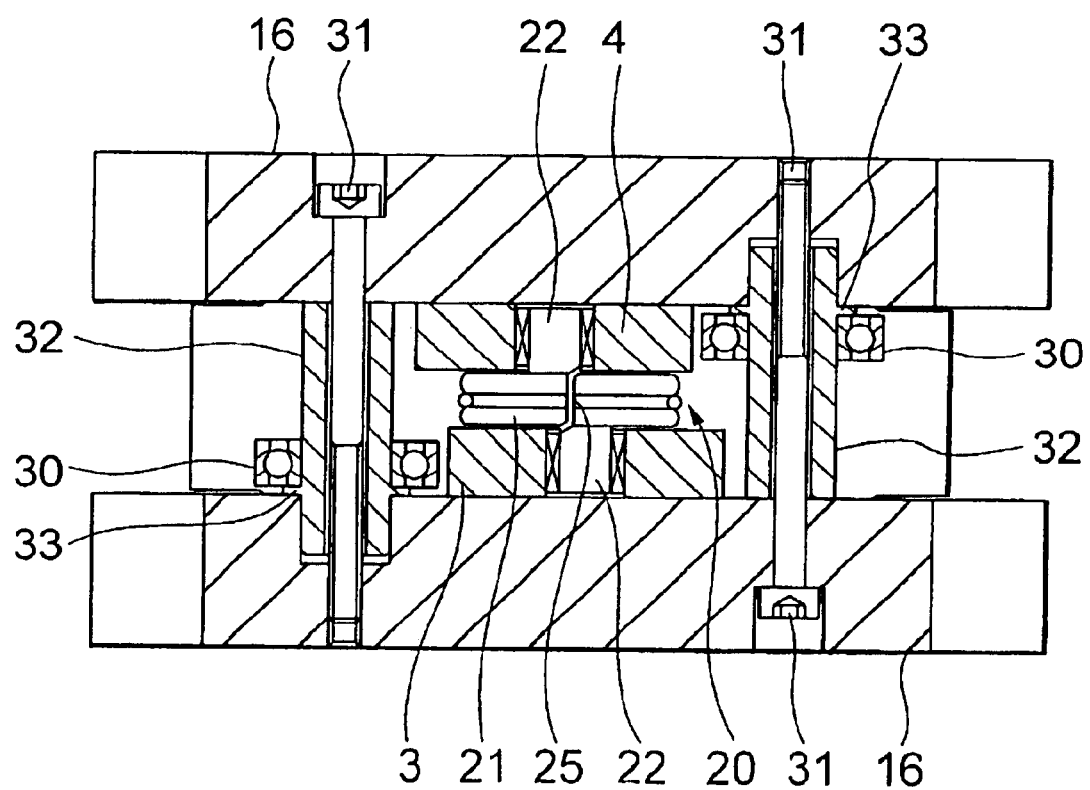
FIG. 44 is a cross sectional view of a part including the third and fourth rollers in the frictional roller transmission (speed reducing apparatus) according to an eighteenth embodiment of the present invention.
Figure 45:
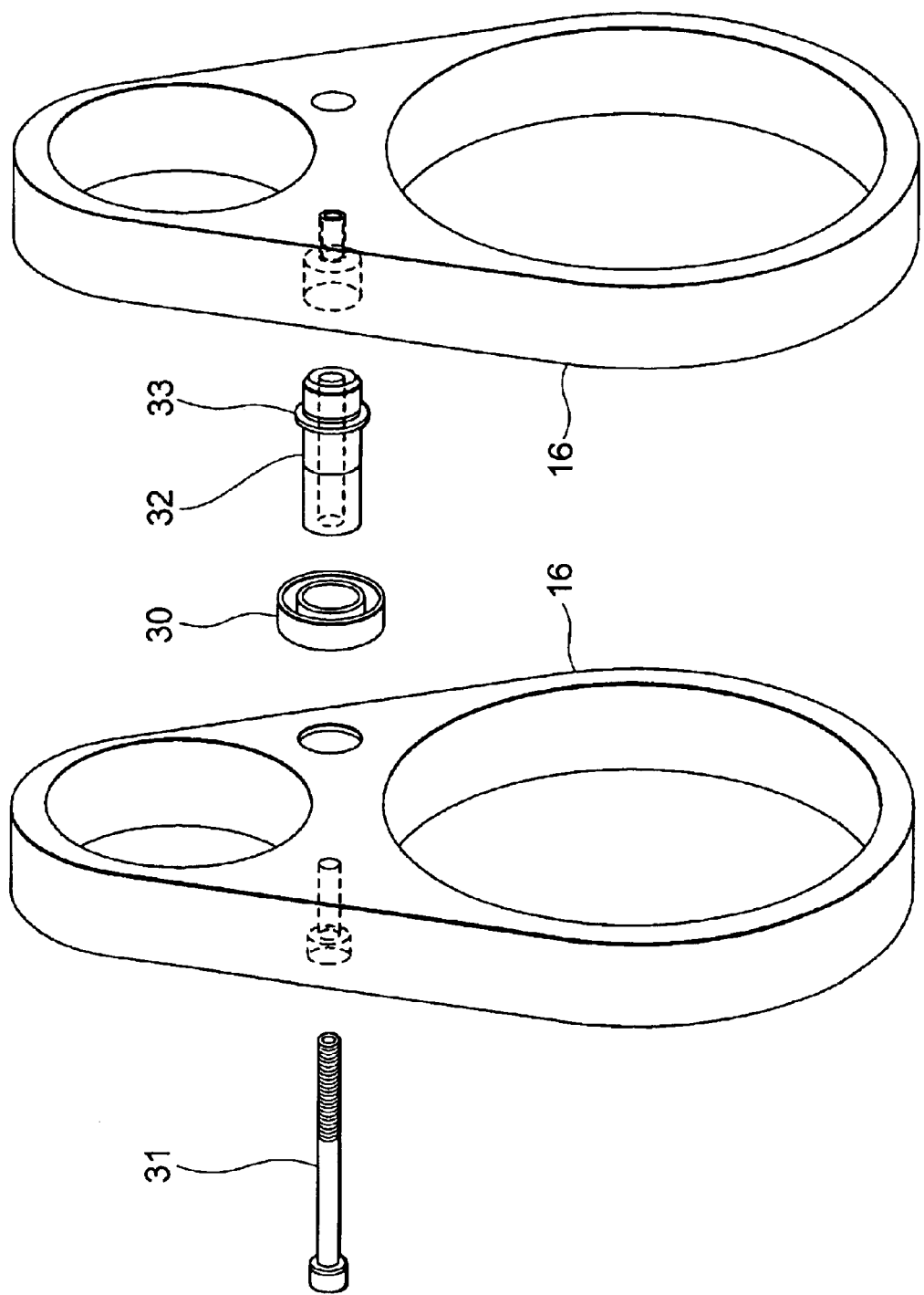
FIG. 45 is an exploded perspective view of a coupling plate and a back-up bearing in the frictional roller transmission (speed reducing apparatus) according to the eighteenth embodiment of the present invention.

FIG. 44 is a cross sectional view of a part including the third and fourth rollers in the frictional roller transmission (speed reducing apparatus) according to the eighteenth embodiment of the present invention. FIG. 45 is an exploded perspective view of coupling plates and a back-up bearing in the frictional roller transmission (speed reducing apparatus) according to the eighteenth embodiment of the present invention.

In the seventeenth embodiment described above, the bolts 31, 31 are inserted through the cylindrical spacers 32, 32 from the end surfaces thereof on the sides of the flanges 33, 33. In FIG. 44, only one set of the back-up bearing 30, bolt 31 and cylindrical spacer 32 is shown.

In contrast to this, in the eighteenth embodiment, the bolts 31, 31 are inserted through the cylindrical spacers 32, 32 from the end surfaces on the opposite sides. Other arrangements and operations are the same as those in the above seventeenth embodiment.

(Nineteenth Embodiment)

Figure 46:
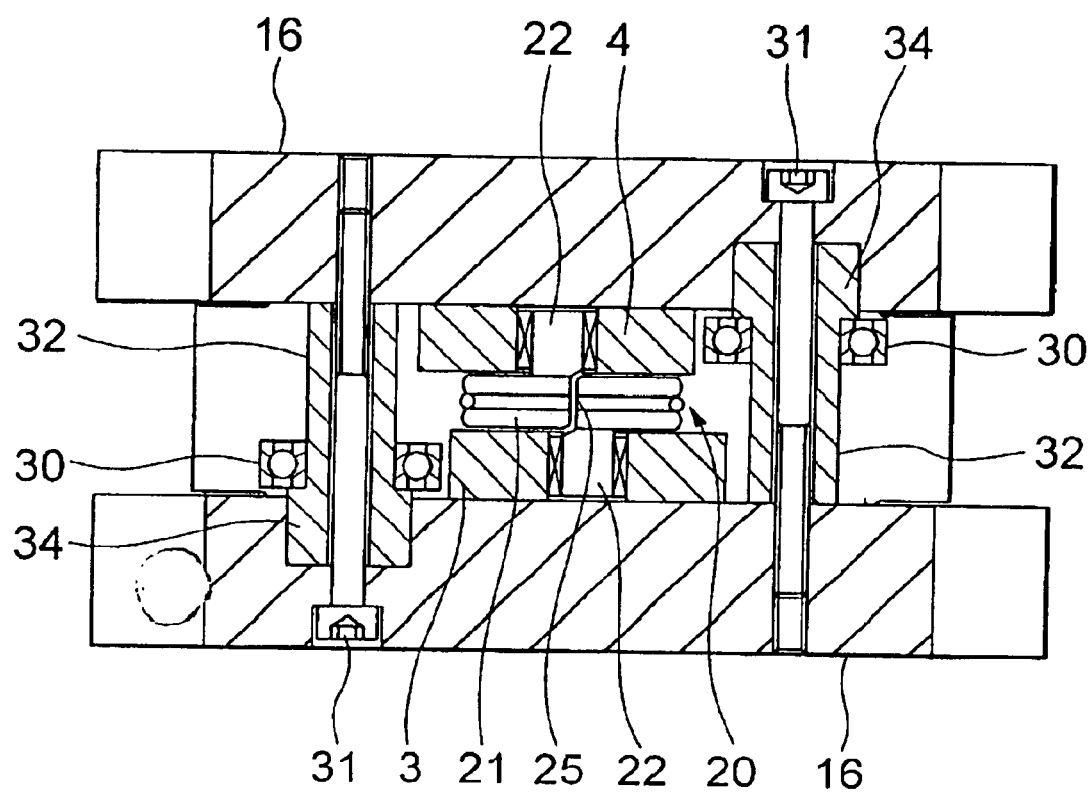
FIG. 46 is a cross sectional view of a part including the third and fourth rollers in the frictional roller transmission (speed reducing apparatus) according to a nineteenth embodiment of the present invention.
Figure 47:
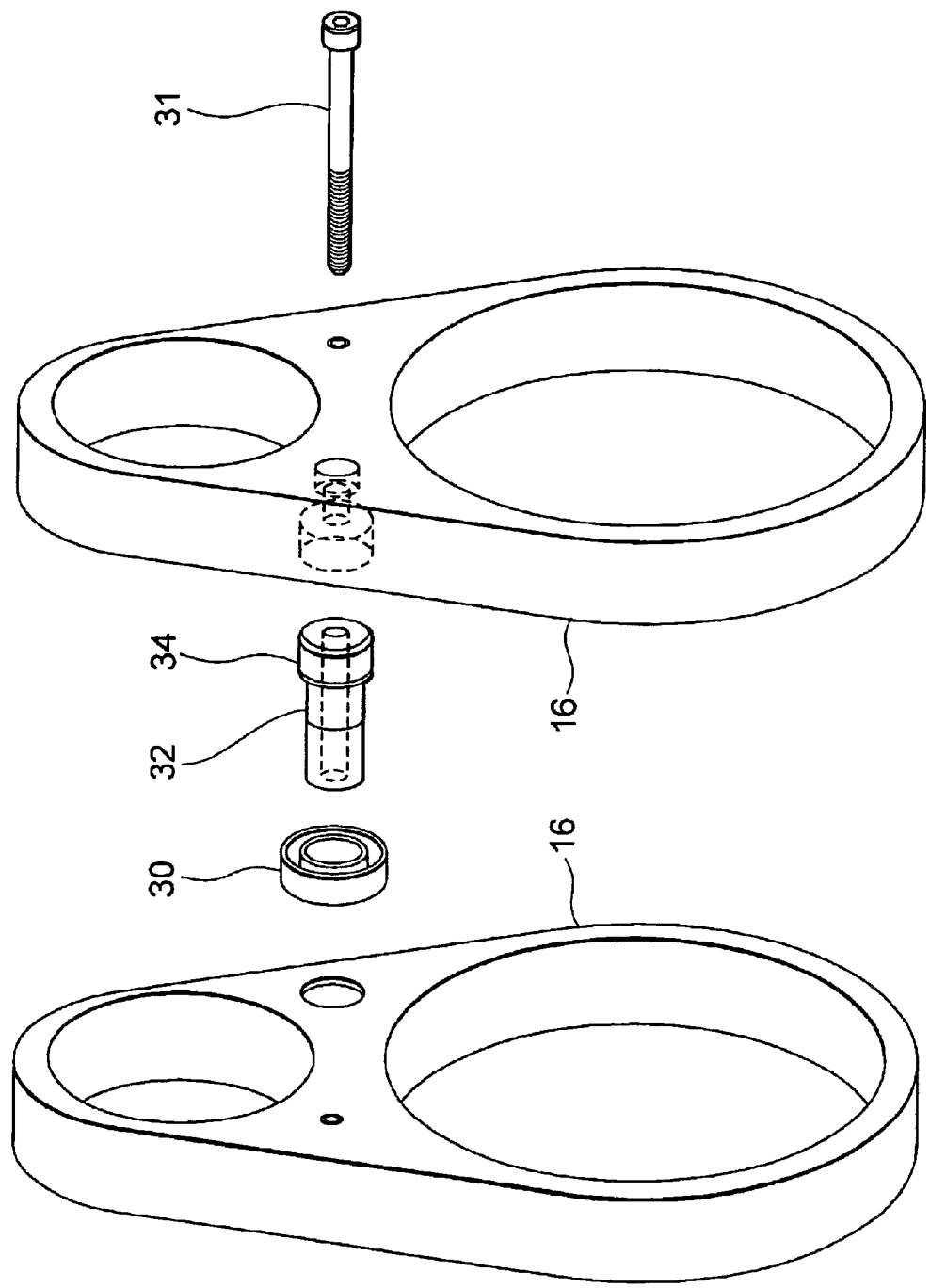
FIG. 47 is an exploded perspective view of a coupling plate and a back-up bearing in the frictional roller transmission (speed reducing apparatus) according to the nineteenth embodiment of the present invention.

FIG. 46 is a cross sectional view of a part including the third and fourth rollers in the frictional roller transmission (speed reducing apparatus) according to the nineteenth embodiment of the present invention. FIG. 47 is an exploded perspective view of coupling plates and a back-up bearing in the frictional roller transmission (speed reducing apparatus) according to the nineteenth embodiment of the present invention.

The bolts 31, 31 are inserted through the coupling plates 16, 16 to be threadably engaged therewith. The bolts 31, 31 are inserted through cylindrical spacers 32, 32, and the cylindrical spacers 32, 32 are respectively provided with enlarged-diameter portions 34, 34. On the side surfaces of the enlarged-diameter portions 34, 34, there are provided back-up bearings 30, 30 described above. In FIG. 47, only one set of the back-up bearing 30, bolt 31 and cylindrical spacer is shown.

In the nineteenth embodiment, the bolts 31, 31 are inserted through the cylindrical spacers 32, 32 from the end surfaces thereof on the sides of the enlarged-diameter portions 34, 34.

The distance between the two coupling plates 16, 16 is set at a predetermined value by the end surfaces of the enlarged-diameter portions 34, 34 of the cylindrical spacers 32, 32 and the end surfaces on the opposite sides of the cylindrical spacers 32, 32.

(Twentieth Embodiment)

Figure 48:
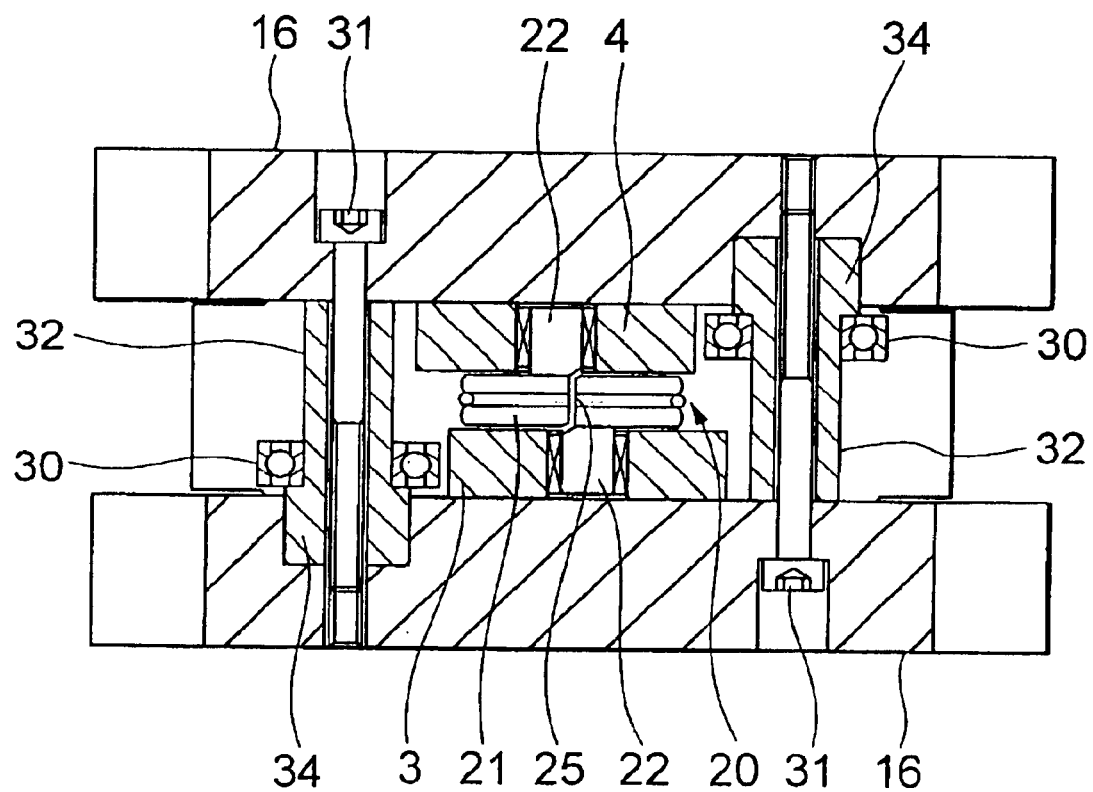
FIG. 48 is a cross sectional view of a part including the third and fourth rollers in the frictional roller transmission (speed reducing apparatus) according to a twentieth embodiment of the present invention.
Figure 49:
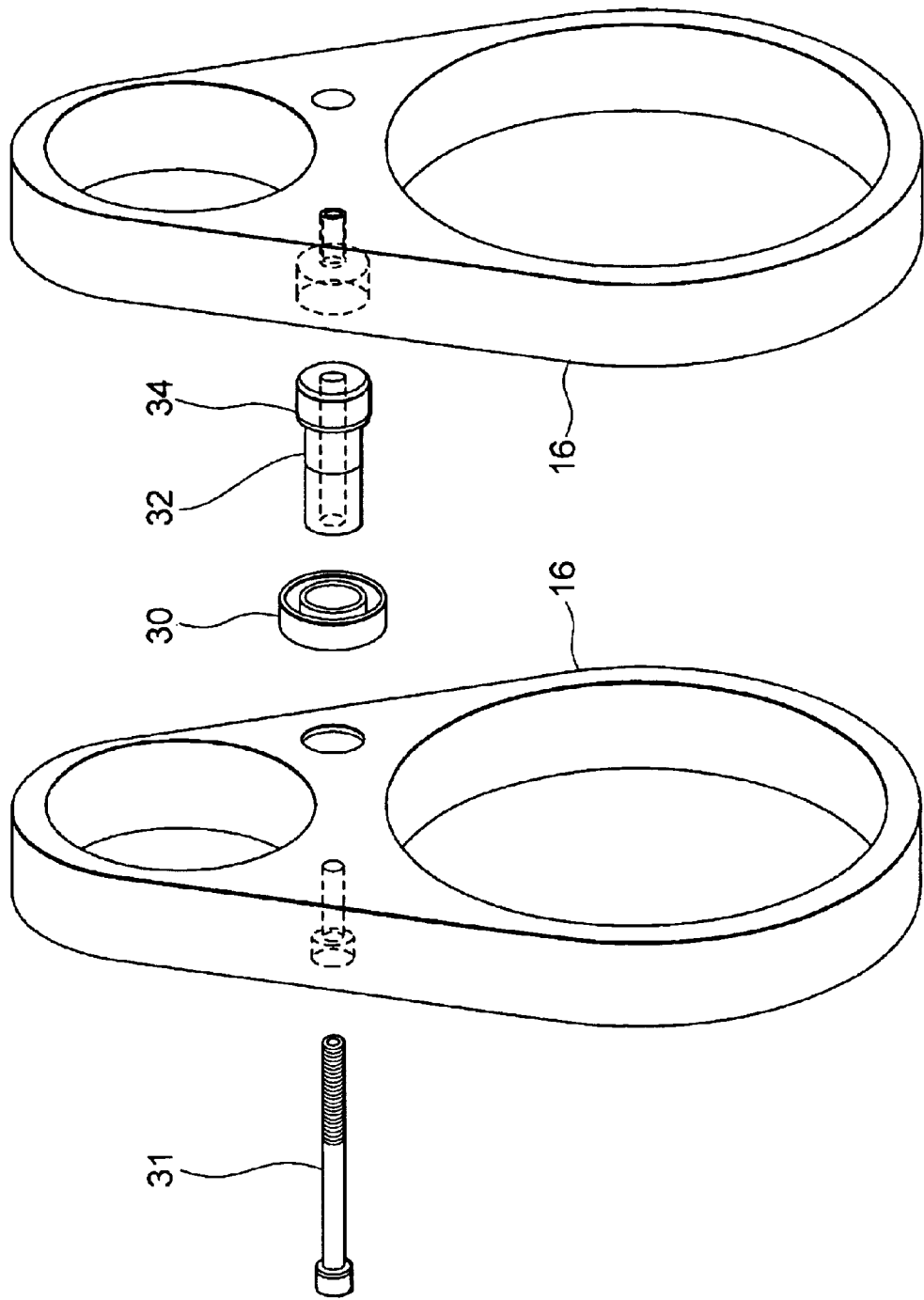
FIG. 49 is an exploded perspective view of a coupling plate and a back-up bearing in the frictional roller transmission (speed reducing apparatus) according to the twentieth embodiment of the present invention.

FIG. 48 is a cross sectional view of a part including the third and fourth rollers in the frictional roller transmission (speed reducing apparatus) according to the twentieth embodiment of the present invention. FIG. 49 is an exploded perspective view of coupling plates and a back-up bearing in the frictional roller transmission (speed reducing apparatus) according to the twentieth embodiment of the present invention.

In the nineteenth embodiment described above, the bolts 31, 31 are inserted through the cylindrical spacers 32, 32 from the end surfaces thereof on the sides of the enlarged-diameter portions 34, 34.

In contrast to this, in the twentieth embodiment, the bolts 31, 31 are inserted through the cylindrical spacers 32, 32 from the end surfaces on the opposite sides. Other arrangements and operations are the same as those in the above nineteenth embodiment. In FIG. 49, only one set of the back-up bearing 30, bolt 31 and cylindrical spacer 32 is shown.

(Twenty-First Embodiment)

Figure 50:
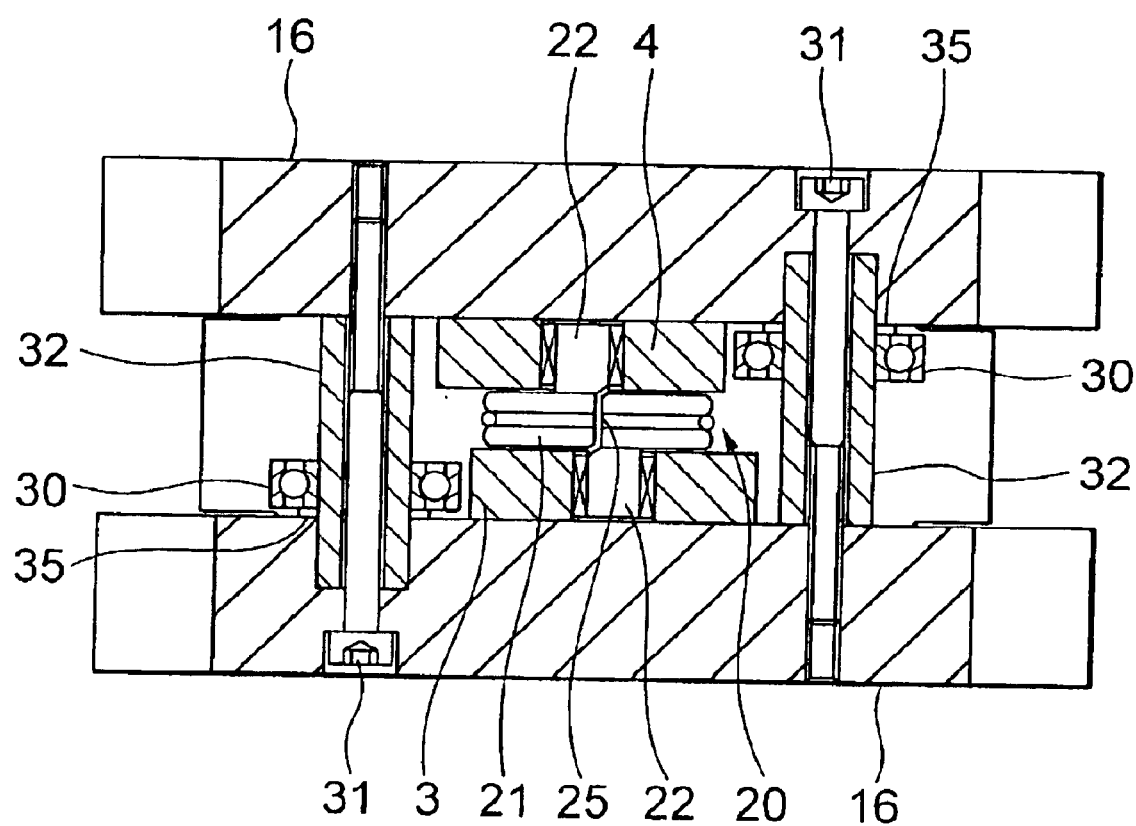
FIG. 50 is a cross sectional view of a part including the third and fourth rollers in the frictional roller transmission (speed reducing apparatus) according to a twenty-first embodiment of the present invention.
Figure 51:
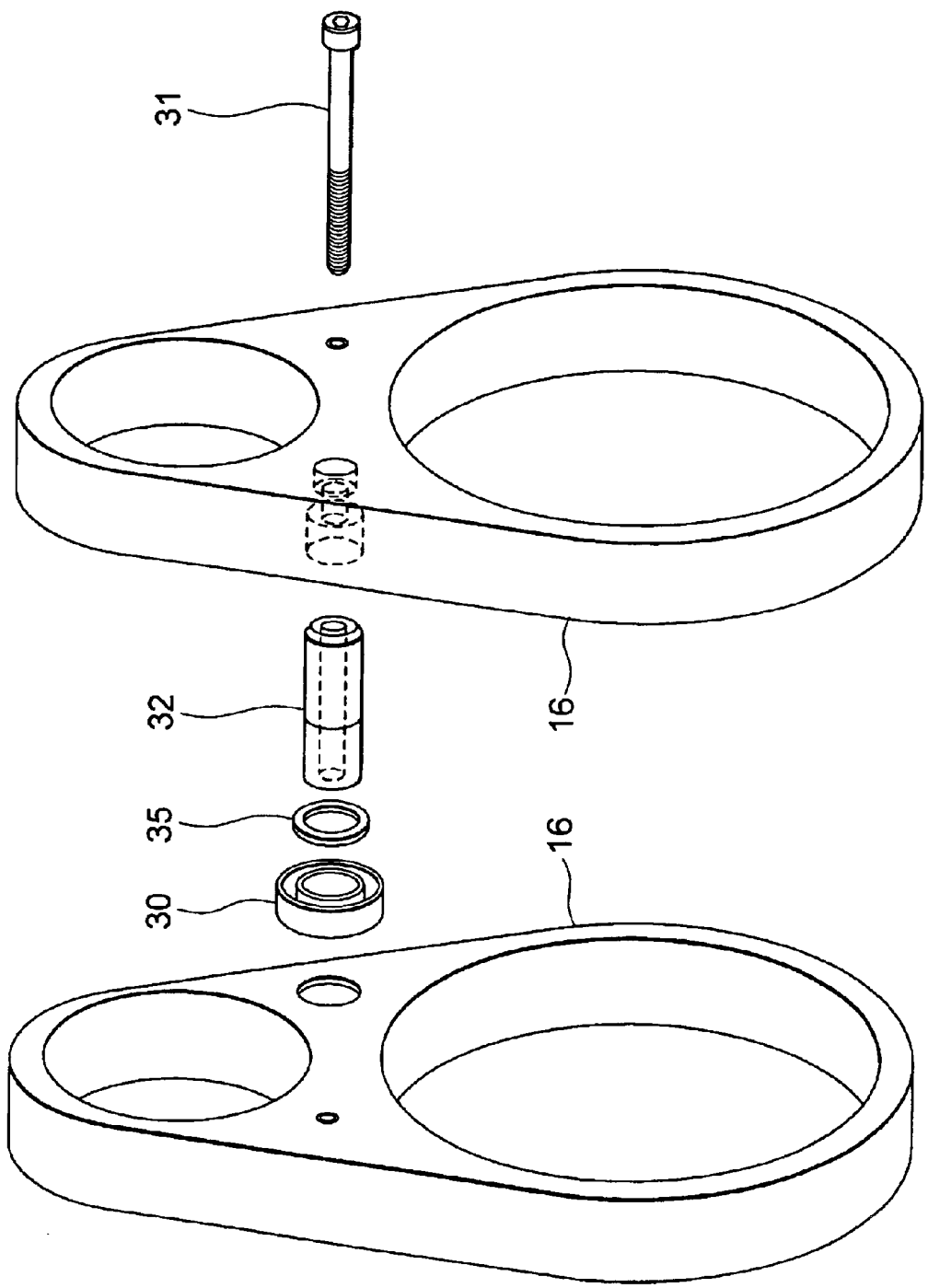
FIG. 51 is an exploded perspective view of a coupling plate and a back-up bearing in the frictional roller transmission (speed reducing apparatus) according to the twenty-first embodiment of the present invention.

FIG. 50 is a cross sectional view of a part including the third and fourth rollers in the frictional roller transmission (speed reducing apparatus) according to the twenty-first embodiment of the present invention. FIG. 51 is an exploded perspective view of coupling plates and a back-up bearing in the frictional roller transmission (speed decreasing apparatus) according to the twenty-first embodiment of the present invention.

A pair of bolts 31, 31 are inserted through the coupling plates 16, 16 to be threadably engaged therewith. The bolts 31, 31 are inserted through cylindrical spacers 32, 32, and the cylindrical spacers 32, 32 are respectively provided with washers 35, 35. On the side surfaces of the washers 35, 35, there are provided back-up bearings 30, 30 described above.

In the twenty-first embodiment, the bolts 31, 31 are inserted through the cylindrical spacers 32, 32 from the end surfaces thereof on the sides of the washers 35, 35.

The distance between the two coupling plates 16, 16 is set at a predetermined value by the end surfaces of the cylindrical spacers 32, 32 and the end surfaces on the opposite sides of the cylindrical spacers 32, 32, on the opposite sides of the cylindrical spacers 32, 32. In FIG. 51, only one set of the back-up bearing 30, bolt 31, cylindrical spacer 32 and washer 35 is shown.

(Twenty-Second Embodiment)

Figure 52:
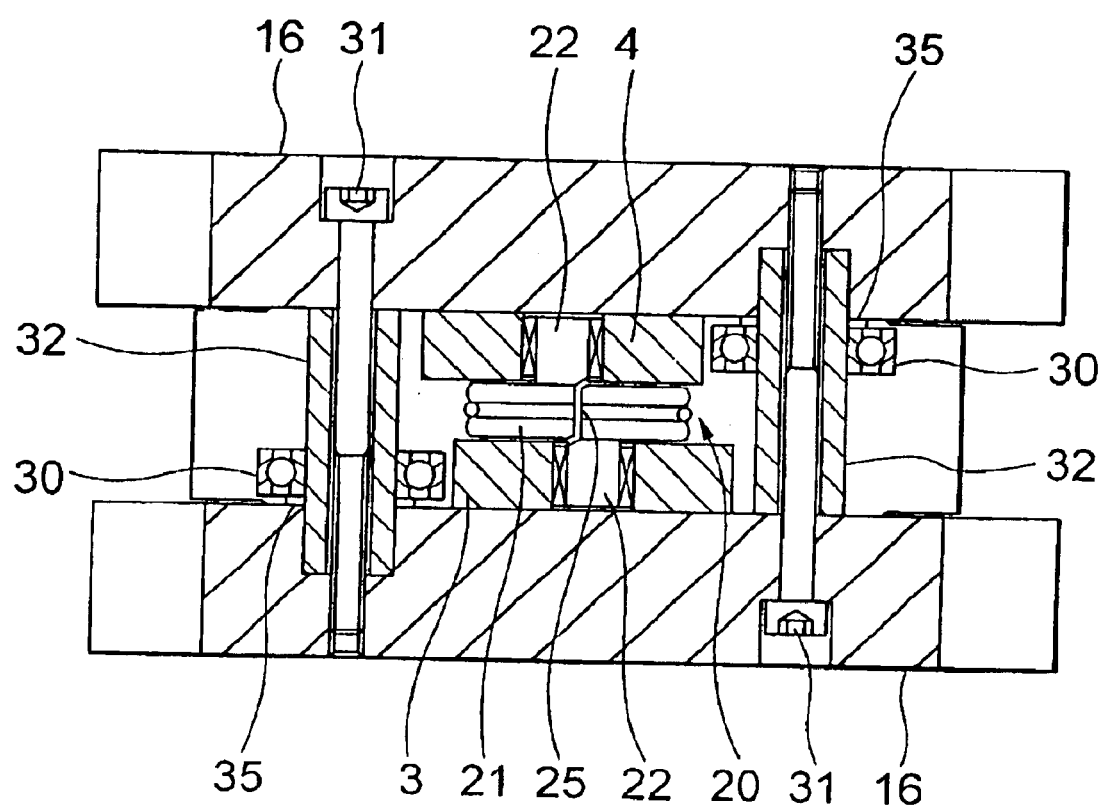
FIG. 52 is a cross sectional view of a part including the third and fourth rollers in the frictional roller transmission (speed reducing apparatus) according to a twenty-second embodiment of the present invention.
Figure 53:
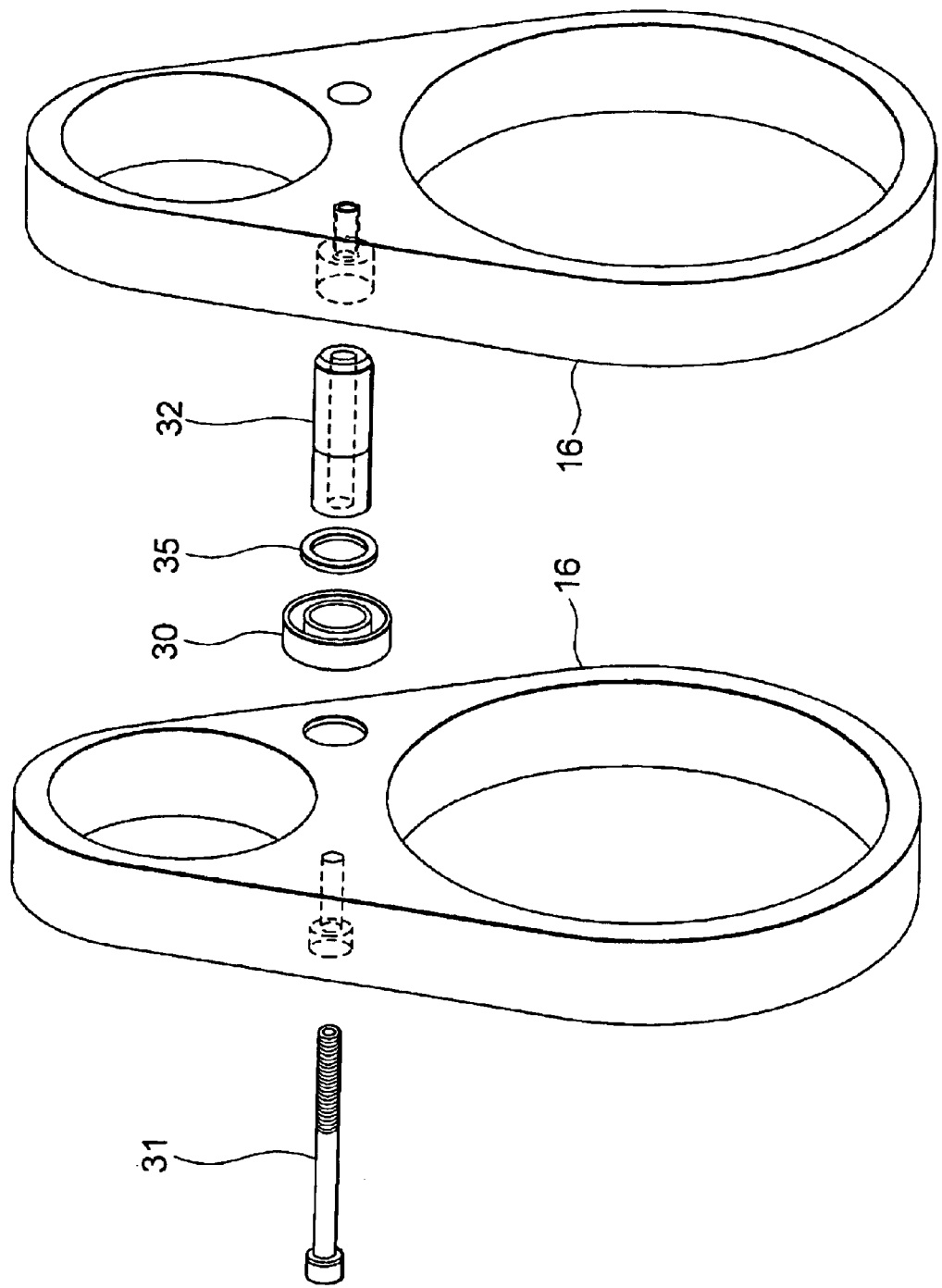
FIG. 53 is an exploded perspective view of a coupling plate and a back-up bearing in the frictional roller transmission (speed reducing apparatus) according to the twenty-second embodiment of the present invention.

FIG. 52 is a cross sectional view of a part including the third and fourth rollers in the frictional roller transmission (speed reducing apparatus) according to the twenty-second embodiment of the present invention. FIG. 53 is an exploded perspective view of coupling plates and a back-up bearing in the frictional roller transmission (speed reducing apparatus) according to the twenty-second embodiment of the present invention.

In the twenty-first embodiment described above, the bolts 31, 31 are inserted through the cylindrical spacers 32, 32 from the end surfaces thereof on the sides of the washers 35, 35.

In contrast to this, in this twenty-second embodiment, the bolts 31, 31 are inserted through the cylindrical spacers 32, 32 from the end surfaces on the opposite sides. Other arrangements and operations are the same as those in the above seventeenth embodiment. In FIG. 53, only one set of the back-up bearing 30, bolt 31, cylindrical spacer 32 and washer 35 is shown.

(Twenty-Third Embodiment)

Figure 54:
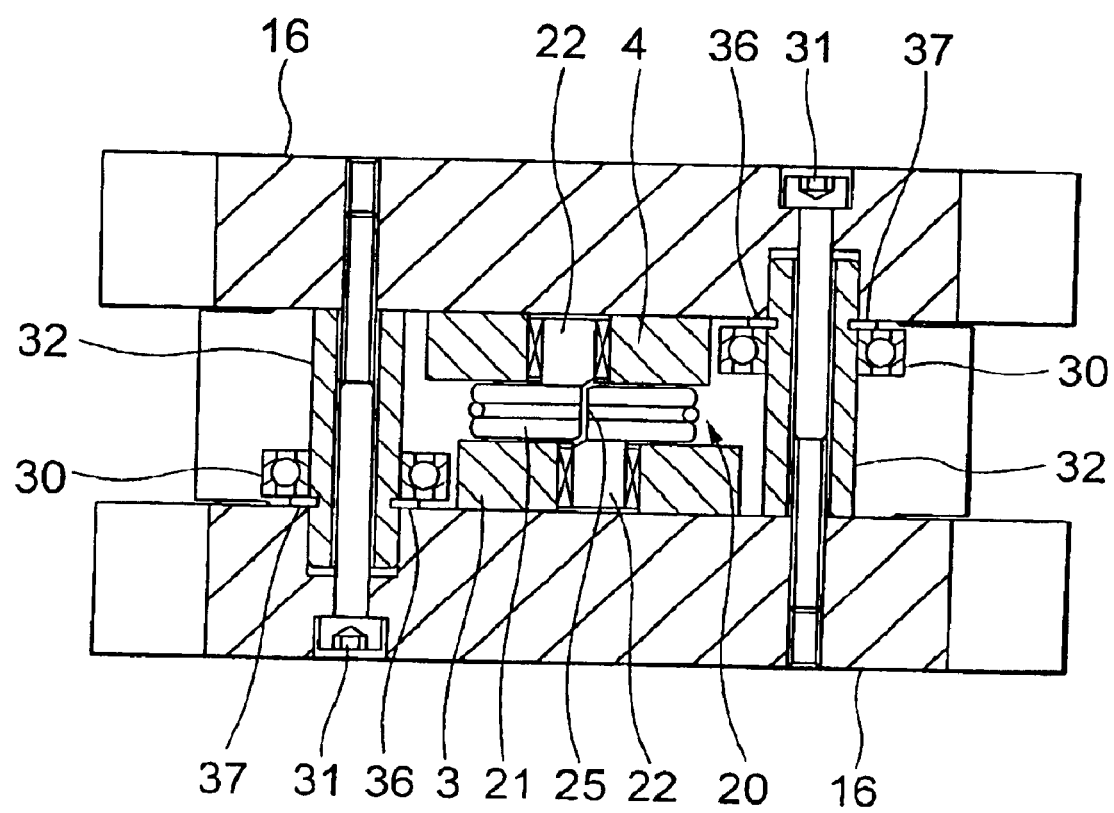
FIG. 54 is a cross sectional view of a part including the third and fourth rollers in the frictional roller transmission (speed reducing apparatus) according to a twenty-third embodiment of the present invention.
Figure 55:
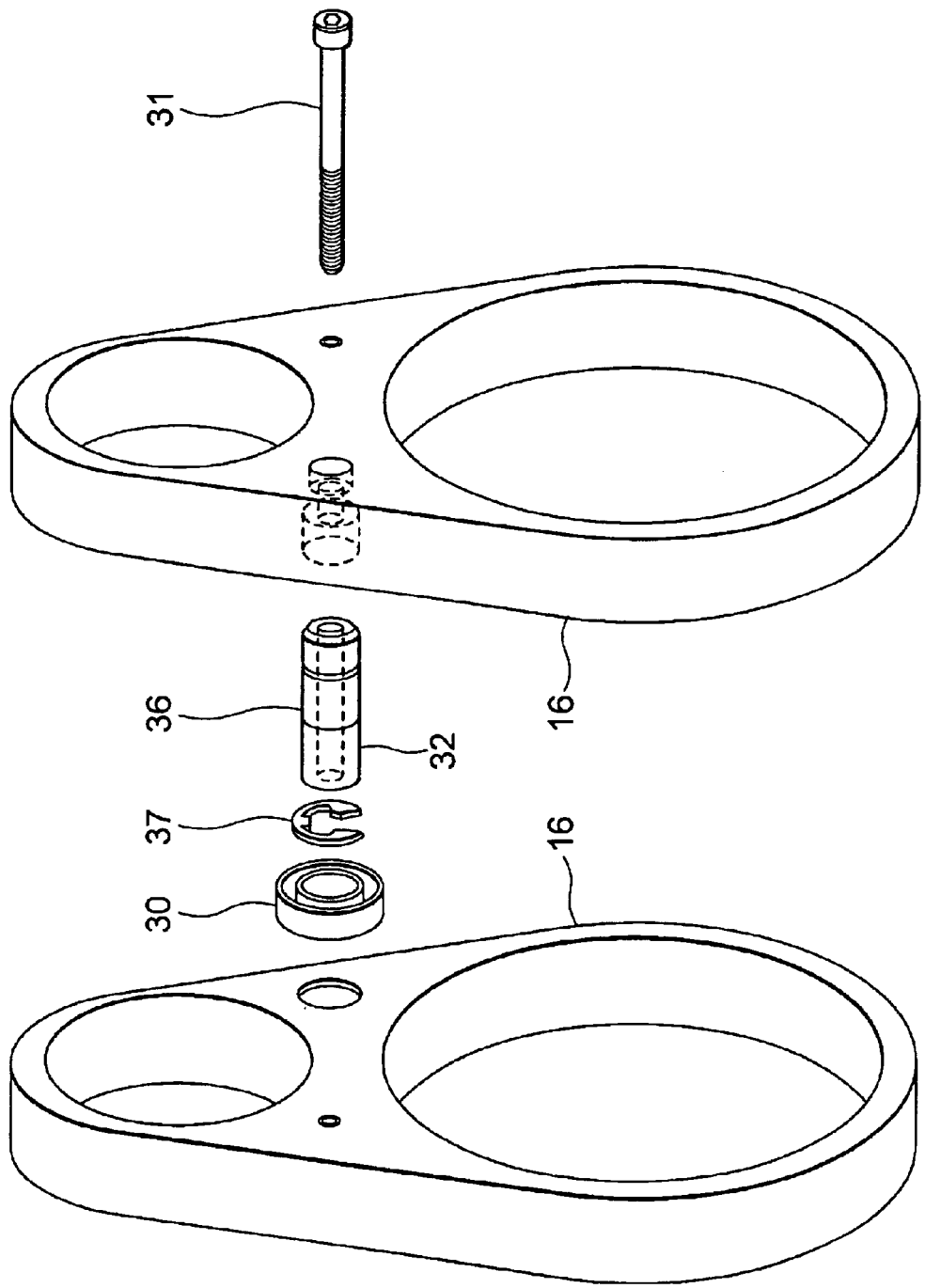
FIG. 55 is an exploded perspective view of a coupling plate and a back-up bearing in the frictional roller transmission (speed reducing apparatus) according to the twenty-third embodiment of the present invention.

FIG. 54 is a cross sectional view of a part including the third and fourth rollers in the frictional roller transmission (speed reducing apparatus) according to the twenty-third embodiment of the present invention. FIG. 55 is an exploded perspective view of coupling plates and a back-up bearing in the frictional roller transmission (speed reducing apparatus) according to the twenty-third embodiment of the present invention.

A pair of bolts 31, 31 are respectively inserted through the coupling plates 16, 16 to be threadably engaged therewith. The bolts 31, 31 are inserted through cylindrical spacers 32, 32, and the cylindrical spacers 32, 32 are respectively provided with annular grooves 36, 36. E-type retaining rings 37, 37 are respectively fitted in the annular grooves 36, 36. On the side surfaces of the E-type retaining rings 37, 37, there are provided back-up bearings 30, 30 described above.

In the twenty-third embodiment, the bolts 31, 31 are inserted through the cylindrical spacers 32, 32 from the end surfaces thereof on the sides of the E-type retaining rings 37, 37.

Figure 57:
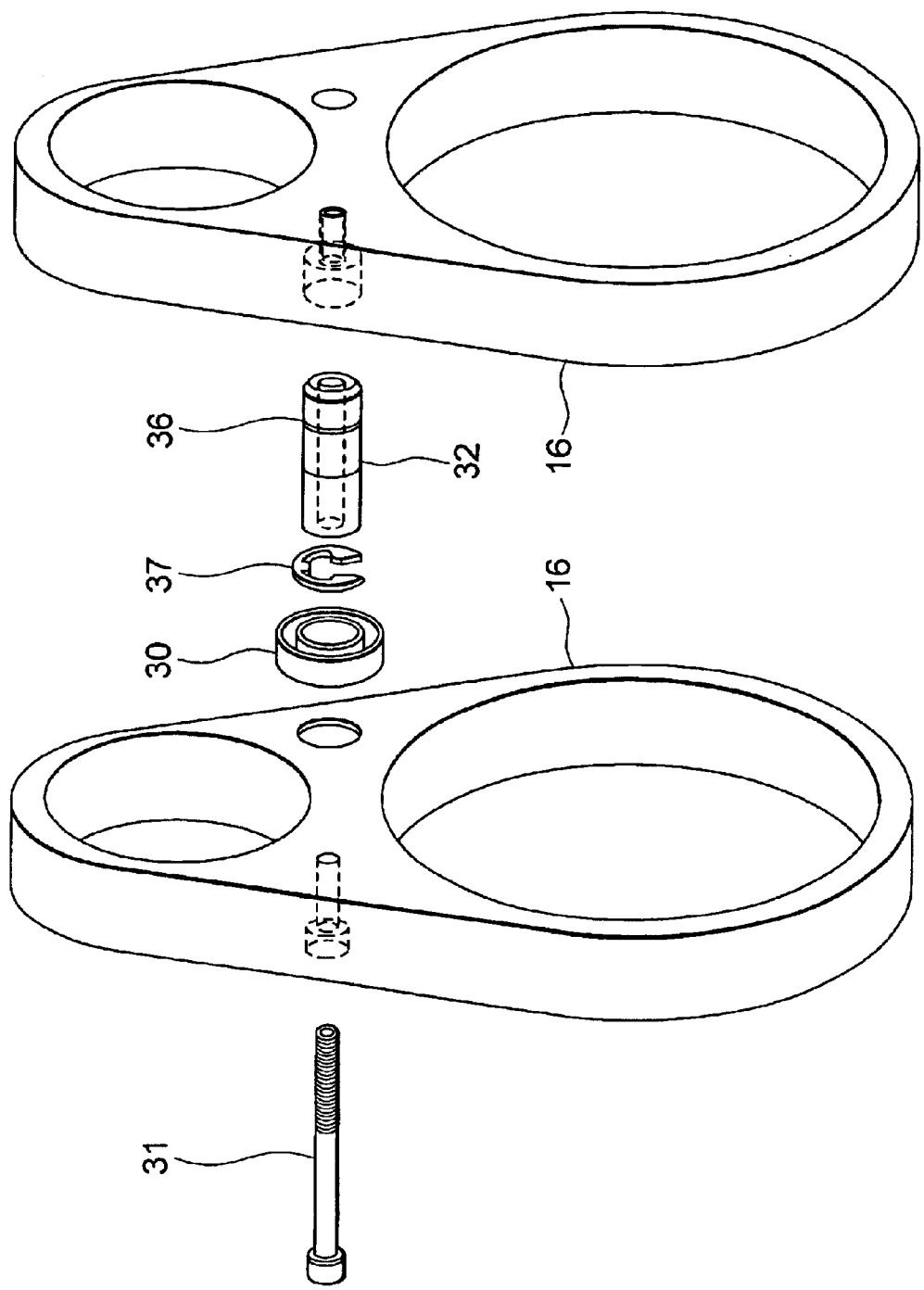
FIG. 57 is an exploded perspective view of a coupling plate and a back-up bearing in the frictional roller transmission (speed reducing apparatus) according to the twenty-fourth embodiment of the present invention.

The distance between the two coupling plates 16, 16 is set at a predetermined value by the end surfaces of the E-type retaining rings 37, 37 of the cylindrical spacers 32, 32 and the end surfaces on the opposite sides of the cylindrical spacers 32, 32. In FIG. 57, only one set of the back-up bearing 30, bolt 31, cylindrical spacer 32 and E-type retaining ring 37 is shown.

(Twenty-Fourth Embodiment)

Figure 56:
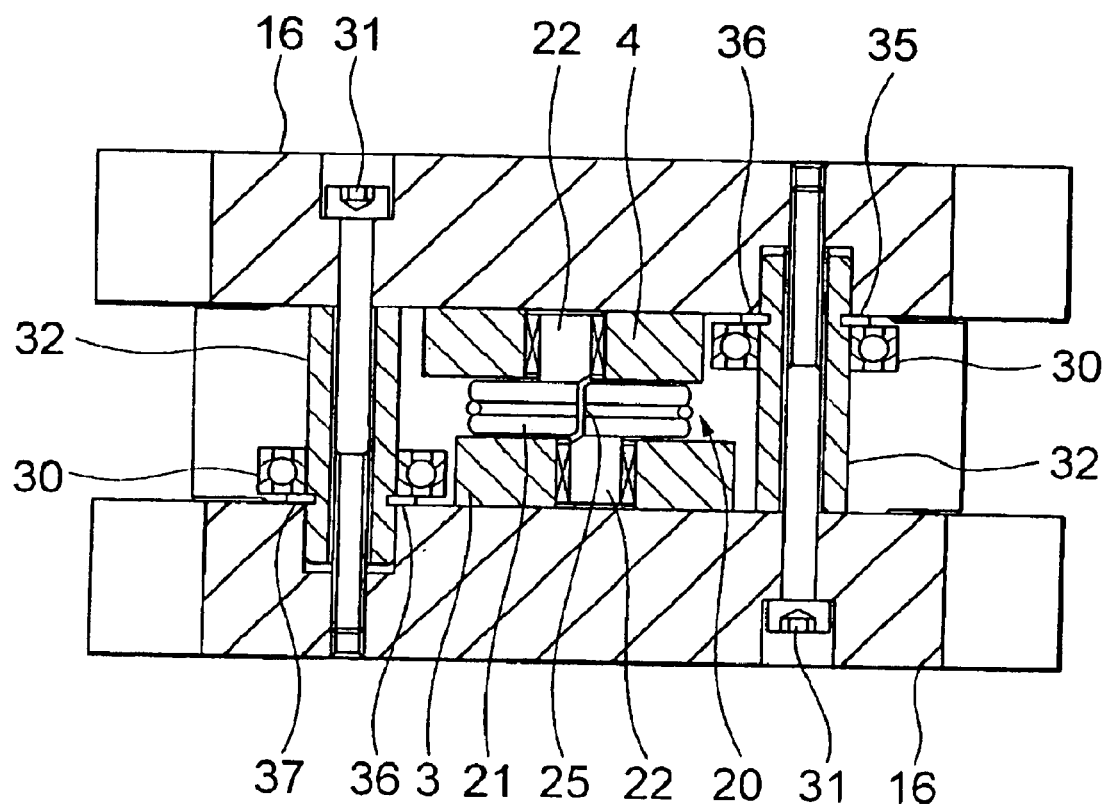
FIG. 56 is a cross sectional view of a part including the third and fourth rollers in the frictional roller transmission (speed reducing apparatus) according to a twenty-fourth embodiment of the present invention.

FIG. 56 is a cross sectional view of a part including the third and fourth rollers in the frictional roller transmission (speed reducing apparatus) according to the twenty-fourth embodiment of the present invention. FIG. 57 is an exploded perspective view of a coupling plate and a back-up bearing in the frictional roller transmission (speed reducing apparatus) according to the twenty-fourth embodiment of the present invention.

In the twenty-third embodiment described above, the bolts 31, 31 are inserted through the cylindrical spacers 32, 32 from the end surfaces thereof on the sides of the E-type retaining rings 37, 37.

In contrast to this, in this twenty-fourth embodiment, the bolts 31, 31 are inserted through the cylindrical spacers 32, 32 from the end surfaces on the opposite sides. Other arrangements and operations are the same as those in the above twenty-third embodiment. In FIG. 57, only one set of the back-up roller 30, bolt 31, cylindrical spacer 32 and E-type retaining ring 37, is shown.

(Twenty-Fifth Embodiment)

Figure 58B:
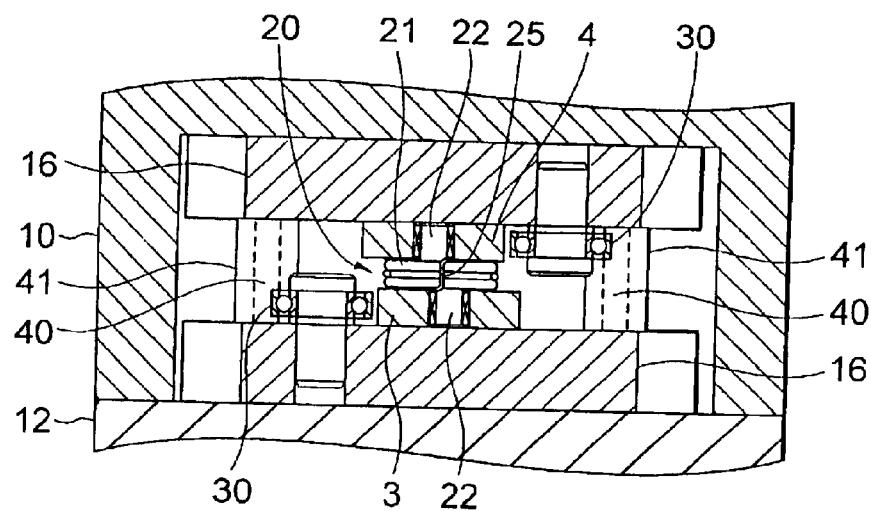
Figure 58A:
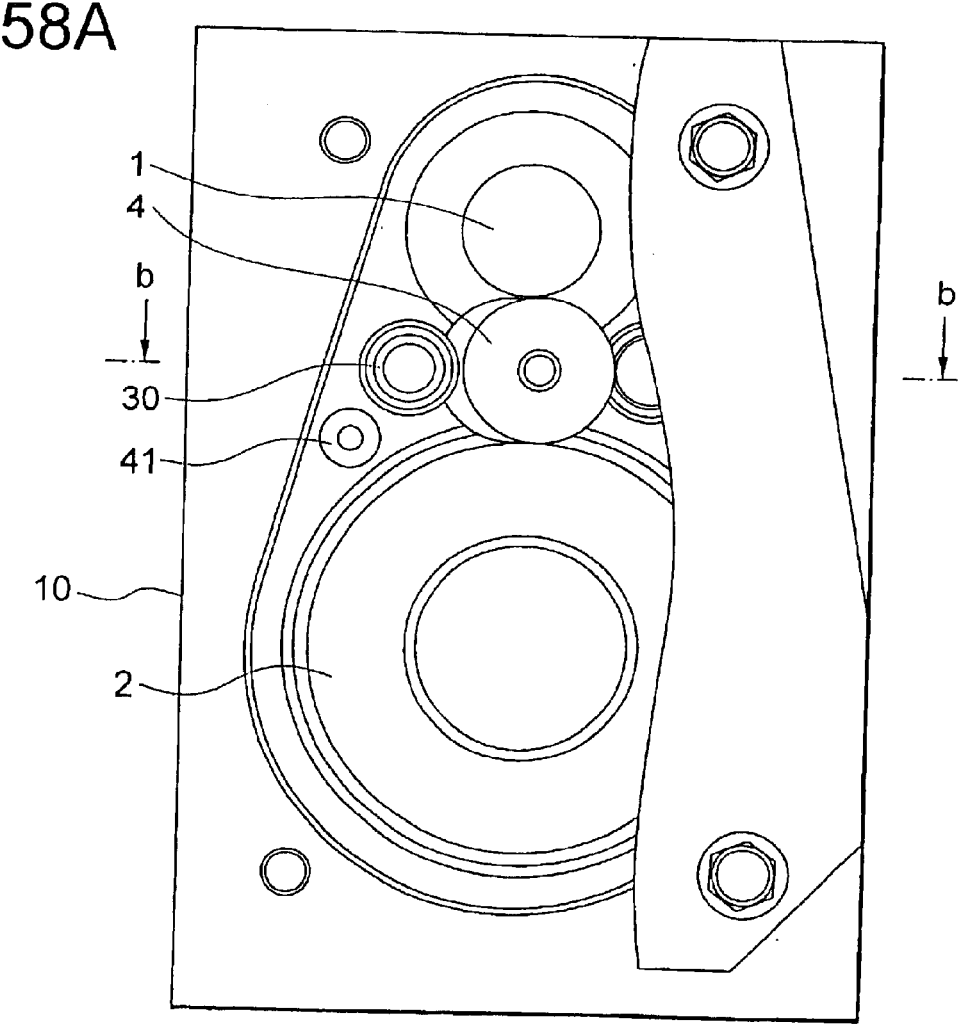
Figure 59:
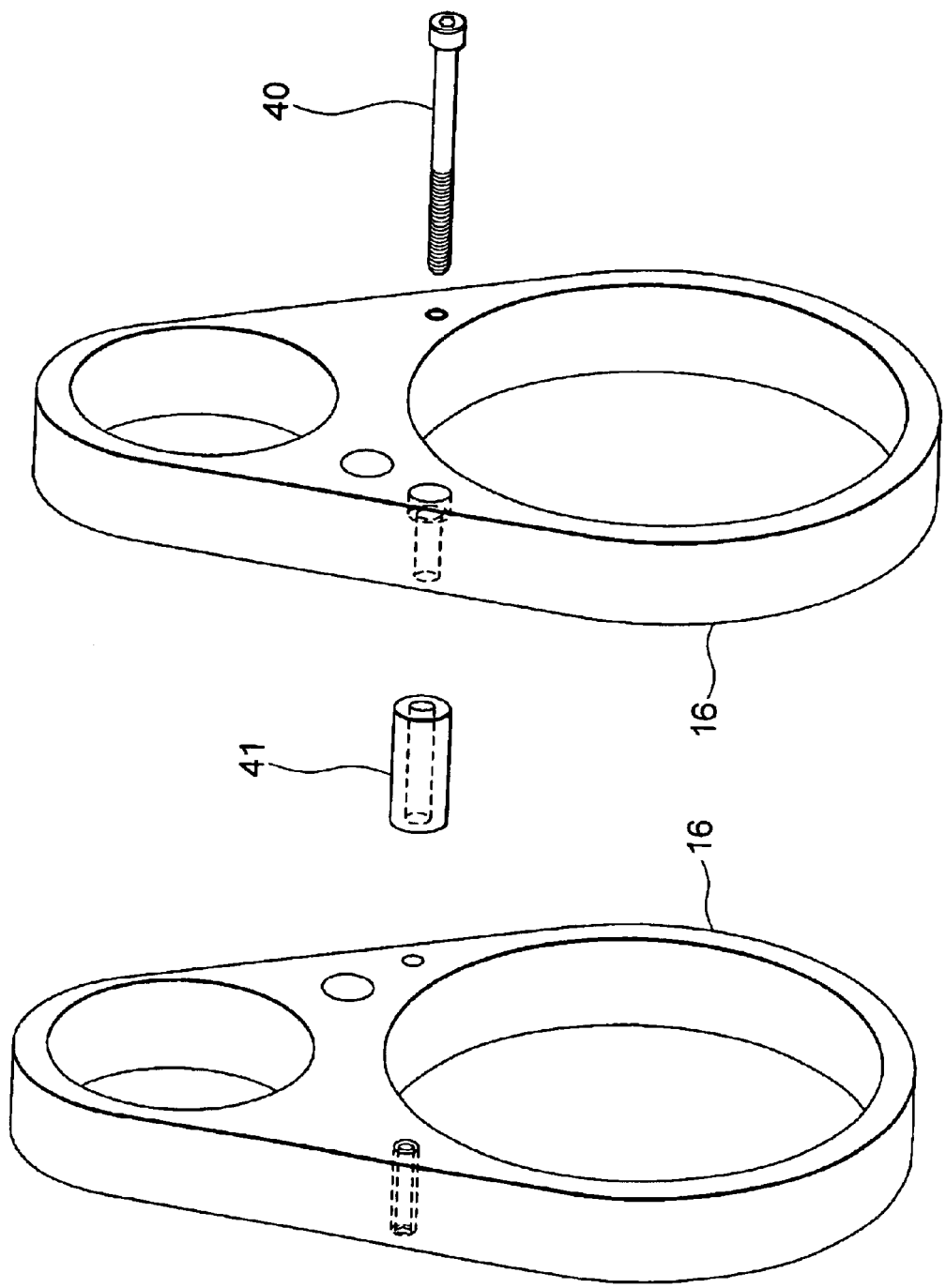
FIG. 59 is an exploded perspective view of a coupling plate and a back-up bearing in the frictional roller transmission (speed reducing apparatus) according to the twenty-fifth embodiment of the present invention.

FIGS. 58A and 58B are views for showing a frictional roller transmission (speed reducing apparatus) according to the twenty-fifth embodiment of the present invention, in which FIG. 58A is a side view thereof partially cut-away, and FIG. 58B is a cross sectional view taken along line b—b in FIG. 58A. FIG. 59 is an exploded perspective view of coupling plates and a back-up bearing in the frictional roller transmission (speed reducing apparatus) according to the twenty-fifth embodiment of the present invention.

In the twenty-fifth embodiment, bolts 40, 40 for installing the two coupling plates 16, 16 are inserted through the cylindrical spacers 41, 41, respectively.

The distance between the two coupling plates 16, 16 is set at a predetermined value by the end surfaces of the cylindrical spacers 41, 41 and the end surfaces on the opposite sides of the cylindrical spacers 32, 32.

As described above, according to the fifteenth through twenty-fifth embodiments of the present invention, it is possible to set the distance between the two coupling plates which respectively couple the bearings for rotatably supporting the first roller and the second roller at the both end portions of these two rollers to each other at a desirable value.

(Twenty-Sixth Embodiment)

Figure 60:
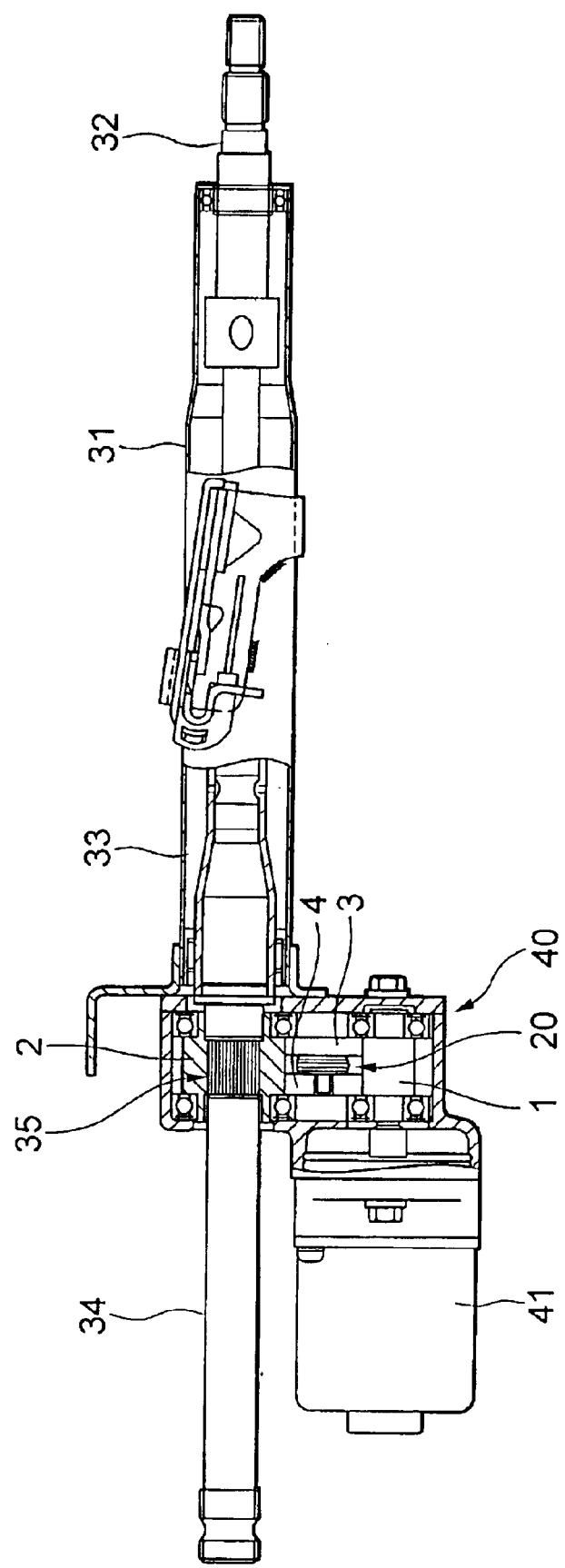
FIG. 60 is a longitudinal cross-sectional view of a steering column for an automobile according to a twenty-sixth embodiment of the present invention.

FIG. 60 is a longitudinal cross-sectional view of a steering column for an automobile according to the twenty-sixth embodiment of the present invention.

Inside the steering column 31, a steering shaft 32 on the upper side is rotatably supported and an intermediate shaft 33 is coupled to the shaft 32 on the upper side. Then, a steering shaft 34 on the lower side is coupled to the intermediate shaft 33.

The shaft 34 on the lower side is provided with a spline fitting portion 35, and the second roller 2 of the frictional roller transmission 40 utilizing the wedge effect is spline-fitted with the spline fitting portion 35.

The frictional roller transmission 40 is connected to the motor 41, and to concretize the basic configuration of the foregoing embodiments as a speed reducing apparatus of an actuator, has the same arrangement as that of the basic configuration of the foregoing embodiments with respect to the layout of the first to fourth rollers 1 to 4, the contact angle, and the frictional angle.

The second roller (output roller) 2 is formed to be hollow. When being attached the steering column 31, this second roller 2 is restrained in the direction of rotation with respect to the steering shaft 34 by the spline fitting portion 35, that is, the steering shaft 34 is rotated by the rotation of the second roller 2.

With this arrangement, a frictional roller transmission (actuator) 40 can be attached afterward to the steering column 31 which has been already in a state that it can satisfy the functions thereof by itself. When the speed reducing apparatus is unnecessary, the above steering column can be used as an ordinary steering column 31 without this speed reducing apparatus. The roller 2 may be formed integrally with the steering column 31 (incapable of being attached or detached) by pressure-fixing.

(Twenty-Seventh Embodiment)

FIG. 61A is a longitudinal cross-sectional view of a steering column for an automobile according to the twenty-seventh embodiment of the present invention.

In this embodiment, a tolerance ring fitting portion 36 is employed, instead of the spline fitting portion 35.

The second roller (output roller) 2 is formed to be hollow. When being attached to the steering column 31, this second roller is restrained in the direction of rotation with respect to the steering shaft 34 through the tolerance ring 36, that is, the steering shaft 34 is rotated by the rotation of the second roller 2.

With this arrangement, the frictional roller transmission (actuator) 40 can be attached afterward to the steering column 31 which has been already in a state that is can satisfy the functions thereof by itself. When the speed reducing apparatus is unnecessary, the above steering column can be used as an ordinary steering column 31 without this speed reducing apparatus. The tolerance ring may be formed integrally with the steering column 31 (incapable of being attached or detached) by pressure-fixing.

(Twenty-Eighth Embodiment)

FIG. 61B is a longitudinal cross-sectional view of a steering column for an automobile according to the twenty-eighth embodiment of the present invention.

In the twenty-eighth embodiment, a key-coupling portion 37 is employed, instead of the spline fitting portion 35.

The second roller (output roller) 2 is formed to be hollow. When being attached to the steering column 31, this second roller is restrained in the direction of rotation with respect to the steering shaft 34 by the key-coupling portion 37, that is, the steering shaft 34 is rotated by the rotation of the second roller 2.

With this arrangement, the frictional roller transmission (actuator) 40 can be attached afterward to the steering column 31 which has been already in a state that is can satisfy the functions thereof by itself. When the portion of the speed reducing apparatus is unnecessary, the above steering column can be used as an ordinary steering column 31 without the speed reducing apparatus. The transmission 40 may be formed integrally with the steering column 31 (incapable of being attached or detached) by pressure-fixing.

(Twenty-Ninth Embodiment)

Figure 62:
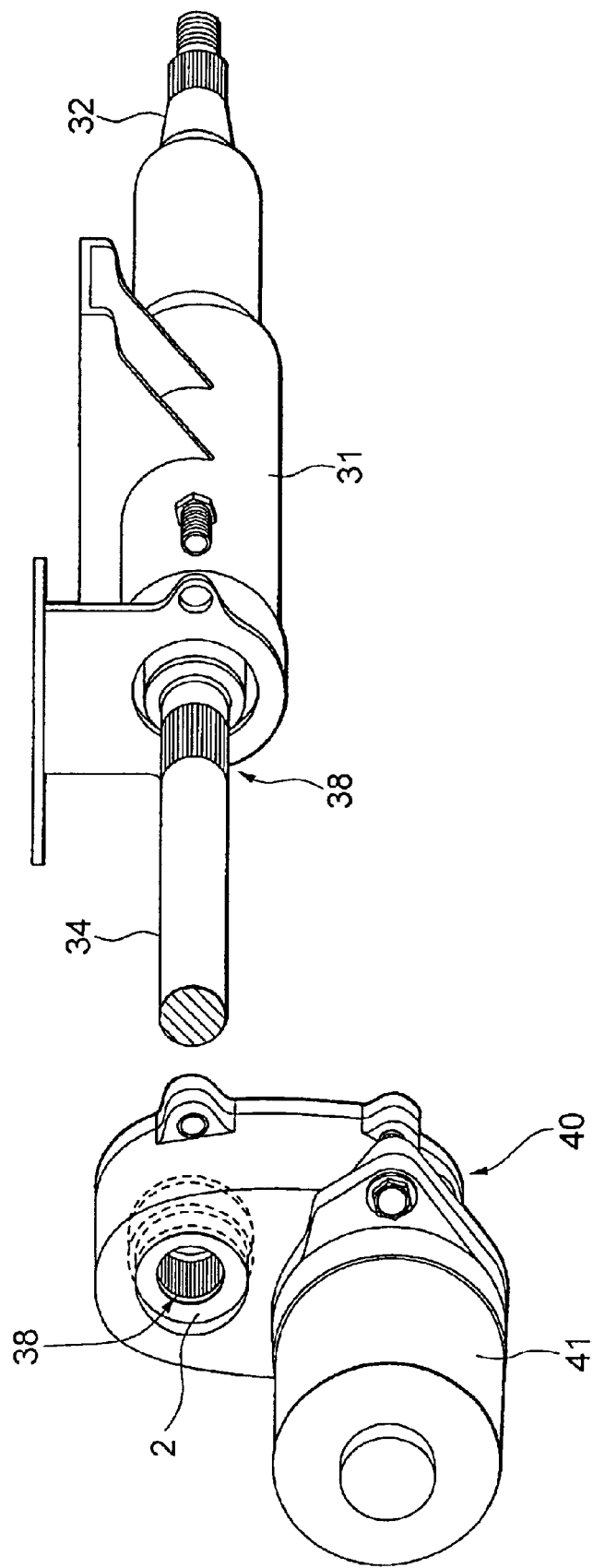
FIG. 62 is an exploded perspective view of a steering column for an automobile according to a twenty-ninth embodiment of the present invention.

FIG. 62 is an exploded perspective view of a steering column for an automobile according to the twenty-ninth embodiment of the present invention.

In the twenty-ninth embodiment, a serrated fitting portion 38 is employed, instead of the spline fitting portion 35.

The second roller (output roller) 2 is formed to be hollow. When being attached to the steering column 31, this second roller is restrained in the direction of rotation with respect to the steering shaft 34 by the serrated fitting portion 38, that is, the steering shaft 34 is rotated by the rotation of the second roller 2.

With this arrangement, the frictional roller transmission (actuator) 40 can be attached afterward to the steering column 31 which has been already in a state that it can satisfy the functions thereof by itself. When the portion of the speed reducing apparatus is unnecessary, the above steering column can be used as an ordinary steering column 31 without the speed reducing apparatus. This serrated portion may be formed integrally with the steering column 31 (incapable of being attached or detached) by pressure-fixing.

(Thirtieth Embodiment)

Figure 63C:
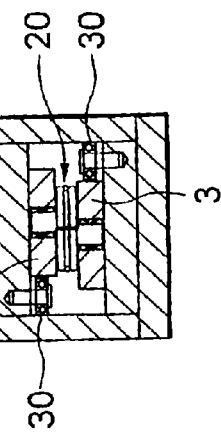
Figure 63D:
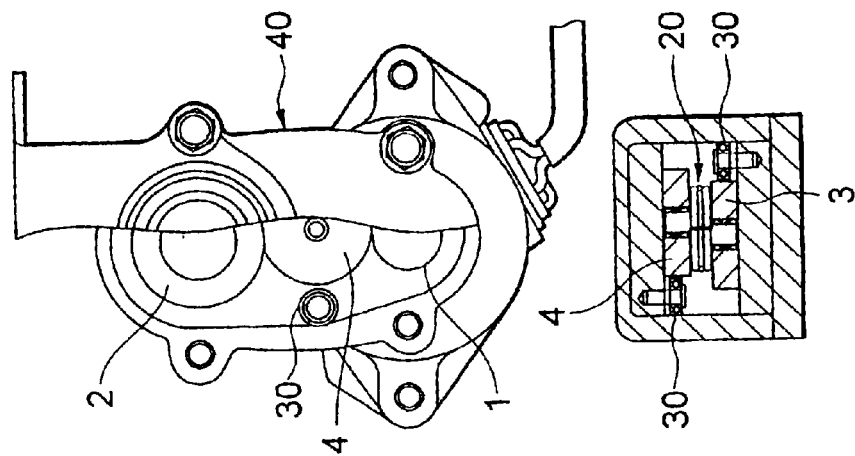
Figure 63B:
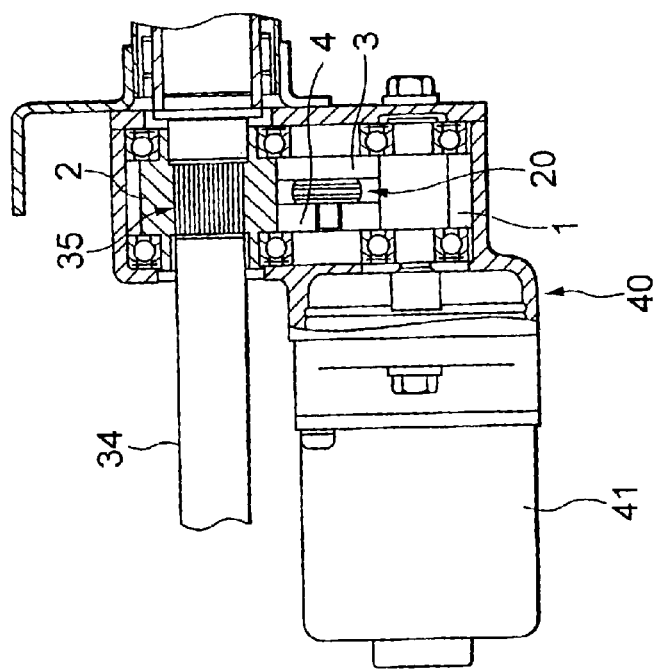
Figure 63A:
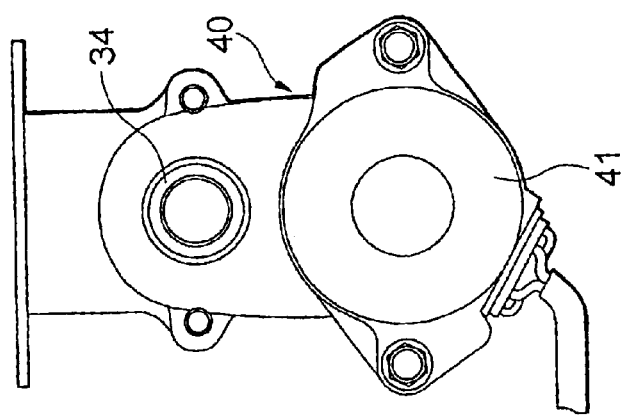

FIGS. 63A through 63D are views for showing a steering column for an automobile according to the thirtieth embodiment of the present invention, in which FIG. 63A is a front view, FIG. 63B is a longitudinal cross-sectional view, FIG. 63C is a back side view partially cut-away, and FIG. 63D is a lateral cross-sectional view of the steering column.

As seen from the Japanese Patent Application Laid-Open No. 2001-138933, or the like, there arises a problem on performance in a conventional gear driving using a worm gear, or the like, unless a back lash is not kept within a predetermined range.

For instance, when the back lash exceeds a predetermined level, a worm shaft which is driven in the direction of rotation together with the motor 41 can not follow due to an irregular reverse force applied from the tire side, whereby a tooth striking sound (rattle) is generated which is a noise offensive to the ear of the driver. In addition, when the back lash is great, a problem of delay in control is suspected.

On the other hand, when the back lash becomes lower than the predetermined level, a working torque and an amount of fluctuation of the working torque are increased since the gear meshing parts compete with each other, thereby giving adverse influences to a steering feeling.

A worm gear is used for applying a torque to such a column, and worm wheel is often formed of nylon resin in order to obtain a lower operating sound, smooth meshing performance, and self lubricating capability. However, when a resin material is used, the dimensions of the gear are increased due to moisture absorption, thereby suppressing the back lash. For this reason, it is necessary to assemble the worm wheel by assuming rather large back lash. In addition, a resin material allows abrasion on a tooth surface during operation, and if this abrasion reaches an excessive level, the back lash becomes large to generate the rattle.

If this gear driving is changed to the roller driving of this thirtieth embodiment, such a back lash is eliminated to save a trouble of conventional back lash control in the assembling.

Also, since, with the worm gear, a slip is inevitable on a tooth surface thereof, a loss of torque tends to become greater. This tendency is conspicuous when the speed reducing apparatus is large in size. There is a speed reducing apparatus of a planetary roller type which employs the roller driving, as in the present structure which, however, brings about a greater torque loss since a planetary roller is interposed in a pressure contact state between the outer peripheral surface of a sun shaft and the inner peripheral surface of the outer roller in a hollow form by shrinkage fit.

In contrast with this, in the structure of the thirtieth embodiment, there is no wedge effect exerted on the third and fourth rollers 3 and 4 in a state that no torque is generated in the actuator, so that a torque loss generated in the speed decreasing apparatus is extremely small. Thus, an excellent steering feeling can be obtained in this case.

(Thirty-First Embodiment)

Figure 64A:
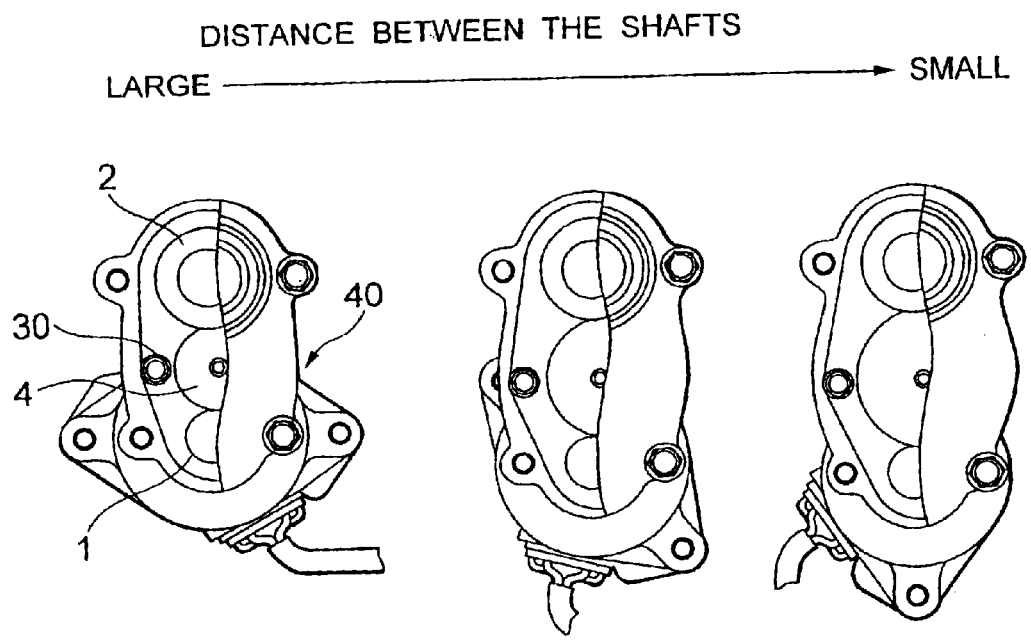
FIGS. 64A and 64B are schematic views for respectively showing a relation between the distance between the shafts and a gear ratio.
Figure 64B:
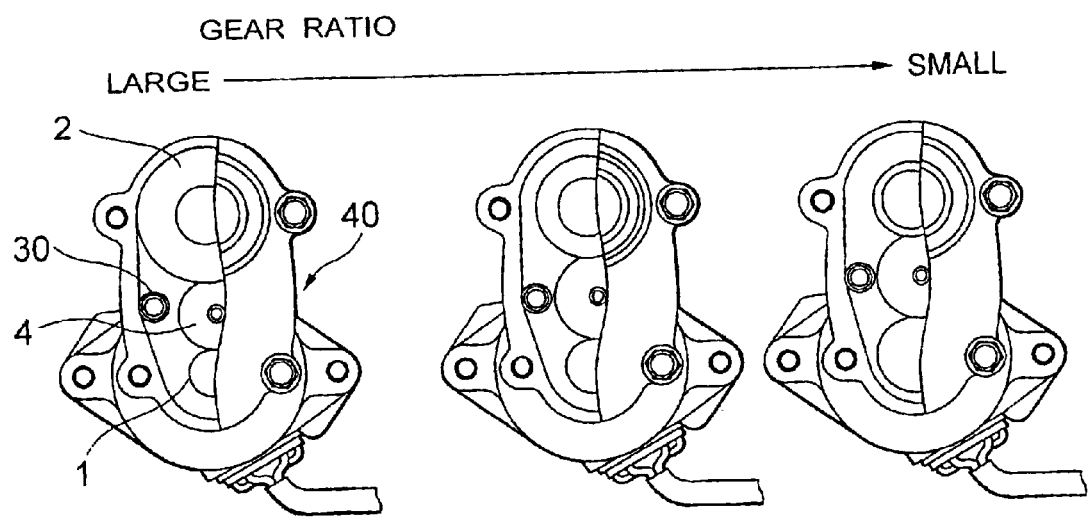

FIGS. 64A and 64B are schematic views for respectively showing a relation between the distance between the shafts and a gear ratio.

For the worm gear, the module thereof is determined on the basis of the required intensity, and the diameter of a tooth is determined on the basis of the distance between the input and output shafts and a ratio of speed reduction, which results in a lower degree of freedom in the layout. However, in this case, a space a little can be reduced a little by changing the number the teeth of the worm gear. When a spur gear or a helical gear is used, the diameter of an output gear becomes gradually greater if the gear ratio is larger, which gives an influence on the external dimensions of the speed decreasing apparatus. As a result, it is expected that the layout can not be formed.

In the structure of the thirty-first embodiment, since a metallic roller is used, it is possible to maintain the same level of intensity with a smaller space in a reduced dimensions, compared with a case using a resin gear.

Also, as shown in FIG. 64A, it is rendered possible to correct the distance between the shafts by the use of an idler without changing the scale of the input and output rollers even under the condition that the ratio of speed reduction is fixed. As a result, the external dimensions will not become extremely large.

As shown in FIG. 64B, it is rendered possible to change the ratio of speed reduction by changing the outer diameter of the idler without altering the distance between the shafts, which results in a higher degree of freedom in the layout.

(Thirty-Second Embodiment)

For a steerage assisting function for the driver such as a lane keeping actuator, it is desirable to keep a torque generated within a range not exceeding the steering power of the driver for safety's sake.

The structure of the thirty-second embodiment is arranged such that a torque exceeding a predetermined level is not transmitted depending on a position at which the back-up rollers are disposed, so that the above function can be satisfied without any supplementary part such as a clutch. Since this function serves as a torque limiter, a damage of each part of the speed reducing apparatus such as a bearing can be prevented.

As seen from the Japanese Patent Application Laid-Open No. 2001-114118 or No. 2001-130426, in a steering reaction generating device of SBW (steer by wire), a worm gear drive by the use of an electric motor is mainly used, and an object of such an arrangement is to give the driver a comfortable feeling as if the steering reaction is decided based on a signal detected from a sensor of a car speed, a steering angle, a motor current, etc., a reaction is added to a steering operation of the driver, and the steering wheel and the car dirigible wheels are mechanically coupled to each other. However, since the worm gear is operated upon generation of the reaction, an adverse influence may be exerted upon the steering feeling, depending on a fluctuation of the working torque.

It is possible to obtain a smooth steering feeling at all times by employing a frictional roller transmission traction drive utilizing the wedge effect as the above drive, which transmission is capable of reducing a torque fluctuation of the roller drive to the minimum.

As described above, according to the twenty-sixth through thirty-second embodiments of the present invention, it is possible to provide a steering column for an automobile, which is provided with the frictional roller transmission utilizing the wedge effect and serving as a speed reducing apparatus of an actuator.

What is claimed is:

1. A frictional roller transmission characterized in that:
   a first roller and a second roller are disposed around respective shafts which are arranged such that the first and second rollers do not contact each other;
   a third roller and a fourth roller, each of which contacts said first and second rollers, are disposed between said first roller and said second roller with said third roller and said fourth roller being offset to opposite sides of a line connecting a center of said first roller and a center of said second roller; and
   an angle which is made by a tangential line between said first roller and said third roller and a tangential line between said second roller and said third roller is set not to exceed two times frictional angle corresponding to a coefficient of friction between said respective rollers.

2. The frictional roller transmission according to claim 1, wherein said shafts are parallel to each other.

3. The frictional roller transmission according to claim 1, wherein a diameter of said third roller is larger than a shortest distance between peripheral surfaces of said first roller said the second roller.

4. The frictional roller transmission according to claim 1, wherein a frictional portion thereof is disposed on an outside of each roller.

5. The frictional roller transmission according to claim 1, wherein a frictional portion thereof is disposed inside either one of the first roller and the second roller.

6. An electric power steering apparatus, characterized by using the frictional roller transmission according to any one of claims 1 to 3.

7. The frictional roller transmission according to any one of claims 1 to 3, wherein the coefficient of linear expansion of a housing is equal to that of each roller.

8. The frictional roller transmission according to any one of claims 1 to 3, wherein the first and second rollers are used both in forward and backward rotations by overlapping the third and fourth rollers thereon.

9. A frictional roller transmission characterized in that:
   a first roller and a second roller are disposed around respective shafts which are arranged such that said first and second rollers do not contact each other;
   a third roller and a fourth roller, each of which contacts said first and second rollers, are disposed between said first roller and said second roller with said third roller and said fourth roller being offset to opposite sides of a line connecting a center of said first roller and a center of said second roller;
   an angle which is made by a tangential line between said first roller and said third roller and a tangential line between said second roller and said third roller is set not to exceed two times a frictional angle corresponding to a coefficient of friction between said respective rollers; and
   said transmission further comprising:
   a first holder rotatably holding said third roller;
   a second holder rotatably holding said fourth roller; and
   an elastic member applying an elastic force in a direction in which said first and second holders are urged toward each other for connecting them together,
   said first and second holders being constructed such that an axial distance between said third roller and said fourth roller is not less than a predetermined distance.

10. The frictional roller transmission according to claim 9, wherein an axis-to-axis distance between said third roller and said fourth roller in an initial state in which no elastic deformation is generated is larger than an axis-to-axis distance between said third roller and said fourth roller during transmission of a torque.

11. The frictional roller transmission according to claim 9, wherein an oil retaining groove is provided on a shaft portion of each said holder.

12. The frictional roller transmission according to claim 9, wherein a respective bearing is disposed between the shaft portion of each holder and the corresponding roller held by that holder.

13. The frictional roller transmission according to claim 9, wherein said first holder is integrally formed with a semicircular flange portion and a shaft portion perpendicularly projected therefrom on which said third roller is supported rotatably;

said second holder is integrally formed with a semicircular flange portion and a shaft portion perpendicularly projected therefrom on which said fourth roller is supported rotatably;

said semicircular flange portion of said first holder and semicircular flange portion of said second holder are complementary and connected to form a disc shape with said shaft portion of said first holder and said shaft portion of said second holder being projected in opposite directions; and an elastic ring-like member forming said elastic member is disposed around a peripheral surface of said disc shape.

14. The frictional roller transmission according to claim 13, wherein an oil retaining groove is provided on the shaft portion of each said holder.

15. The frictional roller transmission according to claim 13, wherein bearings are disposed respectively between the shaft portions of said first and second holders and said third and fourth rollers.

16. An electric power steering apparatus, comprising:
the frictional roller transmission according to any one of claims 9 to 12 or 13 to 15;
an electric motor outputting a rotation to said first roller;
a ball screw nut rotating upon rotation of said second roller; and
a nut shaft subjected to ball-screw coupling to said ball screw to be linearly moved back and forth upon rotation of said ball screw nut to effect steering of dirigible wheels.

17. A frictional roller transmission characterized in that:
a first roller and a second roller are disposed around respective shafts which are arranged such that the first and second rollers do not contact each other;
a third roller and a fourth roller, each of which contacts said first and second rollers, are disposed between said first roller and said second roller with said third roller and said fourth roller being offset to opposite sides of a line connecting a center of said first roller and a center of said second roller;
an angle which is made by a tangential line between said first roller and said third roller and a tangential line between said second roller and said third roller is set not to exceed two times a frictional angle corresponding to a coefficient of friction between those respective rollers; and
an angle which is made by a tangential line between said first roller and said fourth roller and a tangential line between said second roller and said fourth roller is set not to exceed two times a frictional angle corresponding to a coefficient of friction between those respective rollers.

18. The frictional roller transmission according to claim 17, wherein said shafts are parallel to each other.

19. The frictional roller transmission according to claim 17, wherein said third roller and said fourth roller are offset along an axial direction, and a diameter of said third roller and a diameter of said fourth roller are larger than a shortest distance between peripheral surfaces of said first roller said second roller.

20. The frictional roller transmission according to claim 17, wherein a frictional portion thereof is disposed on an outside of each roller.

21. The frictional roller transmission according to claim 17, wherein said second roller is a hollow cylindrical roller, said first roller is disposed inside said second roller eccentrically thereto, said third roller and said fourth roller are disposed inside said second roller eccentrically to each other and to said first and second rollers such that said third and fourth rollers are both in contact with an outer peripheral surface of said first roller and an inner peripheral surface of said second roller.

22. An electric power steering apparatus, characterized by using the frictional roller transmission according to any one of claims 17 to 19.

23. The frictional roller transmission according to any one of claims 17 to 19, wherein the coefficient of linear expansion of a housing is equal to that of each roller.

24. The frictional roller transmission according to any one of claims 17 to 19, wherein said first and second rollers are used both in forward and backward rotations by overlapping the third and fourth rollers thereon.

25. A frictional roller transmission characterized in that:
a first roller and a second roller are disposed around respective shafts which are arranged such that said first and second rollers do not contact each other;
a third roller and a fourth roller, each of which contacts said first and second rollers, are disposed between said first roller and said second roller with said third roller and said fourth roller being offset to opposite sides of a line connecting a center of said first roller and a center of said second roller;
an angle which is made by a tangential line between said first roller and said third roller and a tangential line between said second roller and said third roller is set not to exceed two times a frictional angle corresponding to a coefficient of friction between those respective rollers;
an angle which is made by a tangential line between said first roller and said fourth roller and a tangential line between said second roller and said fourth roller is set not to exceed two times a frictional angle corresponding to a coefficient of friction between those respective rollers; and
said transmission further comprising:
a first holder rotatably holding said third roller;
a second holder rotatably holding said fourth roller; and
an elastic member applying an elastic force in a direction in which said first and second holders are urged toward each other for connecting them together,
said first and second holders being constructed such that an axial distance between said third roller and said fourth roller is not less than a predetermined distance.

26. The frictional roller transmission according to claim 25, wherein an axis-to-axis distance between said third roller and said fourth roller in an initial state in which no elastic deformation is generated is larger than an axis-to-axis distance between said third roller and said fourth roller during transmission of a torque.

27. The frictional roller transmission according to claim 25, wherein an oil retaining groove is provided on a shaft portion of each said holder.

28. The frictional roller transmission according to claim 25, wherein a respective bearing is disposed between the shaft portion of each holder and the corresponding roller held by that holder.

29. The frictional roller transmission according to claim 25, wherein said first holder is integrally formed with a semicircular flange portion and a shaft portion perpendicularly projected therefrom on which said third roller is supported rotatably;

said second holder is integrally formed with a semicircular flange portion and a shaft portion perpendicularly projected therefrom on which said fourth roller is supported rotatably;

said semicircular flange portion of said first holder and semicircular flange portion of said second holder are complementary and connected to form a disc shape with said shaft portion of said first holder and said shaft portion of said second holder being projected in opposite directions; and an elastic ring-like member forming said elastic member is disposed around a peripheral surface of said disc shape.

30. The frictional roller transmission according to claim 29, wherein an oil retaining groove is provided on the shaft portion of each said holder.

31. The frictional roller transmission according to claim 29, wherein bearings are disposed respectively between the shaft portions of said first and second holders and said third and fourth rollers.

32. An electric power steering apparatus, comprising:

the frictional roller transmission according to any one of claims 25 to 31;

an electric motor for outputting a rotation to said first roller;

a ball screw nut rotating upon rotation of said second roller; and a nut shaft subjected to ball-screw coupling to said ball screw to be linearly moved back and forth upon rotation of said ball screw nut to effect steering of dirigible wheels.

33. A frictional roller transmission characterized in that:

a first roller and a second roller are disposed around respective shafts which are arranged such that the first and second rollers do not contact each other;

a third roller and a fourth roller, each of which contacts said first and second rollers, are disposed between said first roller and said second roller with said third roller and said fourth roller being offset to opposite sides of a line connecting points of intersection of an axis of said first roller and an axis of said second roller with a plane transverse to said axes;

an angle which is made by a tangential line between said first roller and said third roller and a tangential line between said second roller and said third roller is set not to exceed two times a frictional angle corresponding to a coefficient of friction between those respective rollers; and an angle which is made by a tangential line between said first roller and said fourth roller and a tangential line between said second roller and said fourth roller is set not to exceed two times a frictional angle corresponding to a coefficient of friction between those respective rollers.

34. The frictional roller transmission according to claim 33, wherein said axes of said first and second rollers are parallel and said plane is perpendicular to said axes.

35. A frictional roller transmission characterized in that:

a first roller and a second roller are disposed around respective shafts which are arranged such that said first and second rollers do not contact each other;

a third roller and a fourth roller, each of which contacts said first and second rollers, are disposed between said first roller and said second roller with said third roller and said fourth roller being offset to opposite sides of a line connecting points of intersection of an axis of said first roller and an axis of said second roller with a plane transverse to said axes;

an angle which is made by a tangential line between said first roller and said third roller and a tangential line between said second roller and said third roller is set not to exceed two times a frictional angle corresponding to a coefficient of friction between those respective rollers;

an angle which is made by a tangential line between said first roller and said fourth roller and a tangential line between said second roller and said fourth roller is set not to exceed two times a frictional angle corresponding to a coefficient of friction between those respective rollers; and said transmission further comprising:

a first holder rotatably holding said third roller;

a second holder rotatably holding said fourth roller; and an elastic member applying an elastic force in a direction in which said first and second holders are urged toward each other for connecting them together, said first and second holders being constructed such that an axial distance between said third roller and said fourth roller is not less than a predetermined distance.

36. The frictional roller transmission according to claim 35, wherein said axes of said first and second rollers are parallel and said plane is perpendicular to said axes.

* * * * *